US009017799B2

(12) United States Patent
Chu et al.

(10) Patent No.: US 9,017,799 B2
(45) Date of Patent: Apr. 28, 2015

(54) AIR CELLULAR CUSHIONING ARTICLE OF ENHANCED STRENGTH PER UNIT WEIGHT OF FILM, AND PROCESS FOR MAKING SAME

(71) Applicant: Sealed Air Corporation (US), Elmwood Park, NJ (US)

(72) Inventors: Eva Chu, Elmwood Park, NJ (US); Robert J O'Dowd, Wesley Hills, NY (US); Timothy Theodore Oberle, Greenville, SC (US); Edward Ackershoek, Butler, NJ (US); Michael Metta, Wayne, NJ (US); Chitai Carey Yang, Denville, NJ (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 0 days.

(21) Appl. No.: 13/705,723

(22) Filed: Dec. 5, 2012

(65) Prior Publication Data

US 2014/0154477 A1 Jun. 5, 2014

(51) Int. Cl.

| | |
|---|---|
| ***B65D 81/02*** | (2006.01) |
| ***B32B 3/30*** | (2006.01) |
| ***B29C 51/00*** | (2006.01) |
| ***B29C 51/14*** | (2006.01) |
| ***B65D 81/03*** | (2006.01) |

(52) U.S. Cl.

CPC . *B65D 65/44* (2013.01); *B32B 3/30* (2013.01); *B29C 51/002* (2013.01); *B29C 51/14* (2013.01); *B65D 81/03* (2013.01); *Y10T 428/24661* (2013.01)

(58) Field of Classification Search

CPC ........ B65D 71/03; B65D 1/038; B65D 81/03; B65D 65/44; B29C 51/002; B29C 51/14; B29C 65/02; B29C 65/00; B29C 66/71; B29C 66/73; B29C 66/733; B32B 33/00; B32B 3/30

USPC .................................................. 428/178, 158

See application file for complete search history.

(56) References Cited

U.S. PATENT DOCUMENTS

| | | | |
|---|---|---|---|
| 3,026,231 | A | 3/1962 | Chavannes |
| 3,142,599 | A | 7/1964 | Chavannes |
| 3,285,793 | A | 11/1966 | Chavannes |
| 3,294,387 | A | 12/1966 | Chavannes |
| 3,392,081 | A | 7/1968 | Chavannes |
| 3,416,984 | A | 12/1968 | Chavannes |
| 3,660,189 | A | 5/1972 | Troy |
| 3,756,884 | A | 9/1973 | Hagino |
| 3,817,803 | A | 6/1974 | Horsky |
| 4,181,548 | A | 1/1980 | Weingarten |

(Continued)

*Primary Examiner* — Aaron Austin
*Assistant Examiner* — Jasper Saberi
(74) *Attorney, Agent, or Firm* — Rupert B. Hurley, Jr.

(57) ABSTRACT

The cellular cushioning article comprises a thermoformed film bonded to a second film, with the thermoformed film having thermoformed regions separated by a land area. The thermoformed film has a combination of (i) a layer containing a high melt point polymer and (ii) thermoformed regions exhibit a high average maximum birefringence. The high birefringence corresponds with high stress on the polymer chains. The combination results in cells of substantially increased burst strength. The cellular cushioning article can provide higher burst strength per mil of film thickness, or can be produced using less plastic than prior art cellular cushioning articles, while maintaining the same or comparable burst strength. Also disclosed is a process for making the cellular cushioning article.

28 Claims, 22 Drawing Sheets

(56) References Cited

U.S. PATENT DOCUMENTS

| | | | |
|---|---|---|---|
| 4,184,904 | A | 1/1980 | Gaffney |
| 4,314,865 | A | 2/1982 | Ottaviano |
| 4,412,879 | A | 11/1983 | Ottaviano |
| 4,417,936 | A | 11/1983 | Gaffney |
| 4,894,265 | A | 1/1990 | Chang et al. |
| 5,196,254 | A | 3/1993 | Akiyama |
| 6,800,162 | B2 | 10/2004 | Kannankeril et al. |
| 7,018,495 | B2 | 3/2006 | Kannankeril et al. |
| 7,687,123 | B2 | 3/2010 | Broadus et al. |
| 2003/0161999 | A1 * | 8/2003 | Kannankeril et al. ........ 428/178 |
| 2011/0260354 | A1 * | 10/2011 | Ramli et al. ............... 264/171.1 |

* cited by examiner

AIR CELLULAR CUSHIONING ARTICLE OF ENHANCED STRENGTH PER UNIT WEIGHT OF FILM, AND PROCESS FOR MAKING SAME

BACKGROUND

The present invention is directed to the area of cellular cushioning articles, such as BUBBLE WRAP® cellular cushioning, and processes for making same, in which first and second multilayer films are joined together to form fluid-filled cells therebetween. More particularly, the present invention is directed to improved cellular cushioning articles, and to processes for making such improved articles.

Cellular cushioning material is used to package items, e.g., by wrapping the items in the cushioning material and placing the wrapped items in a shipping carton, or simply placing one or more cushions inside of a shipping carton along with an item to be shipped. Alternatively, the cushioning material may form the inside of a 'padded mailer,' which is a flexible mailing envelope to which a cushioning material is internally adhered, and in which an object to be mailed may be placed and sealed prior to deposit with a courier. In all of the foregoing applications, the cushioning material protects the packaged item by absorbing impacts that may otherwise be fully transmitted to the packaged item during transit, and also by restricting movement of the packaged item within the carton.

Commercial BUBBLE WRAP® brand cellular cushioning material utilizes two films that are laminated together. A first type of such cellular cushioning articles has a first film that is embossed, i.e., thermoformed in a manner to provide a plurality of protrusions when viewed from an outer side of the thermoformed film, the protrusions being pockets or cavities when viewed from an inner side of the thermoformed film. The protrusions may have a cylindrical (or hemispherical) shape, i.e., with a round "footprint", cylindrical, conic section, or hemispherical walls, and a flat top, domed top, or point top. The transition between the walls and the top can be provided with a radius. The inner surface of the unformed area (i.e., herein referred to as the "land area") of the thermoformed film is laminated to a second film that is a non-thermoformed, flat film, resulting in the encapsulation of a fluid (i.e., broadly including gas and/or liquid; preferably air) within each of the resulting fluid-filled cells. Each fluid-filled cell comprises the fluid encapsulated between a protrusion in the thermoformed film and a portion of the flat film that corresponds with the footprint of the protrusion. This first type of cellular cushioning is recognized as being of the "single cell" type.

A second type of cellular cushioning comprises a first film that is thermoformed with the plurality of protrusions as described above, with at least a portion of the land area of the first film thereafter being laminated to at least a portion of a land area of a second film that has also been thermoformed in a manner that results in a plurality of protrusions. The resulting cellular cushioning article is recognized as being of the "double cell" type.

In both the single-cell type cellular cushioning and double-cell type of cellular cushioning, each fluid-filled cell comprises the fluid therein plus the surrounding portion of the first and second films that are in contact with the fluid. When in use, any elastic and/or inelastic compressibility provided by the fluid in the fluid-filled cells, together with any elastic and/or inelastic extension of the surrounding film portions, can contribute to the cushioning function while the cell is under load.

Conventional methods of making cellular cushioning materials, such as BUBBLE WRAP® brand cellular cushioning, use a vacuum source to deform a heated polymer film to thermoform pockets that can be filled with fluid, e.g., air or other gas, and then sealed to a second film to produce fluid-filled cells. Such products can be made using a temperature-controlled drum having recesses connected to a vacuum source. When vacuum is applied to a heated film in contact with the drum, the regions of the film suspended over the drum recesses are drawn into the recesses. The film may be heated by the drum and/or may be heated prior to contact with the drum, e.g., due to recent emergence from an extrusion system. In either case, the film is maintained at a temperature to provide it with sufficient pliability to be drawn into the drum recesses, and also to bond to the second film. Those regions of the heated film which are drawn into the recesses are deformed and thinned by the vacuum drawing process. One side of the resulting thermoformed film offers a flat surface for lamination thereto, i.e., has a flat land area with spaced concavities from the forming process, while the other side does not offer a flat surface for lamination, but rather has formed protrusions thereon with a flat land area at the base of the protrusions, but which is unavailable for lamination due to the protrusions extending from the land area. A second film, which generally is a flat film, i.e., not thermoformed, is fused to the "flat side" of the formed film, more specifically to the land area portion of the formed film, resulting in a plurality of sealed, air-filled cells. The fusion of the first and second films generally occurs via heat-sealing.

Conventional cellular cushioning fabricating processes may also include as a first stage, a film extrusion step; as second stage, a film thermoforming step; and as a third stage, a film lamination step, with the stages being carried out in a single, integrated process, as disclosed in U.S. Pat. Nos. 3,294,387 and 6,800,162, both of which are hereby incorporated herein, in their entireties, by reference thereto. In the first stage, polymer films are extruded by conventional techniques known to those in the art of polymer film fabrication. In the second stage, one or both of the films are thermoformed by the vacuum forming technique described above, and two films are combined in the third stage to formed sealed, air-filled cells, according to heat sealing methods that are known to those in the art of polymer film sealing.

While BUBBLE WRAP® cushioning material has been made and used in a commercially-successful manner for a number of years, there remains a need for improvement. Specifically, there is a need to reduce the amount of polymer used to make the films from which the material is formed, while maintaining in such material sufficient cushioning performance to protect objects packaged in the material. Such a reduction in polymer usage would beneficially reduce the utilization of petroleum and natural gas resources, from which most of the polymers employed in cushioning materials are derived.

One way to reduce the amount of polymer used in one or both of the films is to improve the strength obtained from a film of a specified thickness. Providing a stronger film made from any given amount and type of polymer would allow the film to be downgauged while maintaining or improving the performance of the resulting cellular cushioning article.

Another way to reduce polymer usage is to substitute recycled polymer(s) for one or more "virgin" polymers (i.e., new or unused polymer), in the material with recycled polymer. However, as the use of recycled polymer in films has the potential to result in a degradation of the properties of such films and, thereby degrade the performance of cushioning materials made from such films, it would be desirable to enhance the relative amount of recycled polymer in the films without adversely affecting the performance of the resulting cushioning article.

Accordingly, a need exists in the art to reduce polymer usage in films from which the cushioning articles are made, both by producing a mil-for-mil stronger film using the same or similar polymers that have been used to make prior art cellular cushioning articles, as well as including recycled polymer in cellular cushioning materials in such a way that virgin polymer usage is reduced and cushioning properties are maintained or improved.

SUMMARY

The inventors have discovered a new air cellular product providing a substantial increase in cell burst strength per mil of film thickness. The burst strength is measured in pounds per square inch ("psi"). Burst strength was determined by inflating the cell until it bursts. The higher burst strength per mil of the new air cellular product enables stronger air cellular products for a specified amount and type of polymer, and also enables air cellular products having a burst strength comparable to prior art air cellular products made from the same combination of polymers, but utilizing substantially less polymer per unit volume of the cellular cushioning article. The substantial increase in burst strength per mil has been discovered to require the presence of at least one layer comprising a high melt point polymer, such as polyamide, polyester, and/or polyvinylidene chloride copolymer, polystyrene, polyimide, polycarbonate, polyacetal, poly vinyl alcohol (e.g., saponified ethylene/vinyl acetate copolymer), cyclic olefin copolymer. In addition to the presence of at least one layer comprising the high melt point polymer, the new air cellular product further requires the presence of polymer chains in a state of high stress in the thermoformed regions of the thermoformed film. This state of high stress is assessed by measurement of the maximum birefringence present in the discrete thermoformed regions of the thermoformed film. The combination of (a) polymer chains in a state of higher stress in a film having (b) at least one layer comprising the high melt point polymer, has been discovered to produce unexpected results beyond the sum of the combination of (a) and (b).

The inventors have also discovered a new process for making the air cellular product having higher burst strength per mil. The new process conducts a lower temperature thermoforming of the thermoformed film which contains a layer comprising a high melt point polymer. The result of the new process is a new cellular cushioning article possessing a substantially higher burst strength per mil, relative to cellular cushioning products of the prior art.

A first aspect is directed to a cellular cushioning article comprising a multilayer first film and a second film. The first film has a thermoformed portion comprising a plurality of discrete thermoformed regions separated by an unformed land area. Each discrete thermoformed region provides a discrete raised embossment. The second film has a bonded portion and an unbonded portion. The unbonded portion comprises a plurality of discrete unbonded regions. Each discrete unbonded region includes at least a portion juxtaposed opposite a base of each of the discrete thermoformed regions of the first film, with the bonded portion of the second film being bonded to at least a portion of the land area of the first film. The plurality of discrete thermoformed regions of the first film and a plurality of discrete unbonded regions of the second film together making up a plurality of discrete cells. Each cell surrounds a discrete volume of fluid entrapped between the first film and the second film. The first film has a bonding layer comprising polyolefin and a high melt point layer comprising at least one member selected from polyamide, polyester, polyvinylidene chloride, polystyrene, polyimide, polycarbonate, polyacetal, poly vinyl alcohol, and cyclic olefin copolymer. The cellular cushioning article has a combination of an average thickness of the land area of the first film, and an average maximum birefringence of the thermoformed regions of the first film, is a member selected from the group consisting of:

(A) average land area thickness of from 2.01 mils to 3 mils, and an average maximum birefringence of at least $6\times10^{-3}$ (or at least $7\times10^{-3}$, or at least $8\times10^{-3}$, or at least $9\times10^{-3}$, or at least $10\times10^{-3}$);

(B) average land area thickness of from 1.41 mils to 2 mils and an average maximum birefringence of at least $16\times10^{-3}$ (or at least $16.5\times10^{-3}$, or at least $17\times10^{-3}$, or at least $17.5\times10^{-3}$, or at least $18\times10^{-3}$);

(C) average land area thickness of from 1.01 mils to 1.40 mils and an average maximum birefringence of at least $17\times10^{-3}$ (or at least $17.5\times10^{-3}$, or at least $18\times10^{-3}$, or at least $18.5\times10^{-3}$, or at least $19\times10^{-3}$, or at least $19.5\times10^{-3}$, or at least $20\times10^{-3}$);

(D) average land area thickness of from 0.76 mil to 1.0 mil and an average maximum birefringence of at least $17\times10^{-3}$ (or at least $17.5\times10^{-3}$, or at least $18\times10^{-3}$, or at least $18.5\times10^{-3}$, or at least $19\times10^{-3}$, or at least $19.5\times10^{-3}$, or at least $20\times10^{-3}$, $17.5\times10^{-3}$, or at least $20.5\times10^{-3}$, or at least $21\times10^{-3}$); and (E) average land area thickness of from 0.45 mil to 0.75 mil and an average maximum birefringence of at least $17\times10^{-3}$ (or at least $17.5\times10^{-3}$, or at least $18\times10^{-3}$, or at least $18.5\times10^{-3}$, or at least $19\times10^{-3}$, or at least $19.5\times10^{-3}$, or at least $20\times10^{-3}$, $17.5\times10^{-3}$, or at least $20.5\times10^{-3}$, or at least $21\times10^{-3}$).

In an embodiment, the combination further comprises an average percent haze measured in accordance with ASTM D-1003, with the combination being a member selected from the group consisting of:

(A) average land area thickness of from 2.01 mils to 3 mils, an average maximum birefringence of at least $6\times10^{-3}$ (or alternative range above) and an average haze of less than 55 percent;

(B) average land area thickness of from 1.41 mils to 2 mils, an average maximum birefringence of at least $16\times10^{-3}$ (or alternative range above), and an average haze of less than 30 percent;

(C) average land area thickness of from 1.01 mils to 1.40 mils, an average maximum birefringence of at least $17\times10^{-3}$ (or alternative range above), and an average haze of less than 60 percent;

(D) average land area thickness of from 0.76 mil to 1.0 mil, an average maximum birefringence of at least $17\times10^{-3}$ (or alternative range above), and an average haze of less than 46 percent; and (E) average land area thickness of from 0.45 mil to 0.75 mil, an average maximum birefringence of at least $17\times10^{-3}$ (or alternative range above), and an average haze of less than 48 percent.

In an embodiment, the combination further comprises average cell volume and average burst strength, with the combination comprising a member selected from the group consisting of:

(A) average cell volume of from 5 to 15 $cm^3$, average land area thickness of from 2.01 mils to 3 mils, average maximum birefringence of at least $6\times10^{-3}$ (or alternative range above) and average burst strength of at least 3.7 psi (or at least 3.8 psi, or at least 3.9 psi, or at least 4.0 psi);

(B) average cell volume of from 5 to 15 $cm^3$, average land area thickness of from 1.41 mils to 2 mils, an average maximum birefringence of at least $16\times10^{-3}$ (or alternative range above), and an average burst strength of at least 3 psi (or at least 3.1 psi, or at least 3.2 psi, or at least 3.3 psi, or at least 3.4 psi, or at least 3.5 psi);

(C) average cell volume of from 1 to 15 $cm^3$, average land area thickness of from 1.01 mils to 1.40 mils, an average maximum birefringence of at least $17\times10^{-3}$ (or alternative range above), and an average burst strength of at least 2.4 psi (or at least 2.5 psi, or at least 2.6 psi, or at least 2.7 psi, or at least 2.8 psi, or at least 2.9 psi, or at least 3.0 psi);

(D1) average cell volume of from 0.15 to 0.99 $cm^3$, average land area thickness of from 0.76 mil to 1.0 mil, an average maximum birefringence of at least $17\times10^{-3}$ (or alternative range above), and an average burst strength of at least 6.5 psi (or at least 6.5 psi, or at least 6.6 psi, or at least 6.7 psi, or at least 6.8 psi, or at least 6.9 psi, or at least 7.0 psi, or at least 7.1 psi, or at least 7.2 psi, or at least 7.3 psi, or at least 7.4 psi, or at least 7.5 psi);

(D2) average cell volume of from 1.0 to 15 $cm^3$, average land area thickness of from 0.76 mil to 1.0 mil, average maximum birefringence of at least $17\times10^{-3}$ (or alternative range above), and an average burst strength of at least 2.0 psi (or at least 2.1 psi, or at least 2.2 psi, or at least 2.3 psi, or at least 2.4 psi, or at least 2.5 psi, or at least 2.6 psi, or at least 2.7 psi, or at least 2.8 psi, or at least 2.9 psi, or at least 3.0 psi);

(E1) average cell volume of from 0.15 to 0.99 $cm^3$, average land area thickness of from 0.45 mil to 0.75 mil, an average maximum birefringence of at least $17\times10^{-3}$ (or alternative range above), and an average burst strength of at least 6.5 psi (or at least 6.6 psi, or at least 6.7 psi, or at least 6.8 psi, or at least 6.9 psi, or at least 7.0 psi); and (E2) average cell volume of from 1.0 to 15 $cm^3$, average land area thickness of from 0.45 mil to 0.75 mil, average maximum birefringence of at least $17\times10^{-3}$ (or alternative range above), and an average burst strength of at least 1.7 psi (or at least 1.8 psi, or at least 1.9 psi, or at least 2.0 psi, or at least 2.1 psi, or at least 2.2 psi, or at least 2.3 psi, or at least 2.4 psi, or at least 2.5 psi).

In an embodiment, the cellular cushioning article has an average percent haze measured in accordance with ASTM D-1003, with the combination being a member selected from the group consisting of:

(A) average cell volume of from 5 to 15 $cm^3$, average land area thickness of from 2.01 mils to 3 mils, average maximum birefringence of at least $6\times10^{-3}$ (or alternative range above), average burst strength of at least 3.7 psi (or alternative range above), and average haze of less than 55 percent;

(B) average cell volume of from 5 to 15 $cm^3$, average land area thickness of from 1.41 mils to 2 mils, average maximum birefringence of at least $16\times10^{-3}$ (or alternative range above), average burst strength of at least 3 psi (or alternative range above), and average haze of less than 30 percent;

(C) average cell volume of from 1 to 15 $cm^3$, average land area thickness of from 1.01 mils to 1.40 mils, average maximum birefringence of at least $17\times10^{-3}$ (or alternative range above), average burst strength of at least 2.4 psi (or alternative range above), and average haze of less than 60 percent;

(D1) average cell volume of from 0.15 to 0.99 $cm^3$, average land area thickness of from 0.76 mil to 1.0 mil, average maximum birefringence of at least $17\times10^{-3}$ (or alternative range above), average burst strength of at least 7 psi (or alternative range above), and average haze of less than 46 percent;

(D2) average cell volume of from 1.0 to 15 $cm^3$, average land area thickness of from 0.76 mil to 1.0 mil, average maximum birefringence of at least $17\times10^{-3}$ (or alternative range above), and average burst strength of at least 3 psi (or alternative range above), and an average haze of less than 40 percent; and (E1) average cell volume of from 0.15 to 0.99 $cm^3$, average land area thickness of from 0.45 mil to 0.75 mil, average maximum birefringence of at least $17\times10^{-3}$ (or alternative range above), average burst strength of at least 6.5 psi (or alternative range above), and average haze of less than 48 percent; and (E2) average cell volume of from 1.0 to 15 $cm^3$, average land area thickness of from 0.45 mil to 0.75 mil, average maximum birefringence of at least $17\times10^{-3}$ (or alternative range above), average burst strength of at least 1.7 psi (or alternative range above), and average haze of less than 40 percent.

In an embodiment, the high melt point layer has a thickness of from 1 to 20 percent of the total film thickness, and the high melt point layer comprises the high melt point polymer in an amount of from 50 to 100 wt %, based on the weight of the high melt point layer. Alternatively, the high melt point layer can make up from 1 to 80 percent, or 1 to 70 percent, or from 1 to 60 percent, or from 1 to 50 percent, or from 1 to 40 percent, or from 1 to 30 percent, or from 1 to 25 percent, or from 2 to 10 percent, or from 2 to 9 percent, or 2.5 to 8 percent, or 3 to 7.5 percent, or 3.5 to 7 percent, or 4 to 6.5 percent, or 4.5 to 6.5 percent, or 5 to 6.5 percent, based on total film thickness. Alternatively, the high melt point polymer can be present in the high melt point layer in an amount of from 70 to 100 wt %, or 75 to 100 wt %, or 80 to 100 wt. %, or 85 to 100 wt %, or 90 to 100 wt. %, 95 to 100 wt %, or 98 to 100 wt. %, or 99 to 100 wt. %, or 100 wt. %, based on weight of the high melt point layer.

In an embodiment, the cellular cushioning article has cells having an average burst strength per mil of land area thickness of the first film, with the combination being a member selected from the group consisting of:

(A) average land area thickness of from 2.01 mils to 3 mils, average maximum birefringence of at least $6\times10^{-3}$ (or alternative range above), with the cells having an average burst strength per mil of land area thickness of the first film of at least 1.8 psi/mil;

(B) average land area thickness of from 1.41 mils to 2 mils and an average maximum birefringence of at least $16\times10^{-3}$ (or alternative range above), with the cells having an average burst strength per mil of land area thickness of the first film of at least 2.0 psi/mil;

(C) average land area thickness of from 1.01 mils to 1.40 mils and an average maximum birefringence of at least $17\times10^{-3}$ (or alternative range above), with the cells having an average burst strength per mil of land area thickness of the first film of at least 2.3 psi/mil;

(D1) average cell volume of from 0.15 to 0.99 $cm^3$, average land area thickness of from 0.76 mil to 1.0 mil and an average maximum birefringence of at least $17\times10^{-3}$ (or alternative range above), with the cells having an average burst strength per mil of land area thickness of the first film of at least 8.0 psi/mil; and (D2) average cell volume of from 1.0 to 15 $cm^3$, average land area thickness of from 0.76 mil to 1.0 mil and an average maximum birefringence of at least $17\times10^{-3}$ (or alternative range above), with the cells having an average burst strength per mil of land area thickness of the first film of at least 2.3 psi/mil; and (E1) average land area thickness of from 0.45 mil to 0.75 mil and an average maximum birefringence of at least $17\times10^{-3}$ (or alternative range above), with the cells having an average burst strength per mil of land area thickness of the first film of at least 12.0 psi/mil; and (E2) average cell volume of from 1.0 to 15 $cm^3$, average land area thickness of from 0.45 mil to 0.75 mil, average maximum birefringence of at least $17\times10^{-3}$ (or alternative range above), and an average burst strength of at least 2.3 psi.

In an embodiment of the cellular cushioning article, the thermoformed portion of the first film is a first thermoformed portion, and the plurality of discrete thermoformed regions of the first film provides a first plurality of discrete raised embossments, and the second film further comprises a second thermoformed portion, with a second plurality of discrete thermoformed regions of the second film providing a second plurality of raised embossments, with the first plurality of raised embossments extending in a first direction and the second plurality of raised embossments extending in a second direction, with the second direction being opposite the first direction. In an embodiment, the second plurality of raised embossments have bases of a size corresponding with a size of the bases of the first plurality of raised embossments, with the bases of second plurality of raised embossments being juxtaposed directly opposite the bases of the first plurality of raised embossments of the first film.

In an embodiment, the first film is a multilayer film and the second film is a multilayer film, and the first and second film have the same layer arrangement and the same layer composition. The first film can have a greater total film thickness than the second film. Alternatively, the first film and the second film can have the same total film thickness.

In an embodiment, the second film is a flat film, with the plurality of discrete unbonded regions of the flat film being juxtaposed directly opposite the bases of the first plurality of raised embossments of the first film, with the plurality of discrete thermoformed regions of the first film, in combination with the discrete unbonded regions of the flat film, together fully surrounding the plurality of discrete volumes of entrapped fluid, and wherein the entrapped fluid is air.

In an embodiment, the cellular cushioning article has cells having a cell height, with the combination being a member selected from the group consisting of:

(A) average cell volume of from 5 to 15 $cm^3$, average land area thickness of from 2.01 mils to 3 mils, average maximum birefringence of at least $6\times10^{-3}$ (or alternative range above), average burst strength of at least 3.7 psi (or alternative range above), and average cell height of at least 9 mm;

(B) average cell volume of from 5 to 15 $cm^3$, average land area thickness of from 1.41 mils to 2 mils, an average maximum birefringence of at least $16\times10^{-3}$ (or alternative range above), average burst strength of at least 3 psi (or alternative range above), and average cell height of at least 9 mm;

(C) average cell volume of from 1 to 15 $cm^3$, average land area thickness of from 1.01 mils to 1.40 mils, average maximum birefringence of at least $17\times10^{-3}$ (or alternative range above), average burst strength of at least 2.4 psi (or alternative range above), and average cell height of at least 5 mm;

(D1) average cell volume of from 0.15 to 0.99 $cm^3$, average land area thickness of from 0.76 mil to 1.0 mil, average maximum birefringence of at least $17\times10^{-3}$ (or alternative range above), average burst strength of at least 7 psi (or alternative range above), and average cell height of from 3 mm to 4.99 mm;

(D2) average cell volume of from 1.0 to 15 $cm^3$, average land area thickness of from 0.76 mil to 1.0 mil, average maximum birefringence of at least $17\times10^{-3}$ (or alternative range above), average burst strength of at least 2 psi (or alternative range above), and an average cell height of at least 5 mm; and (E1) average cell volume of from 0.15 to 0.99 $cm^3$, average land area thickness of from 0.45 mil to 0.75 mil, average maximum birefringence of at least $17\times10^{-3}$ (or alternative range above), average burst strength of at least 6.0 psi (or alternative range above), and average cell height of from 3 mm to 4.99 mm; and (E2) average cell volume of from 1.0 to 15 $cm^3$, average land area thickness of from 0.45 mil to 0.75 mil, average maximum birefringence of at least $17\times10^{-3}$ (or alternative range above), average burst strength of at least 1.7 psi (or alternative range above), and average cell height of at least 5 mm.

In an embodiment, the discrete thermoformed regions have a substantially uniform size and a substantially uniform shape.

In an embodiment, the high melt point layer of the first film is an internal film layer between the bonding layer of the first film and an outside layer of the first film, with the outside layer of the first film also comprising polyolefin, with the first film further comprising a first tie layer between the bonding layer and the high melt point layer and a second tie layer between the high melt point layer and the outer layer. The high melt point layer can comprise polyamide, including polyamide 6. The tie layers can comprise at least one member selected from the group consisting of ethylene/unsaturated ester copolymer, ethylene/unsaturated acid copolymer, or other suitable tie layer polymer. The bonding layer and can comprise at least one member selected from group consisting of linear low density polyethylene, low density polyethylene, very low density polyethylene, homogeneous ethylene/alpha-olefin copolymer, medium density polyethylene, and high density polyethylene. The outside layer of the first film can comprise at least one member selected from group consisting of linear low density polyethylene, low density polyethylene, very low density polyethylene, homogeneous ethylene/alpha-olefin copolymer, medium density polyethylene, and high density polyethylene.

The second film can also comprise a heat seal layer comprising polyolefin and a high melt point layer comprising at least one member selected from the group consisting of polyamide, polyester, and polyvinylidene chloride. The high melt point layer of the second film can also be an internal film layer between the heat seal layer of the second film and an outside layer of the second film. The outside layer of the second film can also comprise polyolefin, with the second film also further comprising a first tie layer between the heat seal layer and the high melt point layer, and a second tie layer between the high melt point layer and the outer layer.

In an embodiment, the first film is a multilayer film comprises at least one bulk layer and a microlayer section, the microlayer section comprising at least ten microlayers, wherein each of the microlayers and the bulk layer have a thickness such that the ratio of the thickness of any of the microlayers to the thickness of the bulk layer is at least about 1:2, and wherein at least one of the microlayers comprises recycled polymer. In an embodiment, the microlayer section comprises up to 70 percent of the total thickness of the film, and the microlayer section comprises up to 100 weight percent recycled polymer. In an embodiment, the first film further comprises a second bulk layer, and the microlayer section is between the first bulk layer and the second bulk layer.

The thermoformed film can comprise a multilayer film having a bulk layer and a microlayer section. The microlayer section can comprise at least ten microlayers. Each of the microlayers and the bulk layer can have thicknesses such that the ratio of the thickness of any of the microlayers is from 0.2% to 50% of the thickness of the bulk layer. The bulk layer can be a first bulk layer, with the thermoformed film further comprising a second bulk layer. The microlayer section can be disposed between the first and second bulk layers. The multilayer film can further comprise a third bulk layer. The third bulk layer comprises a barrier layer selected from the group consisting of a polymer or copolymer comprising polyamide, polyester, and/or polyvinylidene chloride copolymer, polystyrene, polyimide, polycarbonate, polyacetal, poly vinyl alcohol (e.g., saponified ethylene/vinyl acetate copolymer), cyclic olefin copolymer. At least one of the bulk layers can comprise at least one member selected from the group consisting of ethylene/alpha-olefin copolymer, polyethylene homopolymer, polypropylene homopolymer, and polypropylene copolymer.

At least one of the microlayers can comprise recycled polymer. The microlayer section can comprise up to 100 weight percent recycled polymer, or up to 80 wt %, or up to 70 wt %, or up to 60 wt %. The microlayer section can comprise up to 90 percent of the total thickness of the thermoformed film, or up to 80%, or up to 70%, or up to 60%, or up to 50%, or up to 40%, or up to 30%, or up to 20%, or up to 10%, of the total thickness of the thermoformed film. The microlayer section can comprise at least 15 microlayers, or at least 20 microlayers. The microlayers can have a thickness of from 0.001 to 0.1 mil. The one or more bulk layers can have a thickness of from about 0.01 to 2.5 mils. Each of the microlayers can have substantially the same thickness. Alternatively, at least one of the microlayers can have a thickness that is different from the thickness of at least one other microlayer.

Each of the microlayers can comprise substantially the same composition. Alternatively, two or more of said microlayers can have compositions that are different from each other. At least one of the microlayers can comprise a blend of two or more polymers. At least one of the microlayers can comprise at least one member selected from the group consisting of ethylene/alpha-olefin copolymer, polyethylene homopolymer, polypropylene homopolymer, and polypropylene copolymer.

A second aspect is directed to a process for making a cellular cushioning article. The process comprises (A) thermoforming a plurality of discrete regions of a first film to produce a plurality of discrete thermoformed regions which provide a plurality of raised embossments, with the discrete thermoformed regions being separated from one another by an unformed land area, with each of the raised embossments providing a discrete convex surface region on the top surface of the first film, and each of the raised embossments providing a discrete concave surface region on the bonding surface of the first film, with each of the discrete regions of the first film being thermoformed by being vacuum-drawn into a discrete cavity in a thermoforming mold, and (B) bonding a second film to at least a portion of the land area of the first film, with the plurality of discrete thermoformed regions of the first film together with a plurality of discrete unbonded regions of the second film together making up a plurality of discrete cells, with each cell surrounding a discrete volume of fluid entrapped between the first film and the second film. The first film has a heat seal layer comprising polyolefin and a high melt point layer comprising at least one member selected from polyamide, polyester, and polyvinylidene chloride, polystyrene, polyimide, polycarbonate, polyacetal, poly vinyl alcohol, and cyclic olefin copolymer, The process is carried out so that a combination of an average thickness of the land area of the first film, and an average maximum birefringence of the thermoformed regions of the first film, is a member selected from the group consisting of:

(i) average land area thickness of from 2.01 mils to 3 mils, and an average maximum birefringence of at least $6\times10^{-3}$ (or alternative range above);
(ii) average land area thickness of from 1.41 mils to 2 mils and an average maximum birefringence of at least $16\times10^{-3}$ (or alternative range above);
(iii) average land area thickness of from 1.01 mils to 1.40 mils and an average maximum birefringence of at least $17\times10^{-3}$ (or alternative range above);
(iv) average land area thickness of from 0.76 mil to 1.0 mil and an average maximum birefringence of at least $17\times10^{-3}$ (or alternative range above); and
(v) average land area thickness of from 0.45 mil to 0.75 mil and an average maximum birefringence of at least $17\times10^{-3}$ (or alternative range above).

In an embodiment, the process is an integrated process and further comprising: (C) extruding the first film through a first die before thermoforming the first film; (D) extruding the second film through a second die before the second film is bonded to the land area of the first film; and, (E) actively or passively cooling the first film to the temperature at which the thermoforming is conducted.

In an embodiment, the first film passes in a partial wrap around a tempering roller before the first film is thermoformed, and the process is carried out using a combination selected from the group consisting of:

(1) the tempering roller having a temperature of from 140° F. to 190° F. (or from 150° F. to 180° F. or from 155° F. to 175° F. or from 160° F. to 170° F.), with the first film having an average thickness, before thermoforming, of from 2.01 mils to 3 mils;
(2) the tempering roller having a temperature of from 180° F. to 215° F. (or from 185° F. to 210° F. or from 190° F. to 205° F. or from 190° F. to 200° F.) and the first film having an average thickness, before thermoforming, of from 1.41 mils to 2 mils;
(3) the tempering roller having a temperature of from 185° F. to 220° F. (or from 190° F. to 215° F. or from 195° F. to 210° F. or from 200° F. to 210° F.), and the first film having an average thickness, before thermoforming, of from 1.01 mils to 1.40 mils; and
(4) the tempering roller having a temperature of from 190° F. to 225° F. (or from 195° F. to 220° F. or from 200° F. to 215° F. or from 200° F. to 210° F.), and the first film having an average thickness, before thermoforming, of from 0.76 mil to 1.0 mil;
(5) the tempering roller having a temperature of from 195° F. to 240° F. (or from 200° F. to 230° F. or from 200° F. to 220° F. or from 205° F. to 215° F.), and the first film having an average thickness, before thermoforming, of from 0.45 mil to 0.75 mil.

In an embodiment, in the integrated process the first film contacts the tempering roller for a distance of at least 5 inches around the tempering roller.

In an embodiment, the tempering roller is a first tempering roller and after passing in partial wrap around the first tempering roller, the first film passes in partial wrap around a second tempering roller, and wherein the process is carried out using a combination selected from the group consisting of:

(1) the first tempering roller having a temperature of from 140° F. to 190° F. (or alternative range above), the second tempering roller having a temperature of from 140° F. to 190° F. (or alternative range above), and the first film having an average thickness, before thermoforming, of from 2.01 mils to 3 mils;

(2) the first tempering roller having a temperature of from 180° F. to 215° F. (or alternative range above), the second tempering roller having a temperature of from 180° F. to 215° F. (or alternative range above), and the first film having an average thickness, before thermoforming, of from 1.41 mils to 2 mils;

(3) the first tempering roller having a temperature of from 185° F. to 220° F. (or alternative range above), the second tempering roller having a temperature of from 185° F. to 220° F. (or alternative range above), and the first film having an average thickness, before thermoforming, of from 1.01 mils to 1.40 mils;

(4) the first tempering roller having a temperature of from 190° F. to 225° F. (or alternative range above), the second tempering roller having a temperature of from 190° F. to 225° F. (or alternative range above), and the first film having an average thickness, before thermoforming, of from 0.76 mil to 1.0 mil;

(5) the first tempering roller having a temperature of from 195° F. to 240° F. (or alternative range above), the second tempering roller having a temperature of from 195° F. to 240° F. (or alternative range above), and the first film having an average thickness, before thermoforming, of from 0.45 mil to 0.75 mil.

In an embodiment, the first tempering roller is run at a first surface speed and the second tempering roller is run at a second surface speed, and the second surface speed is at least 10 percent higher than the first surface speed. In an embodiment, the second tempering roller has a surface speed of from 50 to 250 meters per minute.

DETAILED DESCRIPTION

Figure 1:
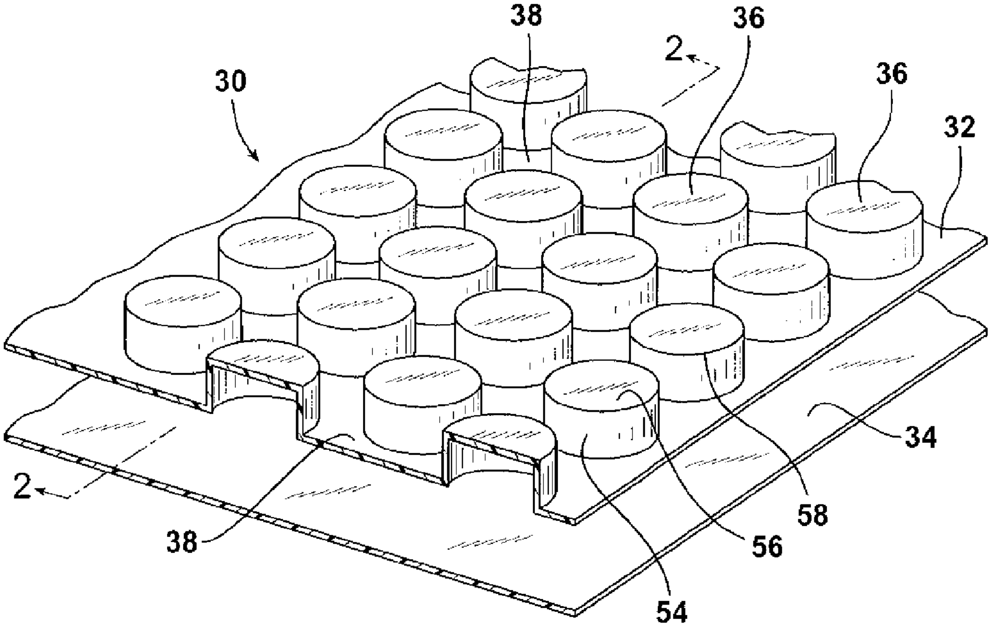
FIG. 1 is an exploded perspective view of a schematic of a cellular cushioning article.

As used herein, the term "fluid" refers to any material or substance that changes shape or direction uniformly in response to an external force imposed upon it, including liquids, gases, and finely divided solids. The term "liquid" applies to a composition in the liquid state, and the term "gas" refers to a composition in the gaseous state. Preferably, the fluid is compressible, and preferably, the fluid comprises gas. Air is a preferred gas.

As used herein, the term "film" is inclusive of plastic web, regardless of whether it is film or sheet. The film can have a total thickness of 0.25 mm or less, or a thickness of from 0.2 mil to 30 mils, from 0.3 to 15 mils, from 0.3 mil to 13 mils, from 0.3 to 12 mils, from 0.3 mil to 11 mils, or from 0.3 to 10 mils, or from 0.3 to 9 mils, or from 0.3 to 8 mils, or from 0.3 to 7 mils, or from 0.3 to 6 mils, or from 0.3 to 5 mils, or from 0.3 to 4 mils, or from 0.3 to 3 mils, or from 0.3 to 2.8 mils, or from 0.3 to 2.6 mils, or 0.4 to 2.2 mils.

As used herein, the phrases "seal layer," "sealing layer," "heat seal layer," and "sealant layer," refer to an outer film layer, or layers, involved in heat sealing the film to itself, another film layer of the same or another film, and/or another article which is not a film. Heat sealing can be performed in any one or more of a wide variety of manners, such as contact of two heat seal layers together with at least one layer being at or above its fusion temperature, melt-bead sealing, thermal sealing, impulse sealing, ultrasonic sealing, hot air sealing, hot wire sealing, infrared radiation sealing, ultraviolet radiation sealing, electron beam sealing, etc.).

As used herein, the phrase "outer film layer" and "outer layer", refers to a layer of a multilayer film that has only one principal surface bonded to another layer of the multilayer film.

As used herein, the phrase "inner film layer" and the phrase "internal film layer", refer to a layer of a multilayer film that has both of its principal surfaces bonded to another layer of the multilayer film.

As used herein, the phrase "outside layer" refers to an outer layer of a multilayer film that is an outside layer of a cellular cushioning article. For example, a cellular cushioning article consisting of a multilayer thermoformed film bonded to a multilayer backing film has two outside layers, i.e., the top layer of the multilayer thermoformed film and the bottom layer of the multilayer backing film. As used herein, the phrase "outside surface" refers to an outside surface of an outside layer.

As used herein, the phrase "inside layer" refers to an outer layer of a multilayer film that serves as an inside layer in the cellular cushioning article. For example, a cellular cushioning article consisting of a multilayer thermoformed film bonded to a multilayer backing film has two inside layers, i.e., the bonding layer of the multilayer thermoformed film and the bonding layer of the multilayer backing film. Each of these layers face internally, i.e., toward the other film of the article. As used herein, the phrase "inside surface" refers to an outer surface of an inside layer.

As used herein, the term "bond" includes direct bond and indirect bonds. Direct bonds include welds, such as heat welds, heat seals, electrostatic bonding, etc., in which only the layers bonded together are present, with no additional substance therebetween. Indirect bonds include bonds made using an additional substance, such as an adhesive.

As used herein, the phrase "bonding layer" refers to an outer film layer which is directly or indirectly bonded to another object or component, e.g., a monolayer film or a bonding layer of a multilayer film. As used herein, the phrase "bonding surface" refers to the surface of the bonding layer on the side of the bond. As used herein, the phrase "bonded portion" refers to that portion of a bonding layer that is bonded to another film. As used herein, the phrase "bonded area" refers to the area of the bonding surface that is bonded to another film. As used herein, the phrase "unbonded portion" refers to the portion of the bonding surface that is not bonded to another film. As used herein, the phrase "unbonded area" refers to area if the bonding surface that is not bonded to another film.

As used herein, the phrase "flat film" refers to a film that can be laid flush with a flat surface, i.e., a film that has not been thermoformed.

As used herein, the term "polymer" is inclusive of homopolymer, copolymer, terpolymer, etc. "Copolymer" includes copolymer, terpolymer, etc. As used herein, terms such as "polyamide", "polyolefin", "polyester", etc are inclusive of homopolymers of the genus, copolymers of the genus, terpolymers of the genus, etc, as well as graft polymers of the genus and substituted polymers of the genus (e.g., polymers of the genus having subsistent groups thereon).

As used herein, the phrase "basis weight" refers to the weight in grams of a 12 square foot sample of the cellular cushioning article.

As used herein, the phrase "machine direction" refers to the direction along a film corresponding with the direction of polymer movement during extrusion from a die. Most films contain "die lines" in the machine direction. Machine direction is also expressed herein as "MD."

As used herein, the phrase "transverse direction" refers to the direction along a film that is perpendicular to the machine direction. Transverse direction is also expressed herein as "TD."

As used herein, the term "footprint" refers to the area of the cell at that portion of the cell formed at point at which the forming cavity intersects with the outside surface of the forming member, such as a forming drum. The footprint corresponds with the base of the cell.

As used herein, the phrase "substantially uniform shape" refers to thermoformed regions having no hernias that are readily apparent to the naked eye of an observer. "Substantially uniform size" refers to a plurality of thermoformed regions in which all thermoformed regions have substantially the same degree of thermoforming (i.e., substantially the same volume) upon viewing by the naked eye of an observer, i.e., that no thermoformed region exhibits substantially less thermoforming than any other thermoformed region of the cellular cushioning article. Also, the cells can have a substantially consistent base area (i.e., "footprint"), a substantially consistent base shape, a substantially consistent angle between wall and land area, a substantially consistent wall shape, a substantially consistent wall height, a substantially consistent wall area, a substantially consistent top shape, a substantially consistent top height, a substantially consistent top area In each case, "substantially consistent" refers to a level of consistency that an ordinary observer would not, with the naked eye, notice that one or more thermoformed regions are substantially different from a remainder of the thermoformed regions.

One or more of the films in the cellular cushioning article can contain one or more of the following: slip agent, tackifier, antiblocking agent, calcium carbonate, fluoropolymer processing aid, etc.

Figure 2:
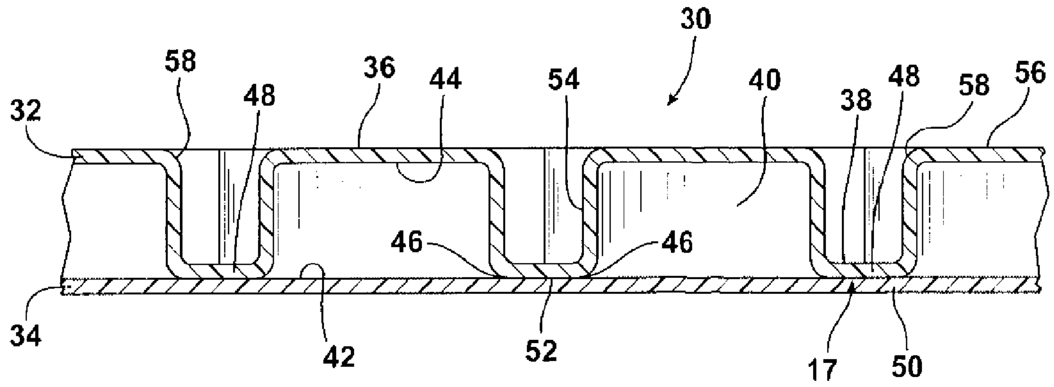
FIG. 2 is a cross-sectional view through section 2-2 in FIG. 1.

FIG. 1 is an exploded perspective view of a schematic of a cellular cushioning article 30. FIG. 2 is a cross-sectional view of assembled cellular cushioning article 30, taken through section 2-2 of FIG. 1. Viewing FIG. 1 and FIG. 2 together, cellular cushioning article 30 includes first film 32 and second film 34. Second film 34, herein also referred to the "backing film," is a flat film, i.e., not thermoformed. First film 32, hereinafter also referred to as the "thermoformed film," has discrete thermoformed regions 36, each of which has a generally circular cross-section, i.e., a circular "footprint." Moreover, the spacing of thermoformed regions 36 is such that cellular cushioning article 30 is capable of providing flexible cushioning for an object to be surrounded thereby, or otherwise in close contact therewith.

As shown, second film 34 is adhered to first film 32 at land area 38 such that first and second films 32, 34 together form a plurality of discrete cells 40 enclosed by the plurality of inside surfaces 44 of each discrete thermoformed region 36 together with the corresponding plurality of inside surfaces of discrete regions 42 of second film 34 that remain unbonded to first film 32 and are juxtaposed opposite each discrete thermoformed region 36, together with the plurality of discrete edge regions 46 of the bond between first film 32 and second film 34.

Inside surface 48 of land area 38 of thermoformed film 32 is bonded to inside surface 50 of second film 34 at bond 52. Bond 52 is a hermetic bond that can be a heat weld, i.e., heat seal, or can be made using an adhesive applied to inside surface 48 of land area 38 and/or to the inside surface 50 of backing film 34. Hermetic bond 52 provides an airtight closure to ensure that cells 40 retain the fluid entrapped therein as land area 38 of first film 32 is bonded to inside surface 50 of second film 34 to produce bond 52. The fluid entrapped in cells 40 can be gas or liquid. In each of Examples 1-81 below, the fluid is air.

The plurality of discrete thermoformed regions 36 in first film 32 may be made of any desired shape or configuration, with uniform or tapered walls. In various embodiments made using vacuum to draw the regions into a cavity of a forming drum, the film thickness in thermoformed regions 36 tapers, with the thinnest film being in the region in which side wall 54 transitions into top surface 56, i.e., a "rim" region 58. This thinning down of the film is not illustrated in FIG. 2. Alternatively, the thinnest portion of the film in the thermoformed region can be that portion of the thermoformed region that is farthest from the second film 34, as discussed in the above-incorporated U.S. Pat. No. 3,294,387, which is hereby incorporated, in its entirety, by reference thereto. Although thermoformed regions 36 are illustrated with a circular cross-sectional shape and a flat top, other shapes, e.g., a domed top, a half sphere or other portion of a sphere, are possible.

First film 32 may have a thickness (before thermoforming) of from about 0.5 to 10 mils, such as from 1 to 5 mils, 1 to 4 mils, etc. When second film 34 is not thermoformed, it may have a thickness of from about 0.05 to 3 mils, such as from 0.1-2 mils, 0.2 to 1 mil, etc. When second film 34 is thermoformed, its thickness may be the same or similar to first film 22, e.g., within the ranges as described immediately above relative to film 32.

Thermoformed regions 36 may have a height of from about 1 mm to 30 mm, or 6 to 13 mm, and a diameter (or major dimension) of from 2 mm to 80 mm, or from 4 mm to 35 mm. As the height and diameter of thermoformed regions 36 pockets is increased, the thickness of the land area of first film 32 may also be increased, and the thickness of flat second film 34 may also be increased.

First film 32 can be thicker (before thermoforming) than second film 34. First film 32 may have a fairly thin gauge, e.g., 0.1 to 0.5 mils, while the second film 14 may be relatively thicker and/or stiffer to lend support for the structure. Thus, any number of variations may be made in the thickness of the sealed films and the size and configuration of the formed portions, in order to attain any desired shock absorbing action.

Figure 3:
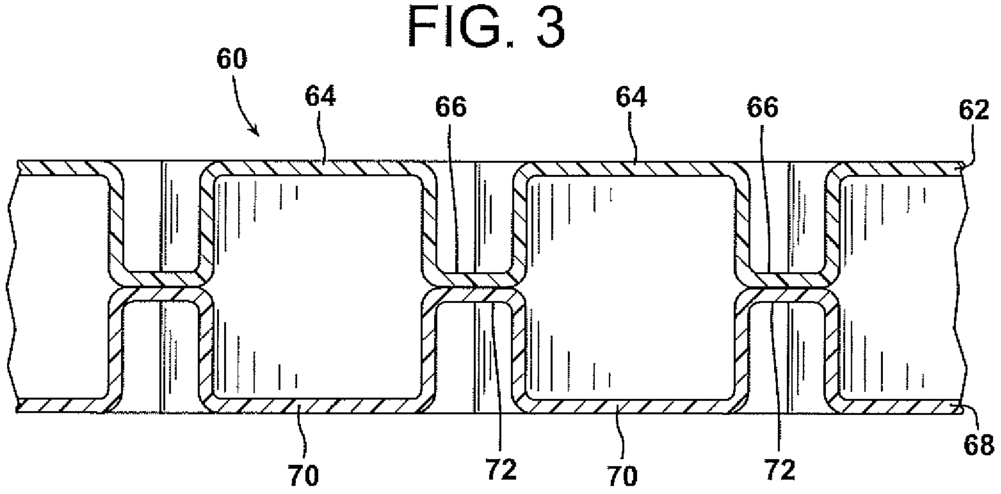
FIG. 3 is an exploded perspective view of a schematic of an alternative cellular cushioning article.

FIG. 3 is a cross-sectional view of an alternative cellular cushioning article 60, in which first film 62 has a plurality of discrete thermoformed regions 64 separated by a continuous land area 66, and second film 68 also has a plurality of discrete thermoformed regions 70 separated by a continuous land area 72. Land area 66 of first film 62 is bonded to land area 72 of second film 60. Cellular cushioning article 60 is herein referred to as a "double-cell" cellular cushioning article, while cellular cushioning article 30 of FIGS. 1 and 2 is herein referred to as a "single-cell" cellular cushioning article.

Figure 4A:
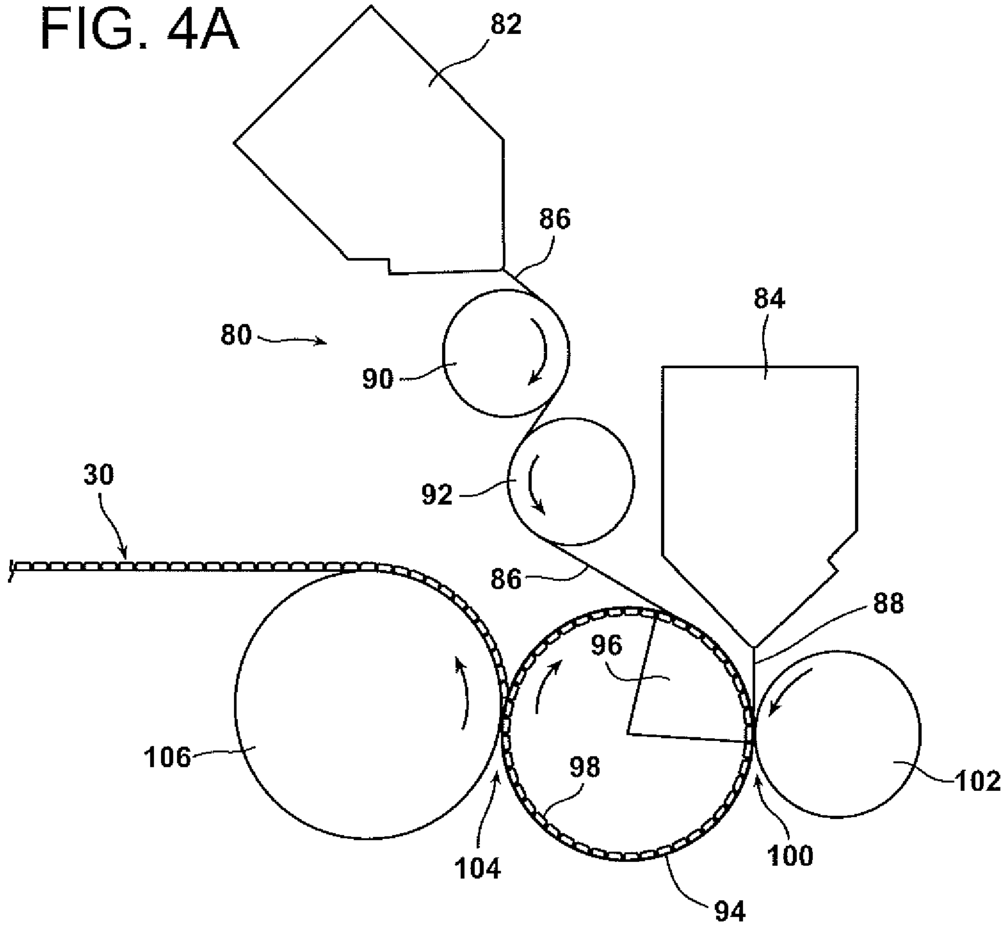
FIG. 4A is a schematic of an integrated process for making a cellular cushioning article.
Figure 4B:
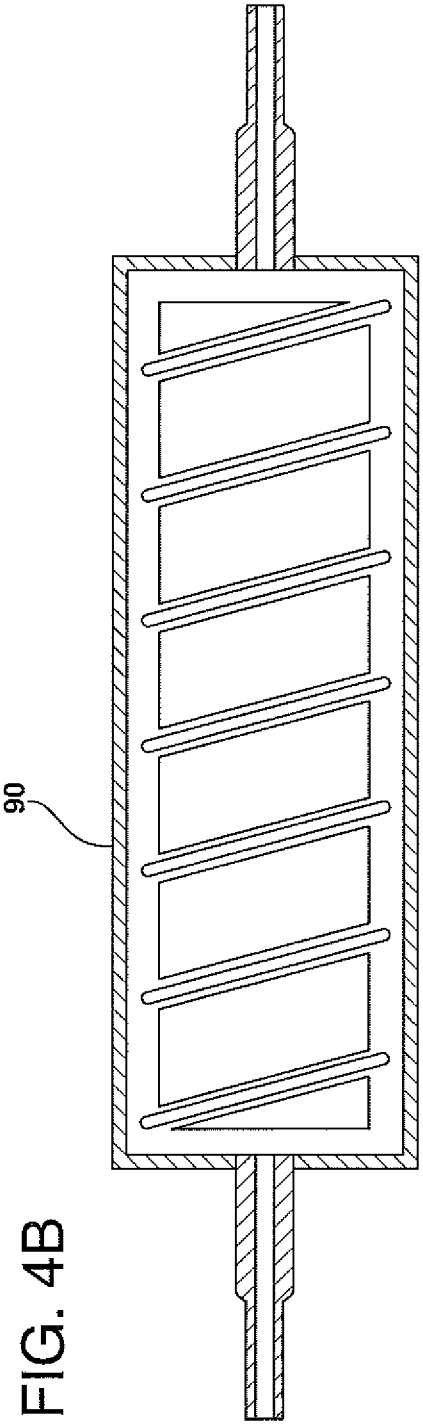
FIG. 4B is a longitudinal cross-sectional view of a tempering roller used in the process of FIG. 4A.

FIG. 4A is a schematic of an apparatus and process 80 for manufacturing the cellular cushioning material shown in FIGS. 1 and 2. In FIG. 4A, extrusion systems 82 and 84 extrude first film 86 and second film 88, respectively. After extrusion, first film 86 makes a partial wrap around tempering rollers 90 and 92, which may have a diameter of, e.g., 8 inches (i.e., 203 mm), and which serve to cool the first film and/or otherwise regulate the temperature of the first film so that it is at a desired temperature when it contacts thermoforming drum 94. Tempering rollers 90 and 92 are hollow. The flow of heat relative to one or both of tempering rollers 90 and 92 was controlled by controlling the temperature of liquid (e.g., water or oil) flowing through one or both of tempering rollers 90 and 92. For example, the water or oil flowing through the tempering rollers can be cooled (or heated) so as to enter tempering roller 90 and/or 92 at a temperature of from 40° F. to 350° F. during the process of manufacturing the cellular cushioning article. The heat flow is also affected by the rate of flow of liquid through tempering rollers 90 and/or 92. Details regarding the tempering rollers are provided in the examples below. The temperature of a tempering roller is herein designated as the temperature of the water or other fluid as it enters the tempering roller. The tempering rollers can be used to cool the film to the solid state while also keeping the film hot enough to undergo thermoforming upon contact with vacuum forming drum 94. FIG. 4B is a longitudinal cross-sectional view of tempering roller 90 illustrated in FIG. 4A. Tempering rollers 90 and 92 can be identical or different.

Returning to FIG. 4A, upon exiting contact with second tempering roller 92, first film 86 is forwarded into contact with vacuum forming drum 94, which may be maintained at a temperature sufficient to permit first film 86 to (a) be thermoformed, (b) bond with second film 88, and (c) release (i.e., without sticking) from the surface of the forming drum 94. Often, a relatively moderate temperature, e.g., around 100° F. to 120° F. (higher temperature for larger cell volume and/or thicker thermoformed films), will suffice for the foregoing purposes, depending on a number of factors, including the temperature of first film 86 as it exits second tempering roller 92, the thickness and composition of the first film 86, the temperature of second film 88 when it contacts the inside surface of the land area of first film 86 after first film is thermoformed on forming drum 94, as may be readily and routinely determined by those having ordinary skill in the art of cellular cushioning manufacture. First film 86 may contact forming drum 80 over at least a portion, but generally all, of vacuum zone 96, during which time a plurality of discrete regions of first film 86 are drawn by vacuum into a plurality of discrete forming cavities in the surface of forming drum 94, thereby producing the plurality of discrete thermoformed regions 36 in first film 32, as illustrated in FIG. 1 and FIG. 2. The size and shape of the cavities 98 in forming drum 94 control the size and shape of the thermoformed regions 36 on first film 32.

As illustrated in FIG. 4, vacuum zone 96 is applied from inside forming drum 94, and may be constantly applied to that portion of forming drum 94 which is in the position illustrated in FIG. 4. That is, as forming drum 94 rotates, vacuum may be applied to the running portion of forming drum 94 which is over vacuum zone 96, such that vacuum zone 96 may be a fixed vacuum zone relative to the surface of forming drum 94, which continuously moves past/over fixed vacuum zone 96.

As the now-thermoformed first film 86 proceeds through nip 100 between forming drum 94 and pressure roller 102, it is merged with second film 88, which remains hot from having been extruded shortly before contacting first film 86. While in nip 100, first and second films 86 and 88 are pressed together while hot. The pressing together of films 86 and 88, together with continued and/or prior heating of films 86 and/or 88 as they together pass about half way around heated forming drum 94, and through second nip 104 between forming drum 94 and take-away roller 106, results in hermetic heat-seal 52 between the land area of the now thermoformed first film 86 and a corresponding portion of unformed second film 88, resulting in cellular cushioning article 30 (same in FIG. 4 as in FIGS. 1 and 2). Take-away roller 106 pulls air cellular article 30 out of and off of forming roller 94.

Figure 5:
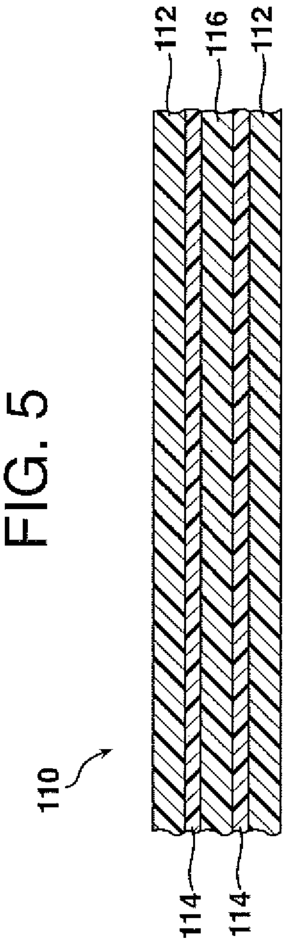
FIG. 5 is a schematic cross-sectional view of a multilayer film for use in a cellular cushioning article.

FIG. 5 illustrates a barrier film 110 for use in a cellular cushioning article. Barrier film 110 can be used for the thermoformed film and the backing film, or for just the backing film. In a double bubble cellular cushioning article as illustrated in FIG. 3, barrier film 110 can be used for both films. Barrier film 110 can have an A/B/C/B/A structure, with "A" layers 112 serving as heat seal and abuse layers (i.e., inside and outside layers, relative to cells in the cushioning article), and can together making up a majority of the total thickness of each film, e.g., from about 75-95% of the total thickness of barrier film 110. Each of "B" layers 114 serves as a tie layer, and each B layer 114 makes up a minority of the total thickness of barrier film 110, e.g., from about 0.1-5% of the total thickness of barrier film 110. "C" layer 116 contains a high melt point polymer, i.e., higher than the melting point of layers 112 and 114, and serves as a gas barrier layer. C layer 116 also makes up a minority of the total thickness of barrier film 110, e.g., from about 0.1-25% of the total film thickness.

A layers 112 are generally made from polyolefins, such as a blend of polyethylene copolymer, e.g., linear low density polyethylene, and polyethylene homopolymers, e.g., low density polyethylene. B layers 114 are generally formed from a conventional anhydride-modified polyolefin, such as anhydride-modified linear low density polyethylene. C layer 116 is generally made of a gas-barrier polymer, such as polyamide, polyester, and/or polyvinylidene chloride copolymer, polystyrene, polyimide, polycarbonate, polyacetal, poly vinyl alcohol (e.g., saponified ethylene/vinyl acetate copolymer), cyclic olefin copolymer.

As illustrated in FIG. 5, each of layers 112, 114, and 116 are "bulk layers", i.e., they are not composed of two or more microlayers. In the alternative film embodiment illustrated in FIG. 6, alternative film 120 has outer A layers 122 and 124 that are analogous to the A layers of barrier film 110 of FIG. 5. Alternative film 120 further contains first and second tie layers 126 and 128 that are analogous to the B layers of barrier film 110 of FIG. 5. Alternative film 120 further contains barrier layer 130 that is analogous to the C layer of barrier film 110 of FIG. 5. In addition, alternative film 120 further comprises set 132 of microlayers 134.

Alternative film 101 may be used for the thermoformed film(s) and/or for the backing film. The thermoformed film and/or the backing film may comprise one or more microlayer sections, e.g., at least a first bulk layer 103 and a microlayer section 113. Microlayer section 113 comprises at least ten microlayers 115, such as at least 15 microlayers, at least 20 microlayers, at least 25, 30, 35, 40, 45, or 50 microlayers, or more than 50 microlayers, e.g., numbering in the hundreds or even thousands, as desired. In the embodiment illustrated in FIG. 6, microlayer section 113 has twenty-five microlayers. This number is for illustration purposes only. Any number of microlayers may be included in the microlayer section 113 of the thermoformed film and/or the backing film used in the cellular cushioning article of the invention.

"Microlayers" are thin, generally very thin, in relation to conventional or "bulk" layers, with the thermoformed film and/or the backing film optionally including a combination of both types of layers. This relationship may be expressed mathematically, e.g., as a ratio, given that each of the microlayers 115 and bulk layers 103, 105, 107, 109, and 111 have a thickness. The ratio of the thickness of any of the microlayers 50 to the thickness of any one or more of bulk layers 103, 105, 107, 109, and/or 111 can be, for example, at least about 1:2, or alternatively, such as at least about 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, etc., for example ranging from 1:2 to 1:50, from 1:3 to 1:40, from 1:4 to 1:35, from 1:5 to 1:30, etc.

Microlayer section 113 may be positioned as a core component of the film, with one or more bulk layers as outer layers and/or as additional core components of the thermoformed film(s) and/or the backing film of the cellular cushioning article.

Generally, in the production of multilayer films in accordance with the present invention, the layers of the film, including both bulk layers and/or microlayers, may comprise one or more thermoplastic polymers, i.e., alone or as a blend of two or more polymers. Examples of such polymers include polyolefins, polyesters (e.g., PET and PETG), polystyrenes, (e.g., modified styrenic polymers such as SEBS, SBS, etc.), polyamide homopolymers and copolymers (e.g. PA6, PA12, PA6/12, etc.), polycarbonates, etc. Within the family of polyolefins, various polyethylene homopolymers and copolymers may be used, as well as polypropylene homopolymers and copolymers (e.g., propylene/ethylene copolymer). Polyethylene homopolymers may include low density polyethylene (LDPE) and high density polyethylene (HDPE). Suitable polyethylene copolymers may include a wide variety of polymers, such as, e.g., ionomers, ethylene/vinyl acetate (EVA), ethylene/vinyl alcohol (EVOH), and ethylene/alpha-olefins, including heterogeneous (Zeigler-Natta catalyzed) and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, including linear low density polyethylene (LLDPE), linear medium density polyethylene (MDPE), very low density polyethylene (VLDPE), and ultra-low density polyethylene (ULDPE). Materials that present a barrier to the passage of oxygen therethrough, such as polyamide, polyester, and/or polyvinylidene chloride copolymer, polystyrene, polyimide, polycarbonate, polyacetal, poly vinyl alcohol (e.g., saponified ethylene/vinyl acetate copolymer), cyclic olefin copolymer, may also be included.

Specific examples of suitable polymers and combinations thereof in various multi-segment films are set forth in the Examples below.

Bulk layers 103 and/or 105 may, in particular, comprise at least one polymer selected from ethylene/alpha-olefin copolymer (e.g., LLDPE, VLDPE, etc.), polyethylene homopolymer (e.g., LDPE or HDPE), polypropylene homopolymer, and polypropylene copolymer (e.g., propylene/ethylene copolymer).

Similarly, if the film comprises a section of microlayers, the each microlayer of at least one section of microlayers (e.g., microlayers 115 in microlayer section 113 of FIG. 6) may comprise at least one polymer selected from ethylene/alpha-olefin copolymer (e.g., LLDPE, VLDPE, etc.), polyethylene homopolymer (e.g., LDPE or HDPE), polypropylene homopolymer, and polypropylene copolymer (e.g., propylene/ethylene copolymer).

The thermoformed film(s) and/or the backing film may further include one or more additional bulk layers, such as disposed between either or both outer bulk layers and an internal bulk layer, or between the either or both outer bulk layers and an internal microlayered section. Additional bulk layers may serve functions such as tie layers, barrier layers, strength layers, etc. Tie layers can be provided on each side of a barrier layer to facilitate adhesion of the tie layer to the remainder of the film.

Figure 7:
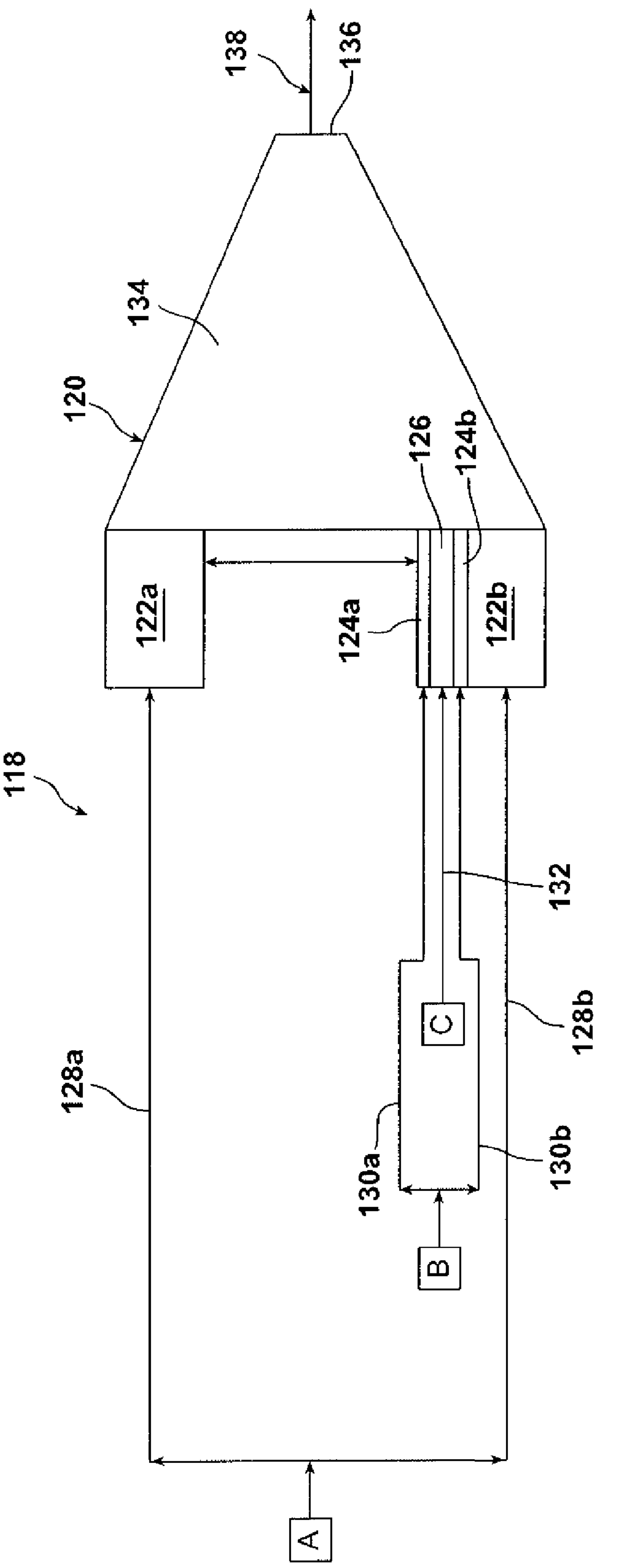
FIG. 7 is a schematic of an extrusion system (i.e., melt distribution system) for use in a process for making a film for use in a cellular cushioning article, such as the film of FIG. 5.

FIG. 7 schematically illustrates a suitable extrusion system 118 for producing, for example, the ABCBA film of FIG. 5, which contains bulk layers 112, 114, and 116. Extrusion system 118 includes multilayer coextrusion die 120, first extruder "A" to produce outer bulk A layers 112, second extruder "B" to produce tie B layers 114, and third extruder "C" to produce barrier layer 116. Coextrusion die 120 may include feedblocks 122*a* and 122*b* to receive molten polymer from extruder A, feedblocks 124*a* and 124*b* to receive molten polymer from extruder B, and feedblock 64 to receive molten polymer from extruder C, and feedblock 126, along with layer-multiplier module 66, to receive molten polymer from extruders D1 and D2.

The output from extruder A is split, e.g., evenly, and travels through conduits 128*a* and 128*b* to simultaneously supply polymer to both feedblock 122*a* and 122*b*, such that the composition of the outer bulk A layers is the same. Similarly, the output from extruder B is split, e.g., evenly, via conduits 130*a* and 130*b* to form a pair of tie layers B, when needed, in order to adhere the barrier layer, which is produced from extruder C via conduit 132, to the adjoining layers in the film. As noted above, this may be necessary when the barrier layer is formed from a polymer having oxygen-barrier functionality, such as polyamide, polyester, polyvinylidene chloride, or EVOH.

The feedblocks 128*a*, 128*b*, 130*a*, 130*b*, and 132 convert the molten polymer received from the associated extruders A, B, and C into molten polymer layers, which are then gathered and combined by combining unit 134 to form the final multilayer film 12 and/or 14, which emerges from combining unit 134 via die slot 136 as coextrudate stream 138.

Figure 6:
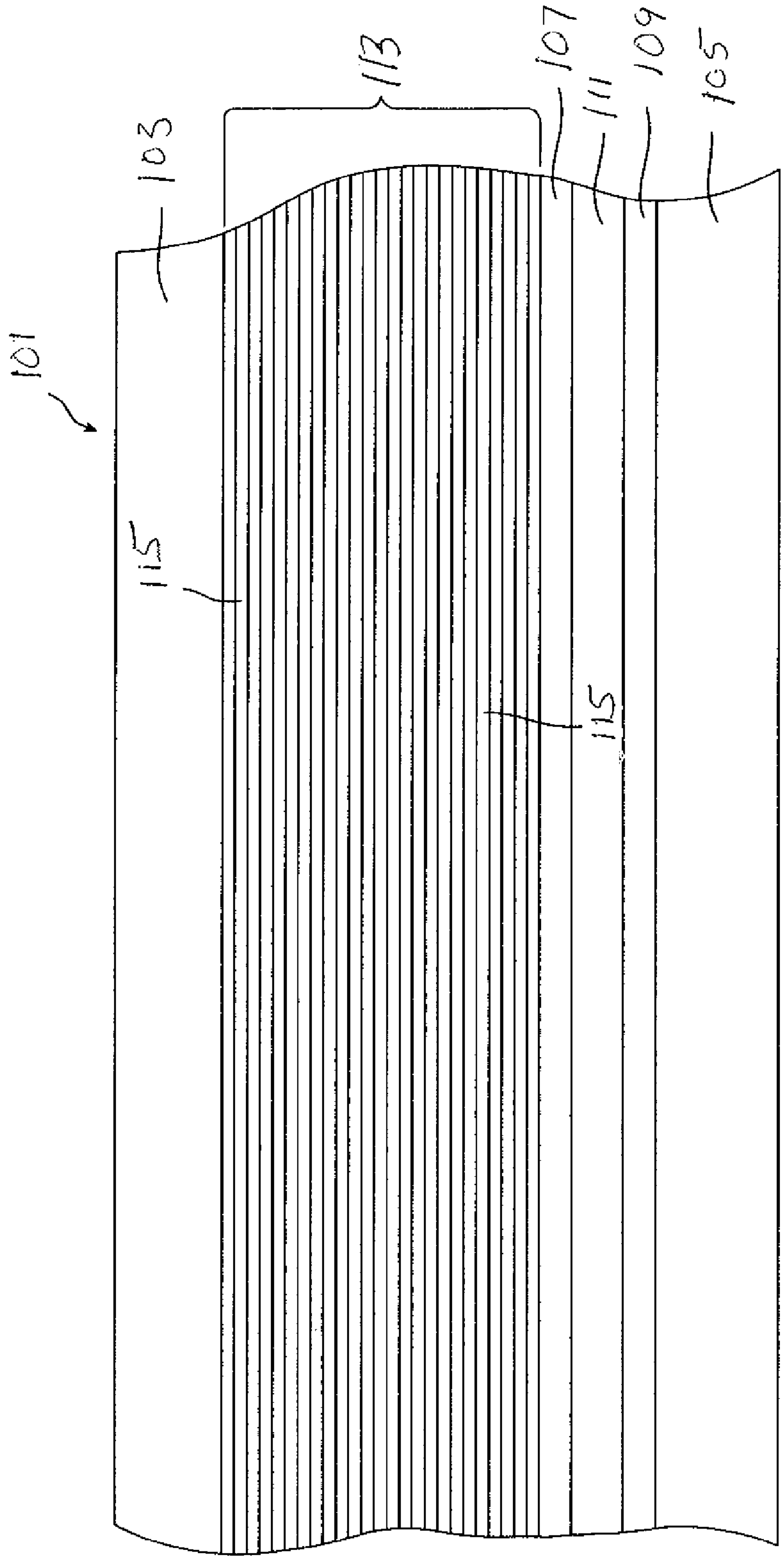
FIG. 6 is a schematic cross-sectional view of an alternative multilayer film for use in a cellular cushioning article.
Figure 8:
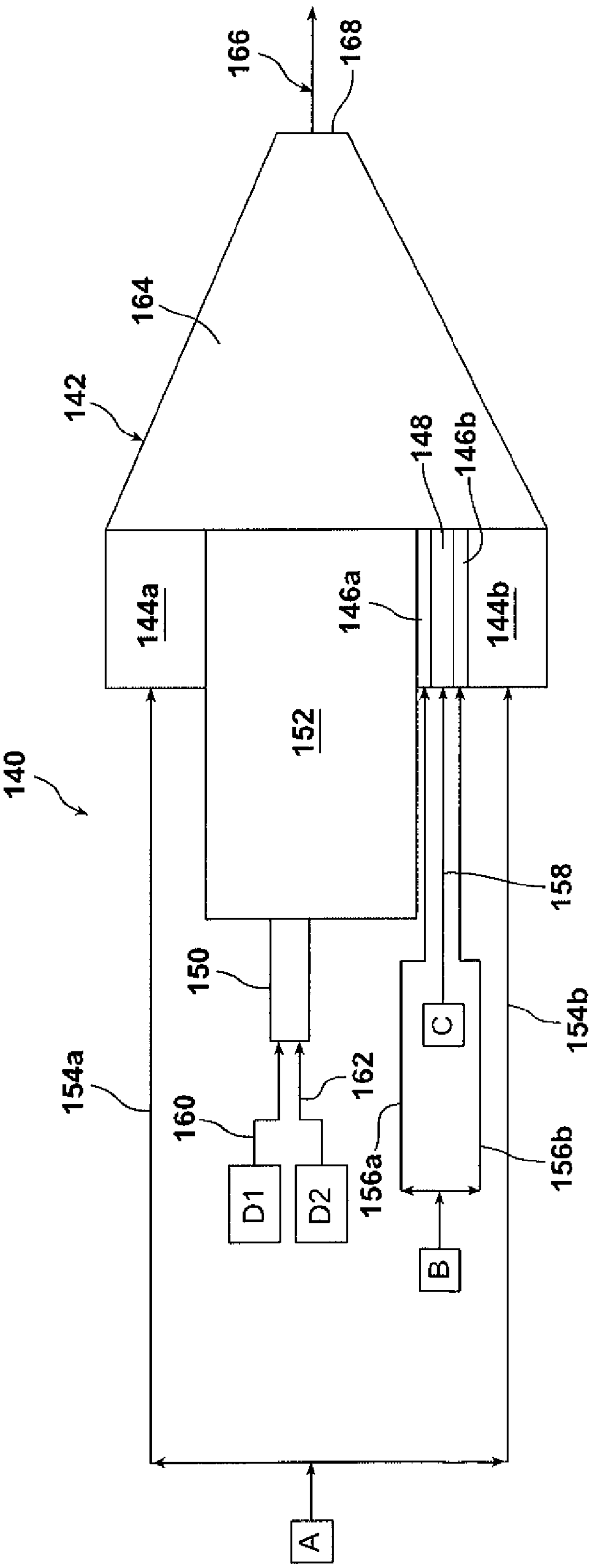
FIG. 8 is a schematic of an alternative extrusion system (i.e., melt distribution system) for use in a process for making a cellular cushioning article, such as the film of FIG. 6.

Films containing one or more microlayer sections, i.e., films as shown in FIG. 6, may be produced using layer-multiplying technology, as well known in the art and disclosed, e.g., in U.S. Pat. Nos. 5,094,793 and 5,269,995, the disclosures of which are hereby incorporated herein by reference thereto. FIG. 8 schematically illustrates a suitable extrusion system 140 for producing films having a microlayer section, such as the film of FIG. 6. Extrusion system 140 may include a coextrusion die 142, a first extruder "A" to produce outer bulk layers, e.g., 122 and 124, a second extruder "B" to produce a pair of tie layers, e.g., 126 and 128, a third extruder "C" to produce third bulk layer, e.g., 130, and fourth and fifth extruders "D1" and "D2" to produce microlayers, e.g., 134. Coextrusion die 142 may include feedblocks 144*a* and 144*b* to receive molten polymer from extruder A, feedblocks 146*a* and 146*b* to receive molten polymer from extruder B, feedblock 148 to receive molten polymer from extruder C, and feedblock 150, along with layer-multiplier module 152, to receive molten polymer from extruders D1 and D2.

In the illustrated embodiment, the output from extruder A is split, e.g., evenly, and travels through conduits 154*a* and 154*b* to simultaneously supply polymer to both feedblock 144*a* and 144*b*, such that the composition of the outer, bulk layers is the same. Similarly, the output from extruder B is split, e.g., evenly, via conduits 156*a* and 156*b* to form a pair of tie layers, when needed, in order to adhere the remaining film layers to a barrier layer between the tie layers, with the barrier layer polymer stream being generated in extruder C, with the barrier layer polymer stream traveling through conduit 158, to the adjoining layers in the film. As noted above, this may be necessary when layer 54 is formed from a polymer having oxygen-barrier functionality, such as polyamide or polyester.

The output from extruders D1 and D2 are directed via respective conduits 160, 162 into feedblock 150, in which they are combined to form a two-layer polymeric flow, i.e., in the form of two juxtaposed layers of molten polymer, which is then fed into the layer-multiplier module 152.

The feedblocks 144*a*&*b*, 146*a*&*b*, and 148, and layer-multiplier module 152, convert the molten polymer received from the associated extruders A, B, C, D1 and D2 into polymer layers, which are then gathered and combined by combining unit 164 to form the final multilayer extrudate 166, which emerges from combining unit 164 via slot 168.

Figure 9:
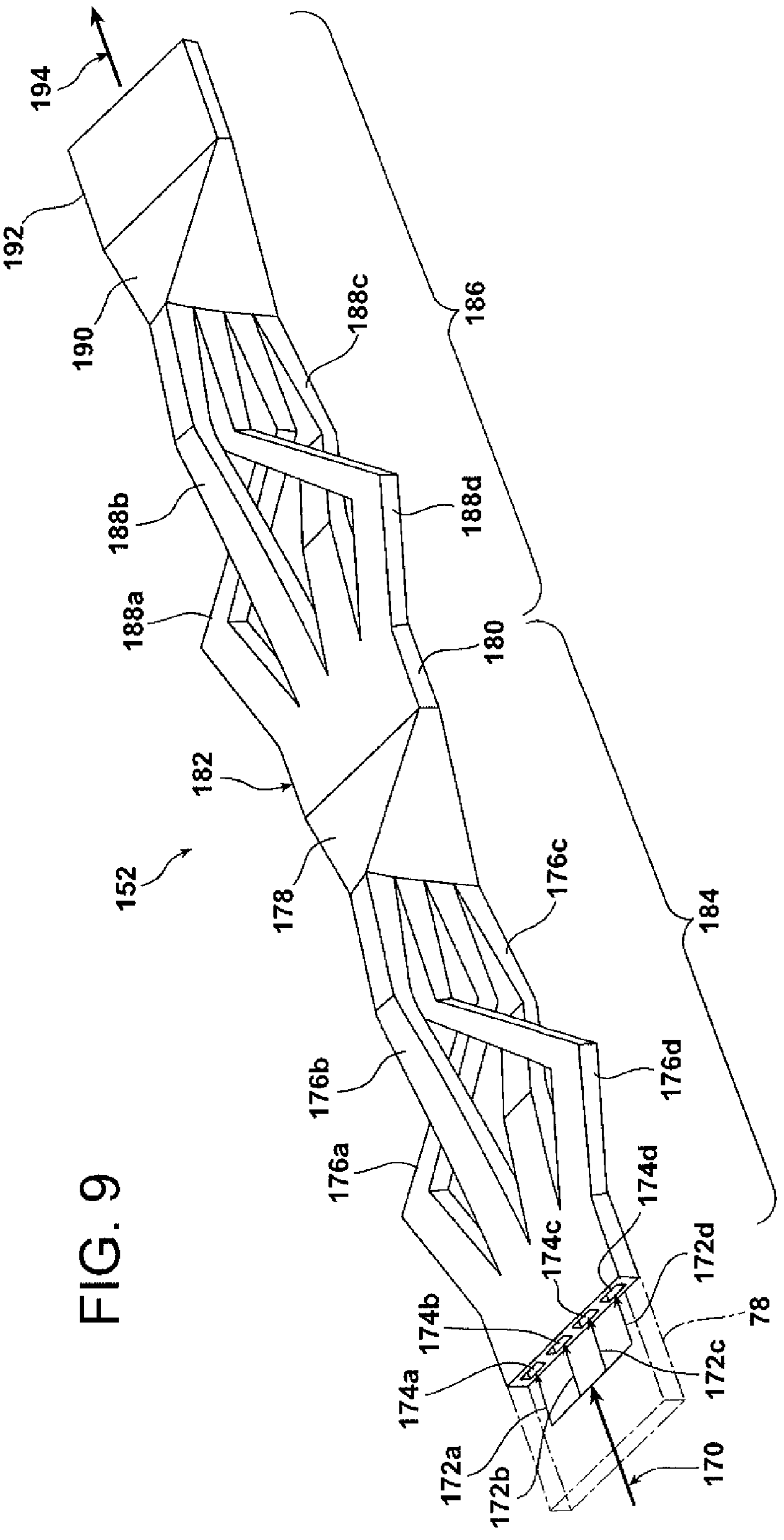
FIG. 9 is a detailed perspective view of a layer-multiplier module illustrated schematically in FIG. 8.

Referring now to FIG. 9, layer-multiplier module 152 will be described in further detail. The combined two-layer polymer flow from extruders D1 and D2, flowing into and through feedblock 150, is represented by arrow 170. The layer-multiplier module 152 depicted in FIG. 8 is a four-channel type of multiplier, which divides the combined two-layer flow 170 from extruders D1/D2 into four branches 172*a*, 172*b*, 172*c*, and 172*d*, via the four channels 176*a*, 176*b*, 176*e*, and 176*d*, each of which has a respective entrance port 174*a*, 174*b*, 174*c*, and 174*d* in communication with feedblock 150 to effect the 4-way division of flow 170. Each of the channels 176*a*, 176*b*, 176*c*, and 176*d* leads the respective two-layer polymer flow 172*a*, 172*b*, 172*e*, and 172*d* flowing therein to stacking/combining/expansion unit 178, which receives each of the flows 172*a*, 172*b*, 172*c*, and 172*d* in a stacked configuration from respective channels 176*a*, 176*b*, 176*c*, and 176*d*. Thus, as may be seen from FIG. 9, channels 176*a*, 176*b*, 176*c*, and 176*d* convert flow 170 from a relatively wide, horizontal flow to a relatively narrow, vertical flow, with the two-layer D1/D2 flow 172*b* on top, followed thereunder by two-layer flow 172*d*, then two-layer flow 172*a*, and finally two-layer flow 172*c* on the bottom. Unit 178 receives the stacked flows 172*b*, 172*d*, 172*a*, and 172*c*, combines them, and then flattens them out again so that the resultant combined flow 182 flowing from the exit slot 180 has the same or similar flat shape as the original flow 170. As may be appreciated, however, whereas the original flow 170 had two juxtaposed layers D1/D2, the recombined flow 182 has eight juxtaposed layers D1/D2/D1/D2/D1/D2/D1/D2.

In the illustrated embodiment, layer-multiplier module 152 has a first stage 184 and a second stage 186, which is essentially identical to first stage 184. As just described, at the end of the first stage 184, the flow 182 has eight juxtaposed polymer layers flowing in a relatively flat configuration out of exit slot 180. In second stage 186, this process is repeated, with flat flow 182' being divided into four branches and vertically stacked via the four illustrated channels 188*a*, 188*b*, 188*c*, and 188*d*, then received, combined, and flattened out again by stacking/combining/expansion unit 190. In this manner, the resultant recombined flow 194 flowing from the exit slot 192 has the same or similar flat shape as the incoming flow 182. However, whereas the incoming flow 182 had eight juxtaposed layers D1/D2/D1/D2/D1/D2/D1/D2, the exiting flow 194 has thirty two layers alternating between D1 and D2, i.e., 16 layers of polymer from extruder D1 interdigitated with 16 layers of polymer from extruder D2.

The 32-layer recombined polymer flow 194 that emerges from exit slot 192 of layer-multiplier module 152 is merged with bulk layers (i.e., non-microlayered layers) from feedblocks 144*a&b*, 146*a&b*, 148 in combining unit 164 of coextrusion die 142, to become microlayer section 132 in the resultant multilayer film, as produced by extrusion system 140 (see FIGS. 6 and 8). As may thus be appreciated, extrusion system 82 and/or 84 in process 80 (see FIG. 4) for producing cellular cushioning material 120 (see FIG. 6), may be embodied by extrusion system 140.

The foregoing systems for producing multilayered films with a microlayered section, which are suitable for use in cellular cushioning materials, have been presented for illustration purposes only and are not intended to be limiting in any way of the scope of the present invention. Numerous variations are possible. For example, instead of splitting the output from extruder A (and/or B) evenly (which results in the same thickness for bulk outer layers 122 and 124), the flow can be divided unequally (to result in different layer thicknesses for the bulk layers 122, 124). Further, instead of splitting the output, a separate extruder can be used to supply polymer for each bulk layer; in this manner, the bulk layers 122, 124 may be compositionally different from one another.

As another alternative, although layer-multiplier module 152 is illustrated as having two stages 184, 186, a greater or less number of stages may be employed, depending upon the desired number of microlayers for microlayer section 132. Thus, if only first stage 184 is employed, the microlayer section would have only 8 microlayers. If three stages were employed, the microlayer section would have 128 microlayers (32×4); four stages would produce 512 microlayers (128×4), etc.

Similarly, whereas layer-multiplier module 152 is shown as having four channels (176*a-d* and 188*a-d*) such that the number of layers are multiplied by a factor of four in each stage 184, 186, a greater or lesser number of channels may be employed. For example, if module 152 had only two-channels e.g., 176*a-b* and 188*a-b*, flow 170 would emerge from first stage 184 with four layers, while flow 194' would emerge from second stage 186 with eight layers, such that two additional stages would have to be added in series with first and second stages 184, 186 in order to produce 32 microlayers.

As an alternative to the coextrusion system 140 described above, an annular coextrusion system for producing multilayer films w/ one or more microlayer sections may be employed, e.g., as disclosed in U.S. Publication No. US-2010-0072655-A1, the disclosure of which is hereby incorporated herein by reference thereto.

In some embodiments, each of the microlayers 134 have substantially the same composition. This may be accomplished by supplying the same polymer to extruders D1 and D2. See, e.g., Example 97, below.

In other embodiments, two or more of the microlayers 134 have compositions that are different from each other. This may be accomplished by supplying different polymers to extruders D1 and D2. See, e.g., Example 98 below, wherein the microlayer section comprises interdigitated layers of "Repro-1" and "Repro-2".

In still other embodiments, at least one of microlayers 134 comprises a blend of two or more polymers. See, e.g., Example 103 below, wherein each of the microlayers comprise a blend of Repro-2 and LLDPE-1.

In many embodiments, each of the microlayers 134 will have substantially the same thickness while, in other embodiments, at least one of the microlayers will have a thickness that is different from the thickness of at least one other of the microlayers. The latter may be accomplished, e.g., by varying the cross-sectional area of one or more of the channels 176, 188 relative to the other channels.

Each of the microlayers 134 may have a thickness as low as about 0.001 mil, e.g., ranging from 0.001 to 0.1 mil, such as from 0.005 to 0.08 mil, 0.01 to 0.05 mil, etc. The bulk layers may have a thickness as great as desired, e.g., up to about 5 mils, but generally ranging from about 0.01 to 2.5 mils, such as from 0.05 to 1.0 mil, 0.06 to 0.5 mil, etc.

An advantage of the present invention pertains to the use of recycled polymer in cellular cushioning films. In commercial film-manufacturing operations, the production and accumulation of scrap film is, and has always been, a logistical and economic problem. Scrap film results from a variety of sources—initial production of multilayer films prior to steady-state operation; out-of-spec (improperly formed) film; portions of film that are mechanically trimmed and separated from the main film web in order to achieve a predetermined web width; etc. As may be appreciated, scrap generally cannot be used for its originally-intended commercial application. However, it nevertheless represents an economic and resource investment in polymers derived from the Earth's petroleum and natural gas reserves.

Fortunately, scrap film can be reprocessed, e.g., by grinding, remelting, and pelletizing the scrap, and can then be blended with 'virgin' polymer in the production of many types of films. Unfortunately, the incorporation of such reprocessed scrap polymer in conventional films, particularly in films having a thickness of less than about 2 mil, has proven quite difficult to achieve in meaningful amounts, while still maintaining in such films their intended functionality.

Surprisingly, as demonstrated in the Examples below, the inventors discovered that microlayering allows a significant amount of recycled polymer to be included in cellular cushioning films, while still maintaining excellent cushioning performance. This unexpected benefit occurs when at least one of the microlayers 134 comprises recycled polymer. For example, the microlayer section 132 may comprise up to 100 weight percent recycled polymer, and account for up to 70 percent of the total thickness of the film, such that the film as a whole comprises up to 70 weight percent recycled polymer.

Figure 10A:
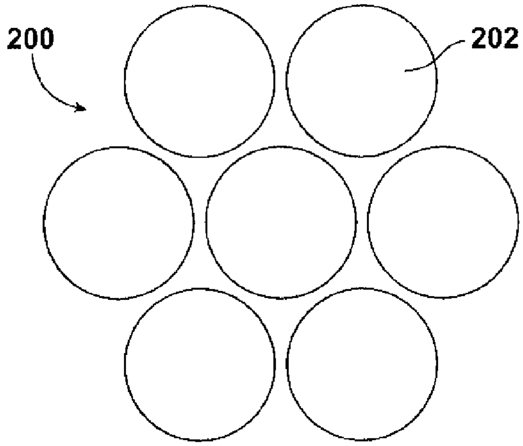
FIG. 10A is a schematic of an outer surface of a forming drum used in the process of making a cellular cushioning article, illustrating the arrangement of forming cavities on the outer surface of the forming drum.
Figure 10B:
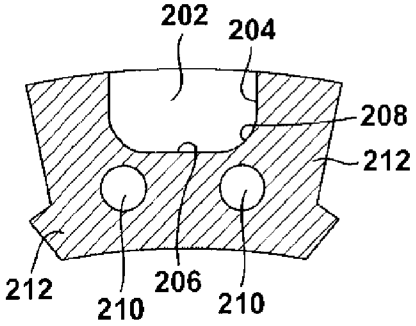
FIG. 10B is a cross-sectional view through the forming drum schematically illustrated in FIG. 10A, illustrating the side walls and bottom of the forming cavity.

FIG. 10A is a schematic of an outer surface of a forming drum, such as forming drum 94 of FIG. 4A, used in the process of making a cellular cushioning article. FIG. 10A schematically illustrates arrangement 200 of forming cavities 202 on the outer surface of the forming drum. In FIG. 10A, the distance between centers of each of cavities 202 was 34.3 mm. FIG. 10B schematically illustrates a cross-sectional view of a small portion of the forming drum of FIG. 10A, through a section directly across the central axis running the length of the forming drum. FIG. 10B illustrates single forming cavity 202 defined by sidewall surface 204, bottom surface 206, and accurate wall-to-bottom transition (i.e., corner) surface 208, as well as vacuum channel passageway 210, with each of the cavity, surfaces, and passageways being defined by surfaces provided in metal 212 from which the forming drum is made. In FIGS. 10A and 10B, cavities 202 have a diameter of 31.8 mm and a depth of 17.1 mm, with wall-to-bottom transition 204 having a radius of curvature of 7.9 mm. Sidewall surfaces 204 are perpendicular to bottom surface 206. A forming drum having the design of FIGS. 10A and 10B was used in each of Examples 1-5, 8-57, and 71-79, as set forth below.

Figure 11A:
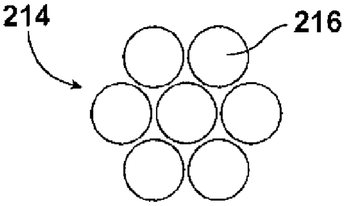
FIG. 11A is a schematic of an outer surface of an alternative forming drum used in the process of making an alternative cellular cushioning article, illustrating the arrangement of alternative forming cavities on the outer surface of the alternative forming drum.
Figure 11B:
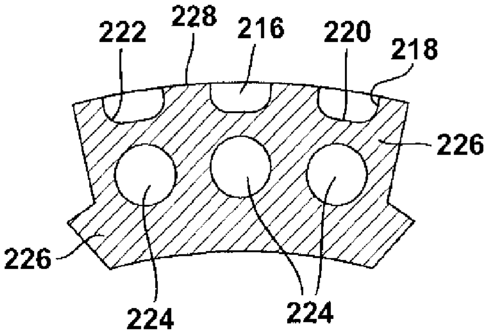
FIG. 11B is a cross-sectional view through the alternative forming drum schematically illustrated in FIG. 11A illustrating the side walls and bottom of the alternative forming cavity.

FIG. 11A is a schematic of an outer surface of an alternative forming drum which can also be used as forming drum 94 of FIG. 4A, for making an alternative cellular cushioning article. FIG. 1 IA schematically illustrates arrangement 214 of forming cavities 216 on the outer surface of the alternative forming drum. In FIG. 11A, the distance between centers of each of cavities 216 was 0.453 inch (11.5 mm). FIG. 11B schematically illustrates a cross-sectional view of a small portion of the forming drum of FIG. 11A, through a section directly across the central axis running the length of the alternative forming drum. FIG. 11B illustrates single forming cavity 216 defined by sidewall surface 218, bottom surface 220, and accurate wall-to-bottom transition (i.e., corner) surface 222, as well as vacuum channel passageways 224, with each of the cavity, surfaces, and passageways being defined by surfaces provided in metal 226 from which the alternative forming drum is made.

In FIGS. 11A and 11B, cavities 216 have a diameter of 9.5 mm at the base (i.e., outside of the drum), and a depth of 5.33 mm, with wall-to-bottom transition 222 having a radius of curvature of 3.2 mm. Sidewall surfaces 204 are angled 2 degrees outward relative to bottom surface 220, i.e., so that the diameter of cavity 216 is slightly smaller at the edge of wall-to-bottom transition 222 than where sidewall 218 meets outer drum surface 228. An alternative forming drum having the design of FIGS. 10A and 10B was used in each of Examples 58-69, as set forth below.

Figure 12:
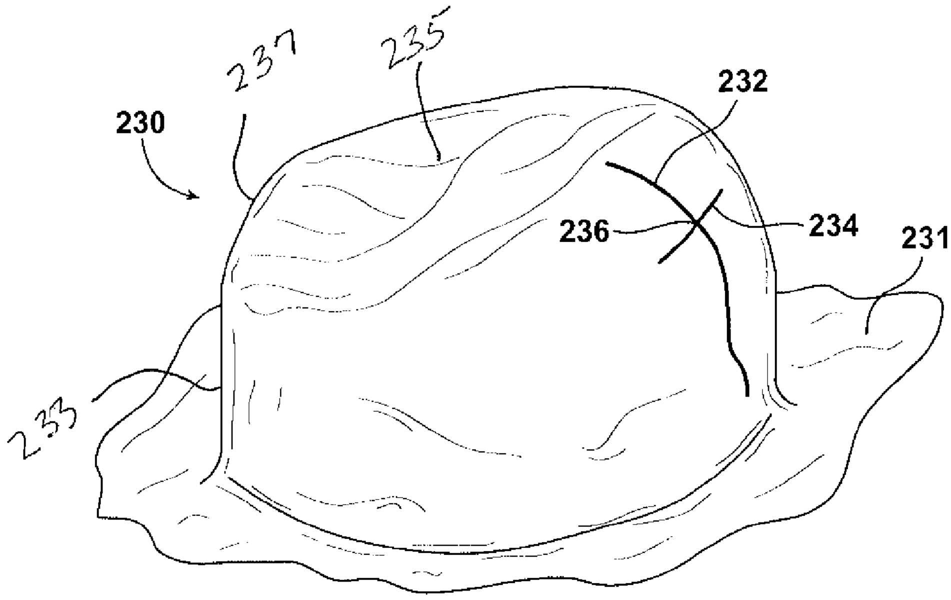
FIG. 12 illustrates a single cell with two manually applied ink lines on the outside surface of a discrete thermoformed portion of the first film, with FIG. 12 illustrating an initial phase of preparing a sample for determination of a set of refractive index measurements to be used in the calculation of maximum birefringence.

FIG. 12 illustrates a perspective view of single cell 230 cut away from a cellular cushioning article containing a plurality of such cells 230 in an arrangement such as arrangement 200 of FIG. 10A or arrangement 214 of FIG. 11A. As illustrated in FIG. 12, cell 230 has backing film (not expressly illustrated) remaining bonded to the land area 231 of the thermoformed film. As illustrated in FIG. 12, cell 230 is in the process of being prepared for the measurement of the maximum birefringence of the thermoformed region of the cell. This preparation includes manually marking cell 230 with machine direction ink line ("MD line") 232 on an outside surface thereof. MD line 232 is made directly along the machine direction line, which is determined by looking for die lines on the surface of the thermoformed film. Cell 230 is also manually marked on its outside surface with transverse direction ink line ("TD line) 234. Moreover, MD line 232 intersects TD line 234 at 90 degrees. Furthermore, MD line 232 intersects TD line 234 at intersection point 236. Intersection point 236 is in the wall-to-bottom transition portion of the thermoformed film making up cell 230, i.e., that portion of the discrete thermoformed region that, during thermoforming, contacted the wall-to-bottom transition surface of the forming cavity. The wall-to-bottom transition portion of the discrete thermoformed region is generally, in uniformly thermoformed cells, the thinnest portion of the thermoformed region of the thermoformed film and, correspondingly, the most highly oriented film portion making up the thermoformed region of the thermoformed film. As the most highly oriented portion of the film, the wall-to-bottom transition generally measures as having the highest refractive index. As such, for the shape of the cavities illustrated in FIGS. 10A, 10B, 11A, and 11B, intersection point 236 generally provides both the maximum refractive index and the maximum birefringence present in the discrete thermoformed regions of the thermoformed film.

Figure 13A:
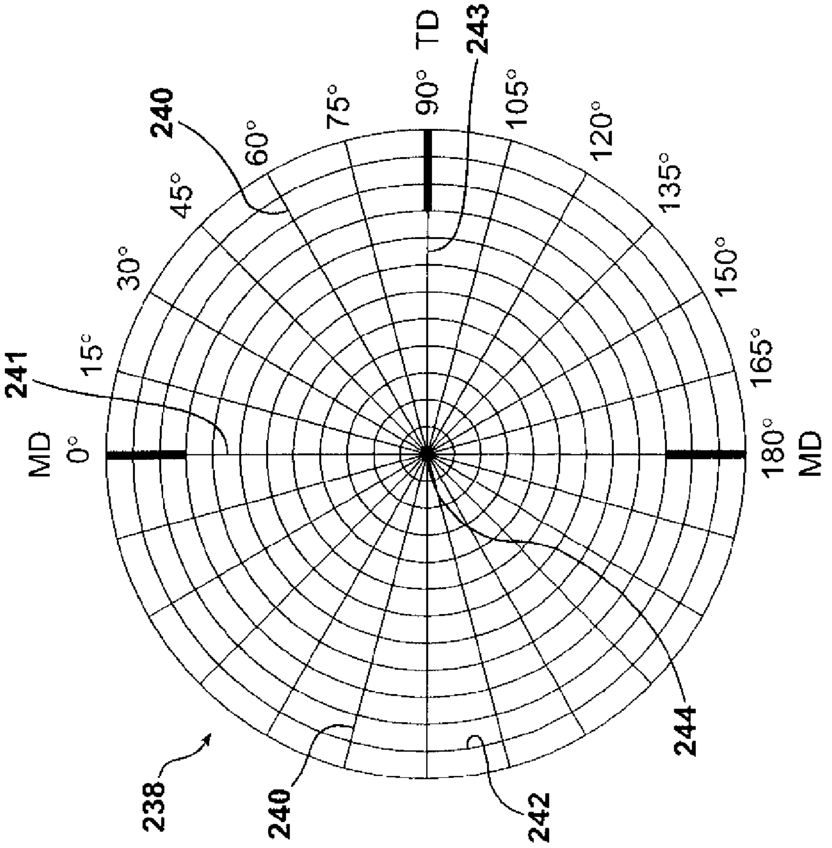
FIG. 13A illustrates a sample holder made from paper, with the sample holder having printing thereon.

FIG. 13A illustrates a sample holder 238, which is made from paper having printing thereon. Sample holder 238 had a diameter of 79 mm, and provides a "bullseye" pattern having radial lines 240 every 15 degrees of rotation, i.e., from 0 degrees to 180 degrees, with the 0 degree radial line and the 180 degree radial line being marked "MD" and the 90 degree radial line being marked "TD." Sample holder 238 also has concentric lines 242 outward from central point 244.

Figure 13B:
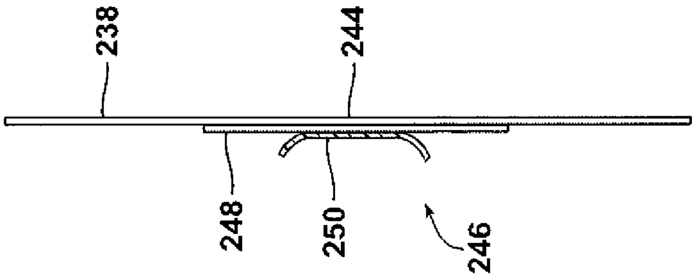
FIG. 13B illustrates a pre-mounted sample, including the sample holder and double-coated tape holding the sample to the sample holder.

FIG. 13B illustrates pre-mounted sample assembly 246, including sample holder 238 having central point 244, and double-coated tape 248 holding sample 250 to sample holder 238. Sample 250 is a small portion of a thermoformed region of the thermoformed film illustrated in FIG. 12, and had a size of about 10 mm by 19 mm. Sample 250 is a portion of the thermoformed region including intersection point 236 and a portion or all of MD line 232 and a portion or all of TD line 234.

In pre-mounted sample subassembly 246 as illustrated in FIG. 13B, intersection point 236 (see FIG. 12) on sample 250 was taped directly over central point 244 (see FIGS. 12, 13A, and 13B) on sample holder 238, using double coated tape 248. Moreover, MD line 232 (see FIG. 12) of sample 250 was lined up directly with MD line 241 of sample holder 238 (see FIG. 13A), and TD line 234 (see FIG. 12) was lined up directly with TD line 243 of sample holder 238 (see FIG. 13A).

Figure 13C:
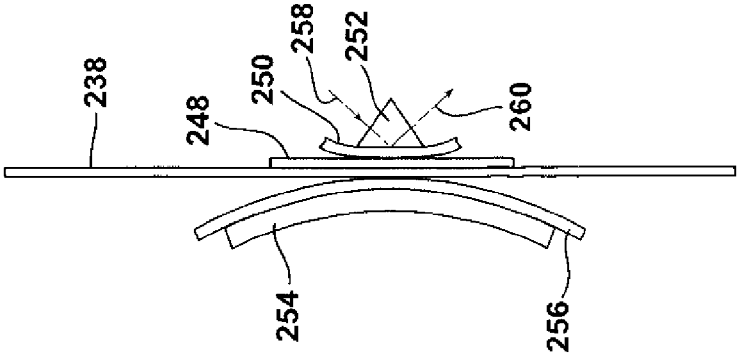
FIG. 13C is a schematic of the pre-mounted sample after installation into the Metricon® Model 2010 Prism Coupler Thin Film Thickness/Refractive Index Measurement System, which was used for the measurement of various refractive index measurements from discrete samples taken from discrete thermoformed regions of the thermoformed film for various examples within Examples 1-81, below.

FIG. 13C is a schematic of the pre-mounted sample assembly 246 of FIG. 13B, after installation into the Metricon® Model 2010 Prism Coupler Thin Film Thickness/Refractive Index Measurement System, which was used for the measurement of various refractive index measurements from discrete samples taken from discrete thermoformed regions of the thermoformed film for various examples within Examples 1-81, below. FIG. 13C illustrates sample holder 238, double coated tape 248, sample 250, GGG-type crystal 252, piston head 254 having a spherically-shaped outer surface having with a radius of curvature of about 12.7 millimeters. Between the outer surface of piston head 254 and sample holder 238 was a layer of electrical tape 256 adhered to the outer surface of piston head 254. During the measurement of refractive index, incoming laser light 258 was directed through crystal 252, with laser light 258 penetrating into and reflecting off of sample 250 and leaving as outgoing laser light 260. Sample holder 238 was rotated in 15 degree increments in order to measure refractive index refractive index as a function of angular orientation of sample 250, so that the maximum refractive index of sample 250 was measured.

Figure 14:
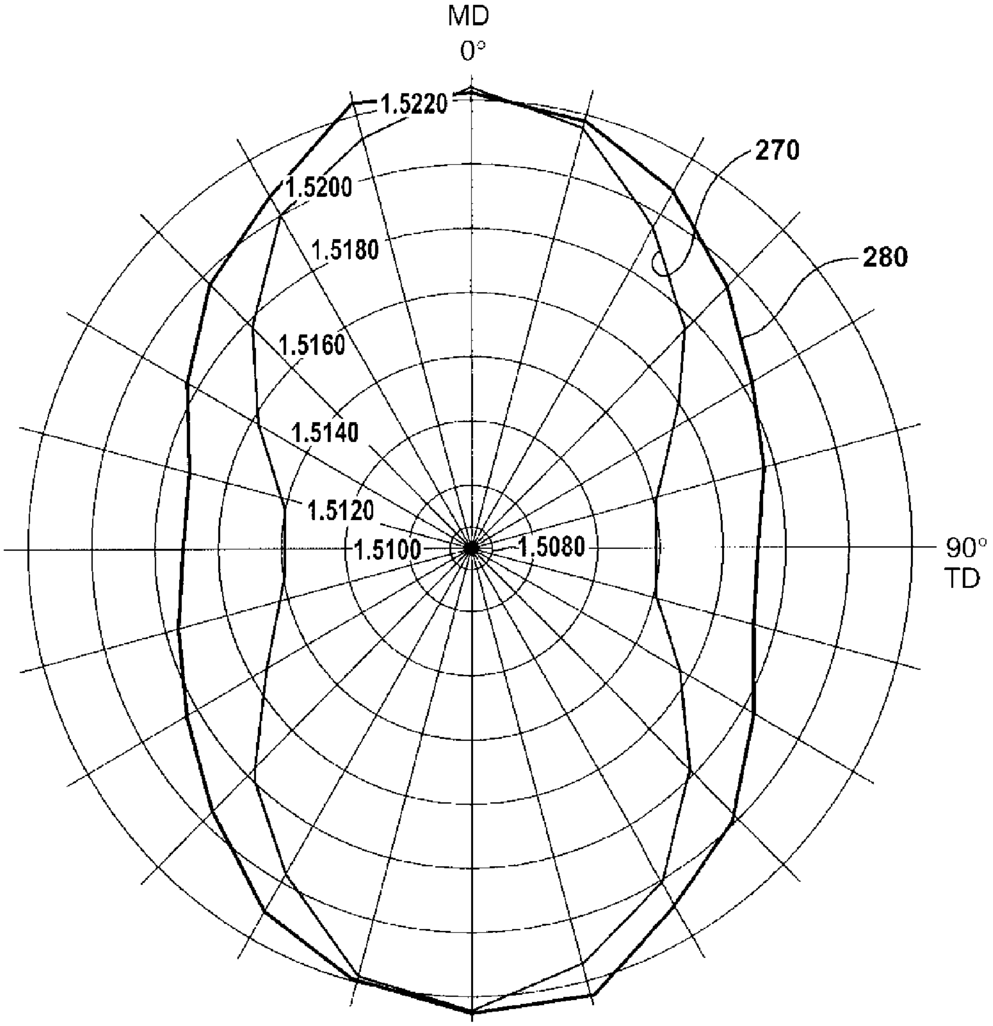
FIG. 14 is a plot of refractive index as a function of angular orientation for Example 4 and Example 11.

FIG. 14 is a plot of refractive index as a function of angular orientation for Example 4 and Example 11. Line 270 in FIG. 14 is a plot of refractive index as a function of angular orientation for Example 4. Line 280 in FIG. 14 is a plot of refractive index as a function of angular orientation for Example 11.

Figure 15:
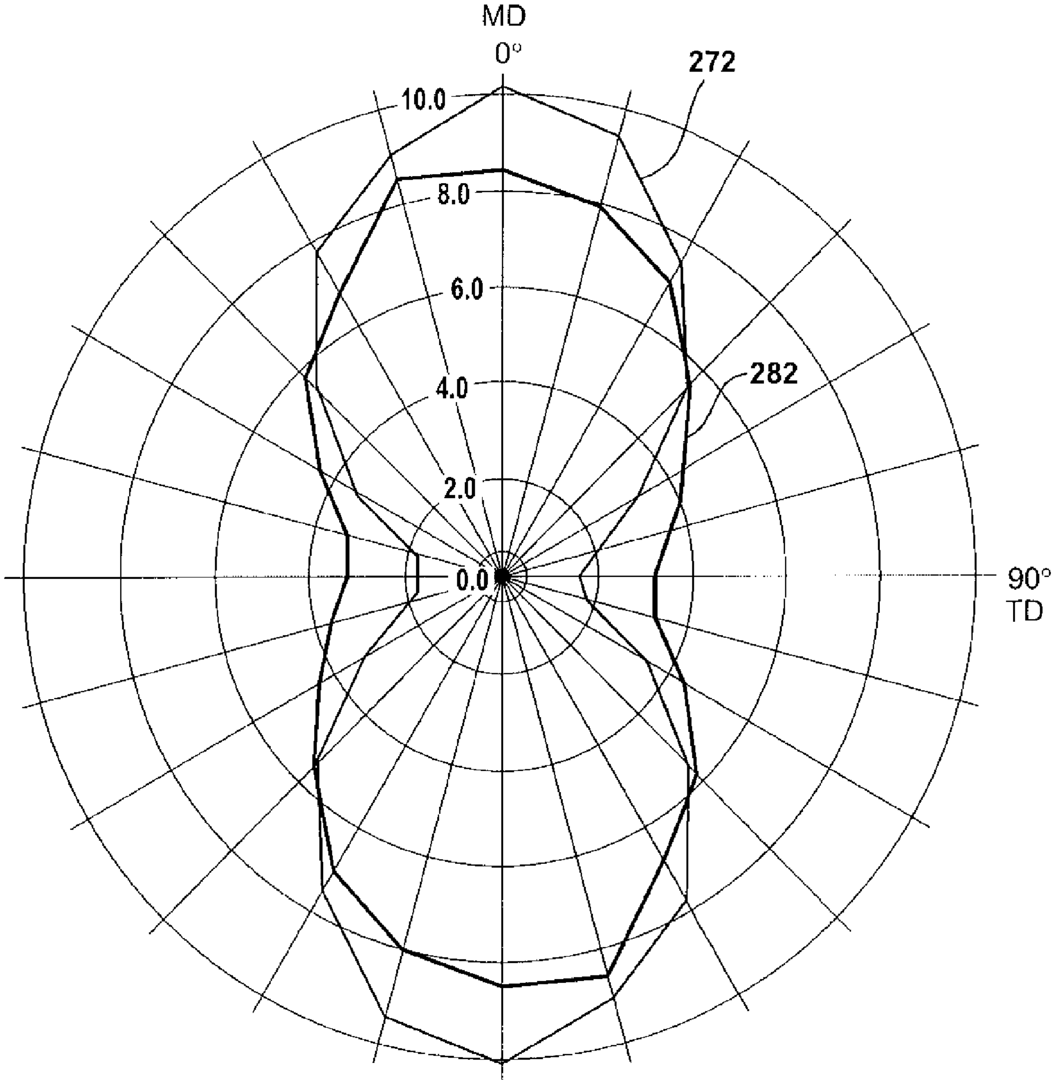
FIG. 15 is a plot of birefringence as a function of angular orientation for Example 4 and Example 11.

FIG. 15 is a plot of birefringence as a function of angular orientation for Example 4 and Example 11. Line 272 in FIG. 15 is a plot of birefringence as a function of angular orientation for Example 4. Line 282 in FIG. 15 is a plot of birefringence as a function of angular orientation for Example 11.

The refractive index data and resulting calculated birefringence for Examples 4 and 11, which resulted in lines 270 and 280, respectively, in FIG. 14 and lines 272 and 282, respectively, in FIG. 15, are set forth in Tables 1 and 2, respectively, below. The plots in FIGS. 14 and 15 represent the average at each angular orientation for the three samples tested for each of Examples 4 and 11, respectively. While these plots are provided to show the general shape of the angular orientation curves for refractive index (FIG. 14) and birefringence (FIG. 15), the determination of average maximum birefringence was not conducted using the average of refractive indices at corresponding angular orientations, but rather was conducted as described immediately below, as the method described below averages the actual maximum values obtained for each sample (independent of angular orientation), as opposed to the maximum of averaged values for each angular orientation.

The data showed that the direction with the maximum refractive index for each the three samples measured in Example 4, as set forth in the "Max RI" column in Table 1, below, all occurred at an angular orientation of 0°, i.e., the refractive index measurements taken in the machine direction ("MD") of the samples. The maximum birefringence ("Max Bir" in Table 1) for each sample was calculated by subtracting the OOP refractive index ("OOP RI" is the "out of plane" refractive index) from the maximum refractive index of the sample (i.e., "Max RI"). For example, the OOP refractive index for Sample 1 of Example 4 was 1.5144. The maximum birefringence was calculated by subtracting the OOP RI from the maximum refractive index (i.e., at 0° angular orientation). The maximum birefringence was calculated to be $4.2\times1.5186-1.5144=0.0042=4.2\times10^{-3}$). This was done on all three samples, with the maximum average birefringence calculated to be $10.1\times10^{-3}$, i.e., $(4.2+10.7+15.4)/3\times10^{-3}=10.1\times10^{-3}$.

TABLE 1

| | Orient. Angle 0° (MD) | 15° | 30° | 45° | 60° | 75° | 90° (TD) | 105° | 120° |
|---|---|---|---|---|---|---|---|---|---|
| Sample 1 | 1.5186 | 1.5181 | 1.5174 | 1.5164 | 1.5158 | 1.5152 | 1.5152 | 1.5157 | 1.5161 |
| Sample 2 | 1.5233 | 1.5225 | 1.5202 | 1.5186 | 1.5166 | 1.5152 | 1.5146 | 1.5147 | 1.5165 |
| Sample 3 | 1.5251 | 1.5243 | 1.5213 | 1.5181 | 1.5142 | 1.5122 | 1.5118 | 1.5120 | 1.5146 |
| Mean RI | 1.5223 | 1.5216 | 1.5196 | 1.5177 | 1.5155 | 1.5142 | 1.5139 | 1.5141 | 1.5157 |
| Mean Bir. [$\times10^{-3}$] | 10.1 | 9.4 | 7.4 | 5.5 | 3.3 | 2.0 | 1.6 | 1.9 | 3.5 |
| Avg. Max. Birefring. ($\times10^{-3}$) | | | | | | | | | |

| | Orient. Angle 135° | 150° | 165° | OOP RI | Max RI | Max Bir. [×10−3] |
|---|---|---|---|---|---|---|
| Sample 1 | 1.5172 | 1.5179 | 1.5183 | 1.5144 | 1.5186 | 4.2 |
| Sample 2 | 1.5186 | 1.5204 | 1.5215 | 1.5126 | 1.5233 | 10.7 |
| Sample 3 | 1.5176 | 1.5216 | 1.5239 | 1.5097 | 1.5251 | 15.4 |
| Mean RI | 1.5178 | 1.5200 | 1.5212 | 1.5122 | | |
| Mean Bir. [$\times10^{-3}$] | 5.6 | 7.7 | 9.0 | | | |
| Avg. Max. Birefring. ($\times10^{-3}$) | | | | | | 10.1 |

The data showed that the direction with the maximum refractive index for each the three samples measured in Example 11, as set forth in the "Max RI" column in Table 2 below, occurred at angular orientations of 165° (Sample 1), 0° (Sample 2), and 165° (Sample 3). The calculated average maximum birefringence for Example 11 was $8.6\times10^{-3}$.

TABLE 2

| | Orient. Angle 0° (MD) | 15° | 30° | 45° | 60° | 75° | 90° (TD) | 105° | 120° |
|---|---|---|---|---|---|---|---|---|---|
| Sample 1 | 1.5227 | 1.5225 | 1.5216 | 1.5199 | 1.5184 | 1.5181 | 1.5173 | 1.5176 | 1.5191 |
| Sample 2 | 1.5221 | 1.5216 | 1.5210 | 1.5194 | 1.5180 | 1.5170 | 1.5168 | 1.5168 | 1.5179 |
| Sample 3 | 1.5221 | 1.5213 | 1.5201 | 1.5191 | 1.5186 | 1.5178 | 1.5171 | 1.5173 | 1.5179 |
| Mean RI | 1.5223 | 1.5218 | 1.5209 | 1.5195 | 1.5183 | 1.5176 | 1.5171 | 1.5172 | 1.5183 |
| Mean Bir. [$\times10^{-3}$] | 8.4 | 7.9 | 7.0 | 5.6 | 4.4 | 3.7 | 3.2 | 3.3 | 4.4 |
| Avg. Max. Birefring. ($\times10^{-3}$) | | | | | | | | | |

TABLE 2-continued

| | Orient. Angle | | | | Max | Max Bir. |
|---|---|---|---|---|---|---|
| | 135° | 150° | 165° | OOP | RI | [x10−3] |
| Sample 1 | 1.5207 | 1.5219 | 1.5230 | 1.5139 | 1.5230 | 9.1 |
| Sample 2 | 1.5194 | 1.5210 | 1.5220 | 1.5131 | 1.5221 | 9.0 |
| Sample 3 | 1.5190 | 1.5193 | 1.5223 | 1.5147 | 1.5223 | 7.6 |
| Mean RI | 1.5197 | 1.5207 | 1.5224 | 1.5139 | | |
| Mean Bir. [$\times10^{-3}$] | 5.8 | 6.8 | 8.5 | | | |
| Avg. Max. Birefring. ($\times10^{-3}$) | | | | | | 8.6 |

Figure 16:
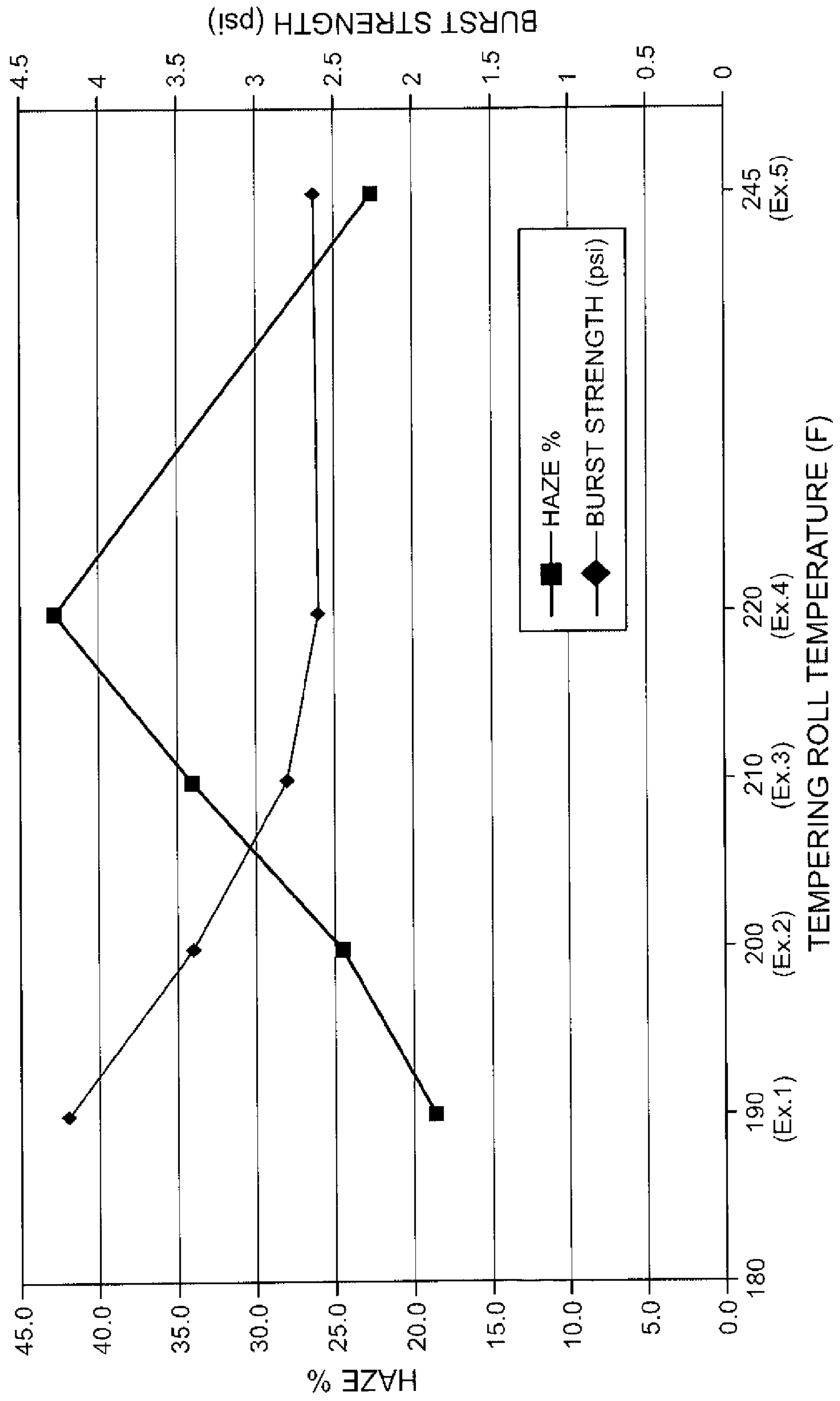
FIG. 16 is a graphical representation of data for haze (%) and cell burst strength (psi), each as a function of tempering roll temperature, for Working Examples 1 and 2, Comparative Examples 3 and 4, and Prior Art Example 5.

FIG. 16 is a graphical representation of data for haze (%) and cell burst strength (psi), each as a function of tempering roll temperature, for Working Examples 1 and 2, Comparative Examples 3 and 4, and Prior Art Example 5. As is apparent from FIG. 16, as tempering roller temperature is dropped from 245° F. to 190° F., the burst strength increased from 2.6 psi to 4.2 psi. This was an increase of over 61%. This was surprising and unexpected, as the only change in the process was the lowering of the temperature of the tempering rollers. That is, the film thickness, layer arrangement, and layer composition was identical in Examples 1, 2, 3, 4, and 5. For several decades cellular cushioning with a nylon barrier layer has been produced at a thermoforming temperature established using tempering rollers at 245° F. It was unknown and unexpected that by merely lowering the temperature of the tempering rollers from 245° F. to 190° F., the burst strength of the cells could be increased by 61%, all other factors remaining the same.

The haze curve in FIG. 16 shows that as tempering roll temperature was decreased from 245° F. to 220° F., the percent haze increased from 22.4 to 42.8. Decreasing the tempering roll temperature just 15° F. caused the haze level to almost double. However, upon further decreasing the temperature of the tempering rollers another 30° F., i.e., from 220° F. to 190° F., the haze decreased from 42.8% to 18.6%, i.e., dropping to a level well below half the haze level at 220° F., and even to a level below the 22.4% haze obtained with tempering rollers at 245° F. This drop in the percent haze of the product was unexpected, particularly after the first 15° F. temperature decrease from 245° F. to 230° F. caused haze to increase. It was believed that haze would further increase if the temperature was further decreased, but the opposite was surprisingly discovered to occur. Of course, lower haze level is desirable in the product.

Figure 17:
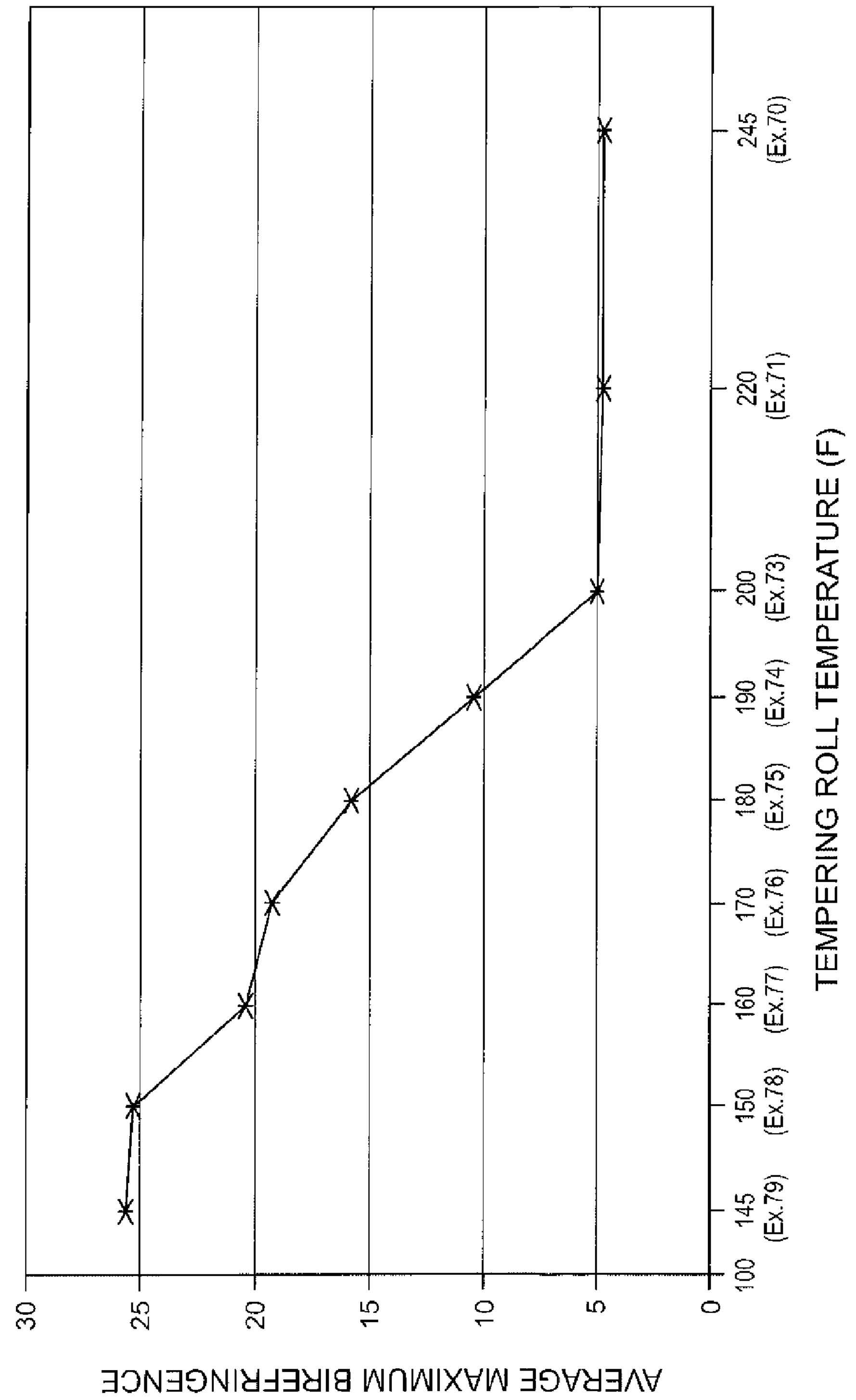
FIG. 17 is a graphical representation of data for birefringence as a function of tempering roll temperature.

FIG. 17 is a graphical representation of data for average maximum birefringence as a function of tempering roll temperature for Examples 70 through 79. The cellular cushioning articles of Examples 70 through 79 were made using the process schematically illustrated in FIG. 4A, described above, using tempering rollers as schematically illustrated in FIG. 4B, described above. The thermoformed films and the backing films of each of Examples 70 through 79 had different weights (i.e., different thicknesses), but each had the same layer arrangement and layer composition and together had a combined basis weight of 85 grams per 12 $ft^2$. More particularly, both the thermoformed film and the backing film were multilayer films having the layer arrangement A/B/B/C/D/C/A (see Tables 4 and 6 for detailed information on composition of each layer), with each film having a total polyamide content of about 13.1 percent, based on total film weight. The cavities in the forming drum had a diameter of 31.8 mm and a depth of 17.1 mm, i.e., the size and shape disclosed in FIGS. 10A and 10B, described above.

The graph in FIG. 17 demonstrates how average maximum birefringence increased as tempering roll temperature decreased from 245° F. to 140° F. More particularly, mean maximum birefringence hovered around $5\times10^{-3}$ in processes with tempering rollers through the 45° F. range of 245° F. to 200° F. However, birefringence sharply increased from $5\times10^{-3}$ to $25\times10^{-3}$ in the 50° F. range of 200° F. to 150° F. Birefringence appeared to level off at about $25\times10^{-3}$ from 150° F. to 140° F., and the presence of poorly formed regions began at 150° F. and extended through 140° F.

Thus, the results in FIG. 17 show how the temperature at which thermoforming occurs affects the average maximum birefringence of the discrete thermoformed regions of the cellular cushioning article. As such, average maximum birefringence has been discovered to be a useful tool for distinguishing discrete thermoformed regions of one cellular cushioning article from discrete thermoformed regions of another cellular cushioning article. That is, it has been discovered that the temperature at which thermoforming is carried out can change a measurable property of the thermoformed region itself, i.e., this process change can be carried out in a manner to produce a different product, and birefringence is a property that can be used to distinguish one cellular cushioning article from another cellular cushioning article.

Figure 18:
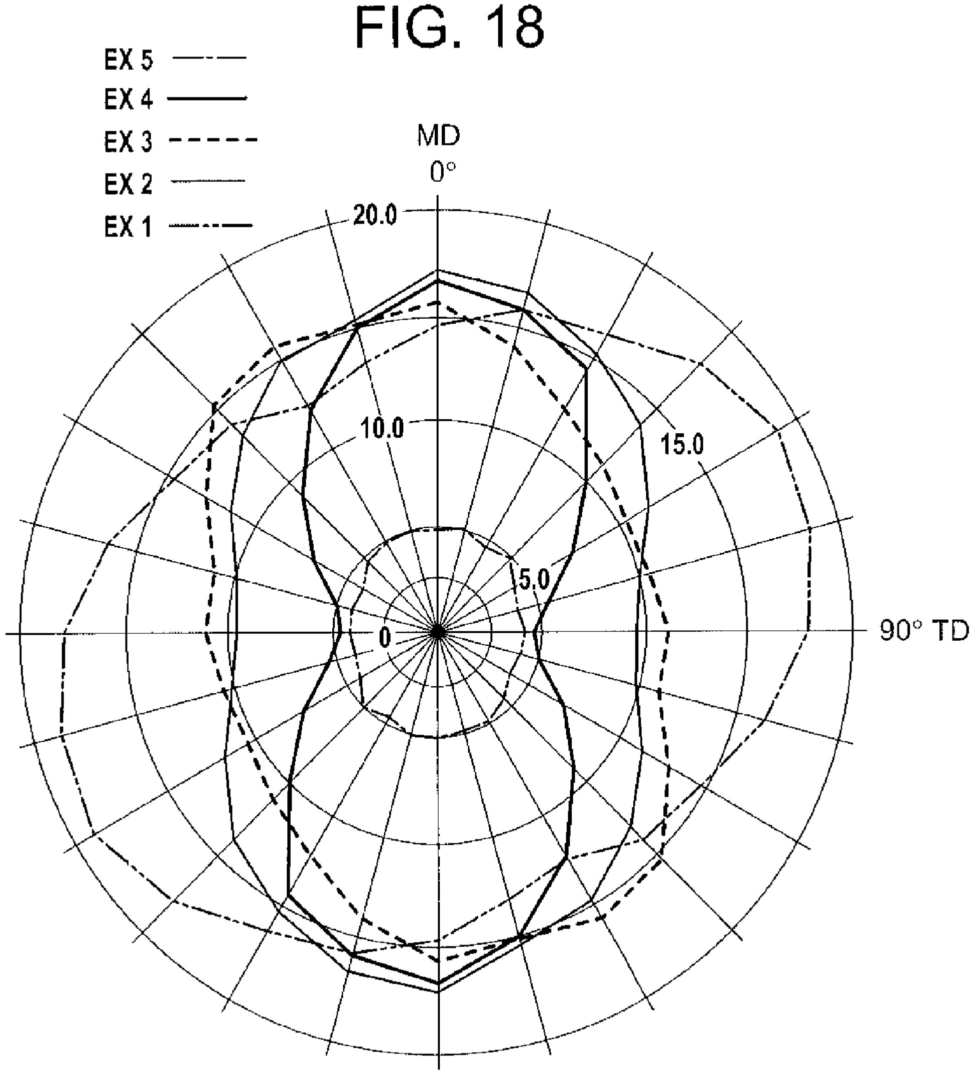
FIG. 18 is a plot of average birefringence as a function of angular orientation for Working Examples 1 and 2, together with Comparative Examples 3 and 4, and Prior Art Example 5.

FIG. 18 is a plot of birefringence as a function of angular orientation for Working Examples 1 and 2, together with Comparative Examples 3 and 4, and Prior Art Example 5. As with FIG. 15, discussed above, the curves in FIG. 18 are provided to show the general shape of the angular orientation curves for birefringence of Examples 1 through 5. Again, the determination of average maximum birefringence for Examples 1 through 5 was not conducted using the average of refractive indices at corresponding angular orientations, but rather was conducted as described immediately below, as the method described below averages the actual maximum values obtained for each sample (independent of angular orientation), as opposed to the maximum of averaged values for each angular orientation.

As can be seen in FIG. 18, the birefringence curve for Prior Art Example 5 is the innermost curve, with the curve of Example 5 maximizing at a birefringence of $5.0\times10^{-3}$. Example 5 was made using tempering rollers at 245° F. Comparative Example 4 was made using tempering rollers at 220° F., with the curve for Example 4 maximizing at a birefringence of $13.3\times10^{-3}$. Comparative Example 3 was made using tempering rollers at 210° F., with the curve for Example 3 maximizing at a birefringence of $15.6\times10^{-3}$. Working Example 2 was made using tempering rollers at 200° F., with the curve for Example 2 maximizing at a birefringence of $16.9\times10^{-3}$. Working Example 1 was made using tempering rollers at 190° F., with the curve for working Example 1 maximizing at a birefringence of $19\times10^{-3}$. It should be noted that the maximum birefringence numbers in the plots in FIG. 18 do not correspond with the average maximum birefringence set forth in Table 6, below, due to the different manner in which average maximum birefringence was calculated, as discussed above.

Thus, the data in FIG. 18 illustrates the relationship between curves for average birefringence as a function of tempering roller temperature. FIG. 18 also confirms the pattern of curves for birefringence as a function of angular orientation, as the shape of the curves for birefringence as a function of angular orientation in FIG. 18 is consistent with the shape of the birefringence curve for Example 11 in FIG. 15, described above. Although not provided herein, curves for birefringence were generated for each of the additional examples for which the average maximum birefringence is disclosed in Table 6, and in each case the shape of the curve for birefringence was similar to the shape of one or more of the birefringence curves illustrated in FIG. 18.

In addition, the data in Table 2 illustrates that average maximum birefringence for different samples can be present at substantially different angular orientations as tempering roll temperature is decreased. As a further example, data for Example 1 is provided in Table 3, below. The average maximum birefringence for Example 1 was present at an angular orientation of 90° (Sample 1), 75° (Sample 2), 15° (Sample 3), 90° (Sample 4), and 90° (Sample 5). Finally, FIG. 18 illustrates how not just maximum birefringence, but birefringence at any given angular orientation, generally increases as tempering roll temperature decreased.

Figure 19:
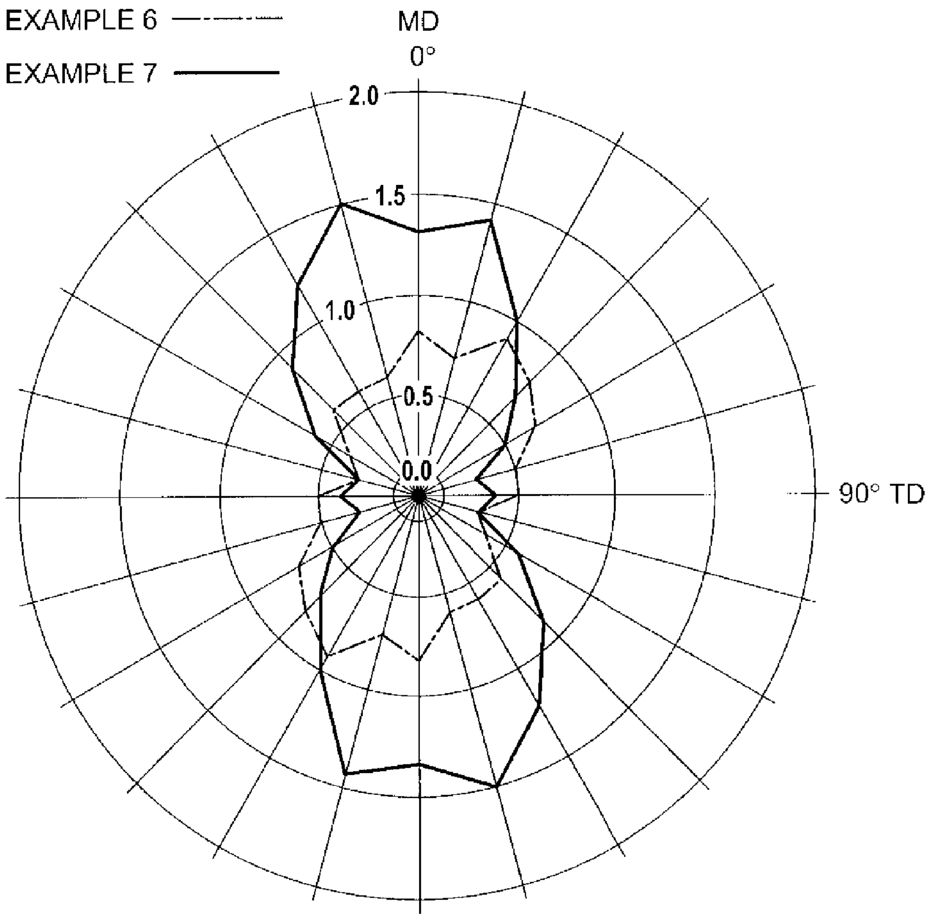
FIG. 19 is a plot of birefringence as a function of angular orientation for Prior Art Examples 6 and 7.

FIG. 19 is a plot of average birefringence as a function of angular orientation for Prior Art Example 6 and Prior Art Example 7. As is apparent from the birefringence scale in FIG. 19, the average birefringence as a function of angular orientation for Prior Art Example 6 was substantially lower than the average birefringence as a function of angular orientation for Prior Art Example 5 (note the approximately 10× scale difference between FIG. 18 and FIG. 19). Similarly, the average birefringence as a function of angular orientation for Prior Art Example 7 was also substantially lower than the average birefringence as a function of angular orientation for Prior Art Example 5. One difference between Prior Art Example 6 and Prior Art Example 7 is that Prior Art Example 6 has no layer containing a high melt point polymer (e.g., polyamide), whereas Prior Art Example 7 contained a high melt point polymer (i.e., polyamide), with the average maximum birefringence of Example 7 being over 65% higher than the average maximum birefringence of Example 6.

As noted on some of the Examples in Table 6, the thermoformed film exhibited "poor forming" during the thermoforming portion of the process. The phrase "poor forming" refers to a cellular cushioning article in which a substantial fraction (i.e., at least 20%) of the cells had a thermoformed region which formed incompletely to the degree that the volume of the resulting cell was reduced by at least 20 percent relative to cells formed using the same size of thermoforming cavity. For example, poor forming resulted when the temperature of the tempering rollers was reduced to such a degree that the thermoformed film became so resistant to thermoforming at substantially 1 atmosphere of pressure, i.e., in a vacuum-based thermoforming process.

TABLE 3

| | Orient. Angle | | | | | | | | |
|---|---|---|---|---|---|---|---|---|---|
| | 0° (MD) | 15° | 30° | 45° | 60° | 75° | 90° (TD) | 105° | 120° |
| Sample 1 | 1.5215 | 1.5221 | 1.5235 | 1.5256 | 1.5291 | 1.5314 | 1.5323 | 1.5318 | 1.5300 |
| Sample 2 | 1.5204 | 1.5202 | 1.5220 | 1.5247 | 1.5277 | 1.5290 | 1.5266 | 1.5237 | 1.5195 |
| Sample 3 | 1.5328 | 1.5345 | 1.5294 | 1.5278 | 1.5233 | 1.5173 | 1.5139 | 1.5147 | 1.5147 |
| Sample 4 | 1.5205 | 1.5211 | 1.5239 | 1.5273 | 1.5296 | 1.5309 | 1.5316 | 1.5305 | 1.5289 |
| Sample 5 | 1.5236 | 1.5262 | 1.5279 | 1.5305 | 1.5319 | 1.5318 | 1.5322 | 1.5284 | 1.5273 |
| Mean RI | 1.5238 | 1.5248 | 1.5253 | 1.5272 | 1.5283 | 1.5281 | 1.5273 | 1.5258 | 1.5241 |
| Mean Bir. [$\times10^{-3}$] | 14.4 | 15.5 | 16.0 | 17.8 | 19.0 | 18.7 | 18.0 | 16.5 | 14.7 |
| Avg. Max. Birefring. ($\times10^{-3}$) | | | | | | | | | |

| | Orient. Angle | | | | Max | Max Bir. |
|---|---|---|---|---|---|---|
| | 135° | 150° | 165° | OOP | RI | [x10−3] |
| Sample 1 | 1.5293 | 1.5254 | 1.5236 | 1.5079 | 1.5323 | 24.4 |
| Sample 2 | 1.5172 | 1.5160 | 1.5183 | 1.5103 | 1.5290 | 18.7 |
| Sample 3 | 1.5217 | 1.5234 | 1.5258 | 1.5109 | 1.5345 | 23.6 |
| Sample 4 | 1.5248 | 1.5223 | 1.5215 | 1.5073 | 1.5316 | 24.3 |
| Sample 5 | 1.5236 | 1.5218 | 1.5228 | 1.5103 | 1.5322 | 21.9 |
| Mean RI | 1.5233 | 1.5218 | 1.5224 | 1.5093 | | |
| Mean Bir. [$\times10^{-3}$] | 14.0 | 12.4 | 13.1 | | | |
| Avg. Max. Birefring. ($\times10^{-3}$) | | | | | | 22.6 |

The degree of forming was visually determined and ranked on a one to ten scale, with a rating of "1" exhibiting a complete degree of thermoforming, and a rating of "10" applied upon at least 90% of the cells having a volume reduced by at least 50% relative to the volume of cells exhibiting a "1" rating. While the rating scale is not provided in the examples in Table 6, a comment indicating "poor forming" was noted if the cells exhibited a degree of thermoforming of more than "6" on the scale described above.

Figure 21:
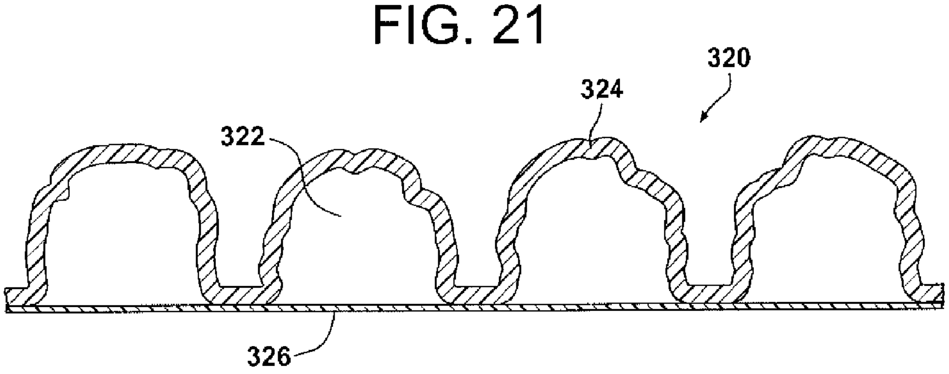
FIG. 21 illustrates a schematic of a cushioning article having cells that exhibit a uniformity of 1 or 2 on a scale of 1-10 in which 1 is highly uniform and 10 is highly non-uniform.

FIG. 21 illustrates a cross-sectional schematic of a cellular cushioning article 320 having cells 322 that exhibit a uniformity of 1 or 2 on a scale of 1 to 10. Cells 322 are "wrinkled" due to (a) the contraction of the air as the air cooled relative to the temperature of the air at the time it was entrapped within the cell, and (b) the contraction of thermoformed regions 324 of the thermoformed film after thermoforming and before the film cooled to room temperature. However, the cross-sectional area inside cells 322 was approximately the same for each of cells 322 because the degree of thermoforming was full and uniform. Not shown, but present in reality, is the fact that the thermoformed film was substantially thinner in thermoformed regions 324, relative to the thickness of the thermoformed film in the land area where the thermoformed film was bonded to backing film 326.

Figure 22:
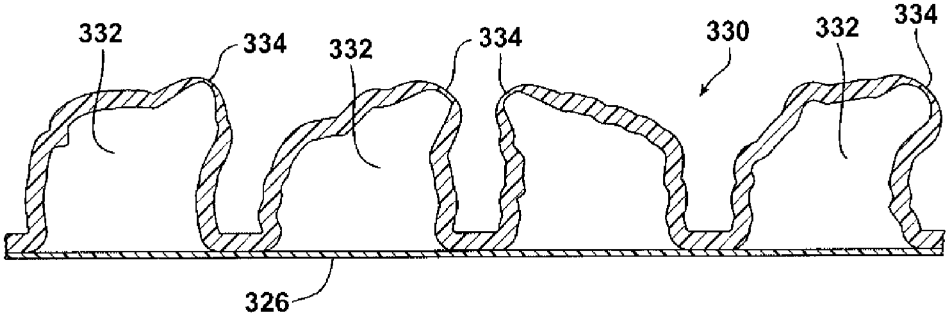
FIG. 22 illustrates a schematic of a cushioning article having cells that that exhibit a uniformity of about 6 on a scale of 1-10 in which 1 is highly uniform and 10 is highly non-uniform.

FIG. 22 illustrates a schematic of a cushioning article 330 having cells 332 that exhibit a uniformity of about 6 on a scale of 1 to 10. The thermoformed regions of cells 332 have "herniated" regions 334 in which the thermoformed film thins out disproportionately relative to the normal thinning that occurs in cells such as are illustrated in FIG. 21. However, cells 332 have substantially consistent volumes because they are substantially fully thermoformed. However, they are less desirable than cells 322 because the herniated regions result in lower cell burst strength.

Figure 23:
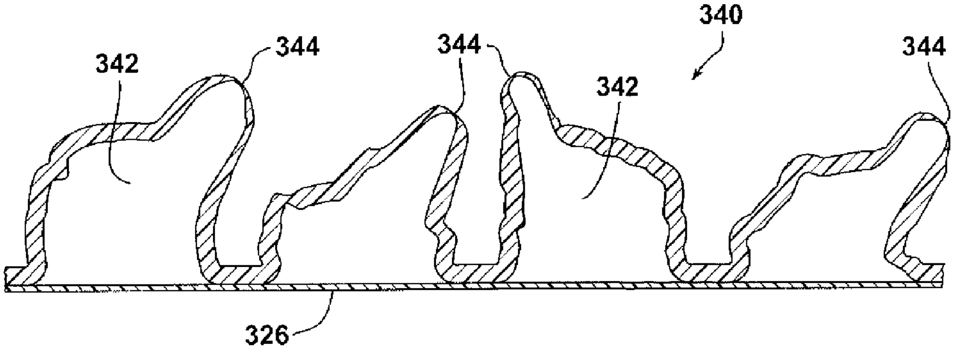
FIG. 23 illustrates a schematic of a cushioning article having cells that that exhibit a uniformity of about 8.5 on a scale of 1-10 in which 1 is highly uniform and 10 is highly non-uniform.

FIG. 23 illustrates a schematic of a cushioning article 340 having cells 342 that exhibit a uniformity of about 9 to 10 on a scale of 1 to 10. The thermoformed regions of cells 342 also have "herniated" regions 334 in which the thermoformed film thins out disproportionately relative to the normal thinning that occurs in cells such as are illustrated in FIG. 21. Moreover, cells 342 also have substantially inconsistent volumes because a substantial number of cells are not substantially fully thermoformed. Cells 342 are less desirable than cells 332 because the herniated regions result in lower cell burst strength and the lack of full thermoforming reduces effective cell height, and thereby reduces the overall volume of cellular cushioning article 340.

EXAMPLES

The resins used in the various film layers in the examples were as follows:

TABLE 4

| Resin Name | Tradename | Generic Name | Density ($g/cm^3$) per ASTM D792 | Melt Index (g/10 min) @190° C. per ASTM @2.16 kg D-1238 |
|---|---|---|---|---|
| LDPE-1 | Novapol ® LA-0219-A | Low density polyethylene homopolymer | 0.918 | 2.3 |
| LDPE-2 | Prothene ® NA951000 | Low density ethylene homopolymer | 0.920 (ASTM D-1505) | 2.2 |
| LLDPE-1 | Novapol ® TF-0438-E | linear ethylene/hexene copolymer | 0.938 | 4.2 |
| LLDPE-2 | Exxon Enable ® 2010CH | metallocene catalyzed ethylene/hexene copolymer | 0.92 | 1.0 |
| PA-1 | Honeywell H135QP | Polyamide 6 homopolymer (formic acid viscosity 135 determined via ASTM D-789) | 1.13 (per ASTM D1-1505) | 1.2 @235° C., 1 kg |
| Tie | Plexar PX3236 | Maleic anhydride-grafted polyethylene | 0.922 (ASTM D-1505) | 2.0 |
| Repro-1 | Reprocessed polymer mixture | 59% linear low density polyethylene;<br>30% low density polyethylene;<br>6% polyamide-6<br>5% maleic anhydride grafted polyethylene | Depends upon materials | Depends upon materials |
| Repro-2 | Reprocessed polymer mixture | 34-40% linear low density polyethylene,<br>25-31% polyamide<br>13-17% propylene/ethylene copolymer,<br>8-12% ethylene-vinyl acetate copolymer,<br>8-12% Polyethylene-based compatibalizers, | Depends upon materials | Depends upon materials |
| Repro-3 | Reprocessed polymer mixture | 64-80% polyethylenes,<br>20-26% polyamides,<br>0-10% EVOH | Depends upon materials | Depends upon materials |
| Repro-4 | Reprocessed polymer mixture | 64-70% polyethylene, 20-26% polyamides, and 10% EVOH | Depends upon materials | Depends upon materials |
| Repro-5 | Reprocessed polymer mixture | 88 to 89% polyethylene,<br>6% polyamide-6,<br>5% maleic anhydride grafted | Depends upon materials | Depends upon materials |

TABLE 4-continued

| Resin Name | Tradename | Generic Name | Density ($g/cm^3$) per ASTM D792 | Melt Index (g/10 min) @190° C. per ASTM @2.16 kg D-1238 |
|---|---|---|---|---|
| | | polyethylene, 0.01 to 1% of black colorant. | | |
| $CaCO_3$ | HM10 Max | masterbatch of 80% $CaCO_3$ in 20% LLDPE | 1.95 | 0.85 |

Example 1 (Working)

The cellular cushioning article of Working Example 1 was prepared by extruding first and second multilayer films using the process as schematically illustrated in FIGS. 4A and 4B, using the extrusion system illustrated schematically in FIG. 7, with each of these figures being described in detail above. The cellular cushioning article had a first film that was a thermoformed film and a second film that was a non-thermoformed (i.e., flat) backing film, with the cellular cushioning article being in accordance with cellular cushioning article schematically illustrated in FIG. 1 and FIG. 2, as described above.

Both the thermoformed film and the backing film were 5-layer films having the layer arrangement A/B/C/B/A with the relative layer thicknesses of 46/1.5/5/1.5/46, in which each A layer was 46% of total film thickness, each B was 1.5% of total film thickness, and the C layer was 5% of total film thickness. The thermoformed film had a total thickness of about 1.7 mils before thermoforming, as well as in the land area after thermoforming. The backing film had a total thickness of about 0.7 mil. The layer composition was as follows (see Table 4 for details regarding the resins identified in Table 5):

TABLE 5

| Layer No. | Layer Type | Composition | Thickness (%) |
|---|---|---|---|
| 1 | A | 60% LLDPE-1 + 40% LDPE-1 | 46 |
| 2 | B | 100% Tie-1 | 1.5 |
| 3 | C | 100% PA-1 | 5 |
| 4 | B | 100% Tie-1 | 1.5 |
| 5 | A | 60% LLDPE-1 + 40% LDPE-1 | 46 |

The first film (i.e., the film to be thermoformed) was fully coextruded through coextrusion system 118 and emerged from slot die 136 which had a width of 56 inches and a die gap 0.020 inch, with bulk layers 1 and 5 being supplied as split streams 128*a* and 128*b* from a first extruder A, tie layers 2 and 4 being supplied as a split streams 130*a* and 130*b* from second extruder B, and barrier layer 3 being supplied by third extruder C (see FIG. 7). The extrudate was pumped out of the die as stream 138. Approximately 268 kg/hr emerged from die slot 136. The first film emerged from the die with a width of 56 inches.

Of course, the second film was also fully coextruded through coextrusion system 118, and emerged from a slot die having a width of 54 inches and a die gap of 0.018 inch. Bulk layers 1 and 5, and tie layers 2 and 4, were supplied as split streams from extruders A and B, respectively. Barrier layer 3 was supplied by extruder C. See FIG. 7. The extrudate was pumped out of the slot die at a rate of 107 kg/hr.

Immediately upon emergence from the die, the first film was guided in a partial wrap of about 105 degrees (7.3 inches contact distance) around a first tempering roller and then in a partial wrap of about 117 degrees (8.2 inches contact distance) around a second tempering roller. Both the first and second tempering rollers were powered to pull the first film as it emerged from the die. The first tempering roller had an axial length of 60 inches and a diameter of 8 inches (i.e., 200 mm) and was operated at a surface speed of 133 ft/min. The second tempering roller had a length of 60 inches and a diameter of 7.875 inches and was operated at a surface speed of 250 ft/min. The film was stretched between the slot die and first tempering roller 90, as well as between the first tempering roller 90 and the second tempering roller 92. See FIG. 4A.

Both of the tempering rollers were Model TX 800 heat transfer rollers obtained from Webex, Inc. Each of the tempering rollers was made from chrome plated steel; each had an outer diameter of 8 inches. Each tempering roller had a sandblasted outer surface finish within a range from 250 to 500 microinches average deviation from the mean surface.

In working Example 1, 190° F. water was pumped into the first tempering roller 90, and 190° F. water was also pumped into the second tempering roller 92. Water was passed through each tempering roller at a rate of 50 gallons per minute. The 190° F. water temperature was selected so that during contact with the rollers, the extrudate would be brought to a desired thermoforming temperature that resulted in discrete thermoformed regions exhibiting a higher burst strength per mil of film thickness than if 245° F. water was pumped into each tempering roller.

Upon exiting the second tempering roller, the first film had a thickness of 1.7 mils and proceeded onto a thermoforming drum having an axial length of 60.125 inches and a diameter of 21 inches. The thermoforming drum was made from machined aluminum and had a plurality of forming cavities in fluid communication with an internal vacuum source. The drum also had internal channels through which water was pumped (at a rate of 90 gallons per minute) in order to maintain the forming drum at a desired temperature. The water had a temperature of 120° F. The cavities in the forming drum had an arrangement and size in accordance with FIG. 10A and FIG. 10B, described above. As disclosed in Table 6, the forming cavities had a base diameter (i.e., diameter at the outer surface of the forming drum) of 34.3 mm and a depth of 17.1 mm. The rotation of the forming drum was powered, so that the outermost surface of the forming drum had a surface speed of 250 feet per minute.

Upon contacting the forming drum, discrete regions of the first film, positioned over the forming cavities, were drawn into the cavities by the force created by the evacuation of air within the now-covered cavities. In working Example 1, the forming cavities were of a shape, arrangement, and size as illustrated in FIGS. 10A and 10B, as described above.

As more fully described above in connection with FIG. 1 and FIG. 2, the thermoforming of the first film resulted in the formation of a plurality of discrete thermoformed regions in the first film. An unformed land area separated each of the formed regions from one another. As illustrated in FIG. 4A, the second film 88 did not contact any tempering roller before contacting the vacuum forming drum. The second film had a thickness of 0.7 mils and was brought into contact with the first film on the forming drum 94 while the second film was at or above its fusion temperature, with the second film adhering, via heat bonding, to the land area region of the of the outer surface of the bonding layer of the first film, to form cells entrapping air between each of the discrete thermoformed portions of the inside (overall concave) surface of the first film, and the discrete regions of the inside surface of the (flat) bonding film juxtaposed across from each discrete thermoformed region of the first film.

The resulting cellular cushioning article had a plurality of discrete cells as illustrated in FIG. 1 and FIG. 2, described above. Each cell had a round "footprint," i.e., the shape of the discrete areas of the inside surface of the second film that were not bonded to the first film. Cell volume was calculated by multiplying the footprint area by the cell height. Footprint size corresponded with the diameter of the cavity in the forming drum, i.e., 31.3 mm.

Cell height was measured using a dial-type drop indicator, purchased from the BC Ames company. The drop indicator was equipped with a 4-inch diameter aluminum foot plate. The drop indicator had a weight added to it so that the 4-inch diameter aluminum foot plate exerted a total force of 16 ounces on the sample measured. The 4-inch diameter foot was lowered onto a single layer of the cellular cushioning article and contacted the top surfaces of a plurality of cells, with the cellular cushioning article being supported by a flat, rigid surface, with the outside surface of the backing film in contact with the support surface. The foot plate was left to settle for 5 seconds before a height reading was taken. Six measurements were taken across a 12 inch by 36 inch sample of the cellular cushioning article, with the average cell height being the average of the six readings taken from the drop indicator.

In working Example 1, as the cavity diameter was 31.3 mm where the cavity met the outer surface of the forming drum, and the average cell height was measured to be 13.3 mm, the cells were calculated to have an average volume of 10.55 $cm^3$ per cell.

Determination of average volume for cellular cushioning articles produced by competitors (e.g., Examples 6, 7, etc) or using forming cavities of unknown size, was carried out by measuring average cell height in the same manner as used in working Example 1. However, the area of the cell footprint was determined by measuring the diameter of the footprint in the cellular cushioning article, and thereafter calculating the footprint area using the formula $A=\pi r^2$, in which r represents the radius of the circular footprint, and in which $r=\frac{1}{2}d$, with d representing the diameter of the footprint. The cellular cushioning article of working Example 1 had a "basis weight" of 65 grams per 12 square feet. As used herein, the phrase "basis weight" refers to the weight of 12 square feet of the cellular cushioning article.

The cellular cushioning article of working Example 1 exhibited an average burst strength of 4.2 psi. Burst strength per mil for working Example 1 was calculated by dividing the average burst strength (4.2 psi) by the thickness of the first film (i.e. the thermoformed film) at the land area. The thermoformed film of Example 1 had a land area thickness of 1.7 mils. Accordingly, the cellular cushioning article of working Example 1 had a burst strength ratio of 4.2 psi/1.7 mils=2.47 psi/mil.

Cell burst strength was measured by cutting a hole in the backing film and thereafter inflating the cell through the hole until the cell ruptures. The pressure at which the cell ruptures is herein referred to as the cell burst strength, with the pressure recorded as pounds per square inch (psi).

Figure 20A:
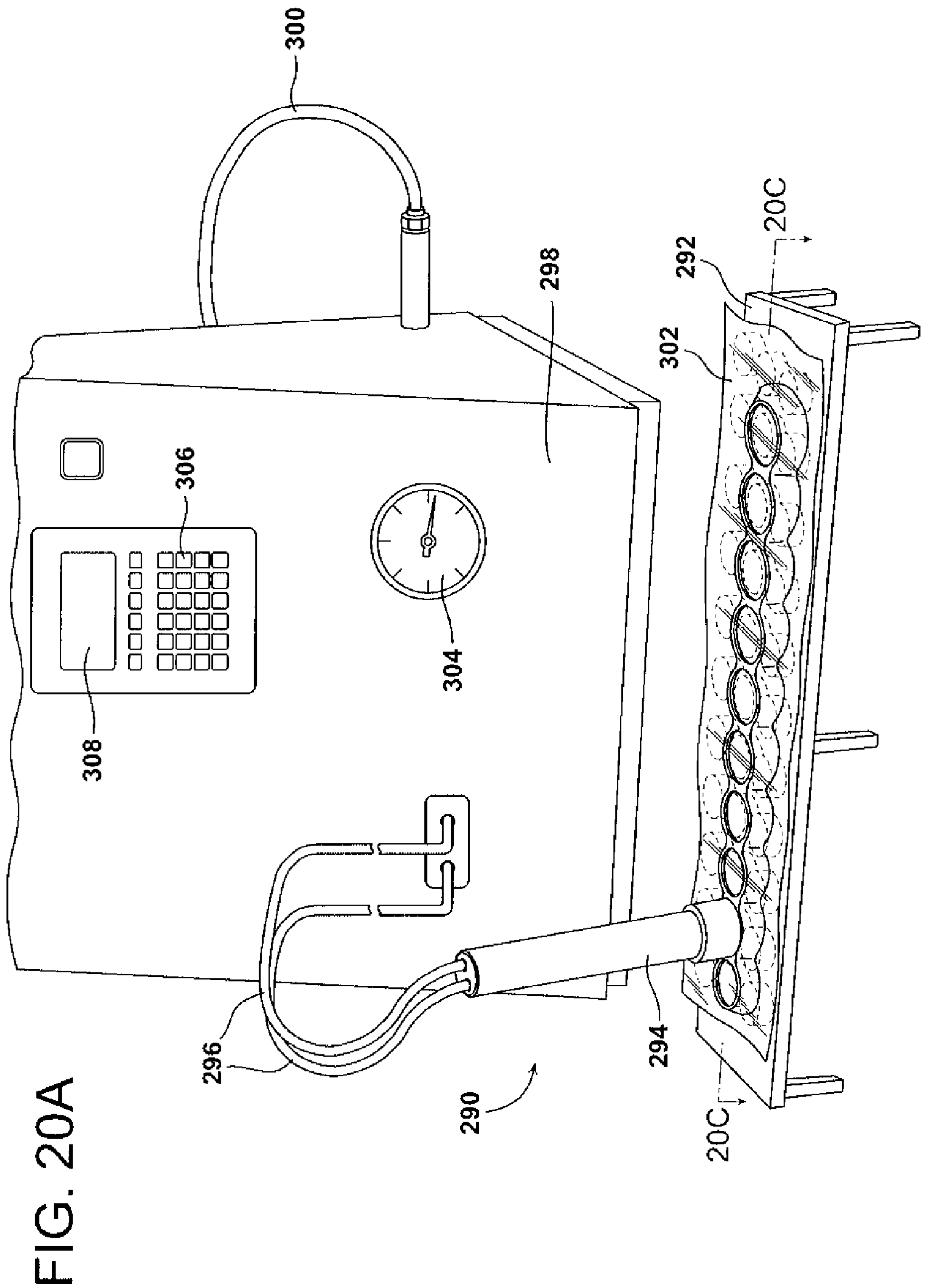
FIG. 20A illustrates the method of determining cell burst strength.
Figure 20B:
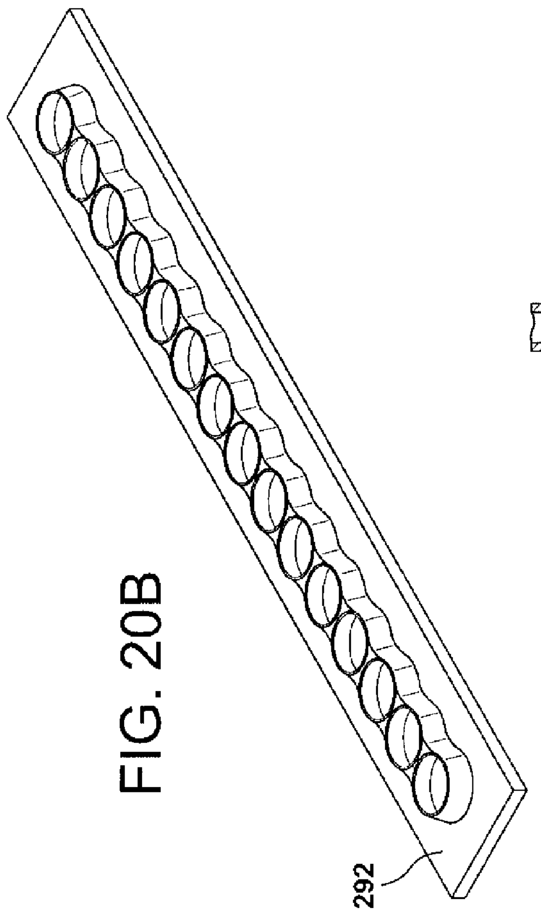
FIG. 20B illustrates the cell strip holder for use in the burst test method illustrated in FIG. 20A.

FIG. 20A illustrates the apparatus used for the measurement of cell burst strength for the examples. FIG. 20A illustrates Cell Burst Strength Tester 290, which includes burst strength mounting fixture 292, air-inflation nozzle 294 supplied with air through air lines 296 from programmable air control and pressure monitoring device 298. Air control and pressure monitoring device 298 further comprises pressure gauge 304 and computer keypad 306 with display screen 308. Air control and pressure monitoring device 298 is supplied with air from an air compressor (not illustrated) via air supply line 300. FIG. 20B illustrates the cell strip holder 292 for use in the burst test method illustrated in FIG. 20A.

Figure 20C:
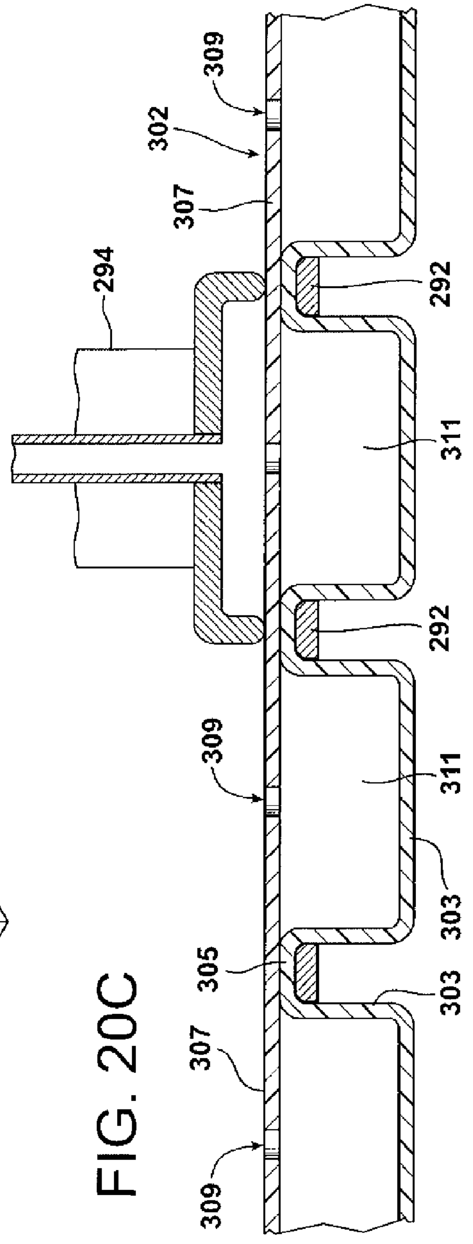
FIG. 20C is a schematic cross-sectional view of a portion of the cell strip holder and cell strip sample illustrated in FIG. 20A.

FIG. 20C is a schematic cross-sectional view taken through section 20C-20C of FIG. 20A, illustrating a portion of cell strip holder 292 supporting a portion of air cellular sample 302, with thermoformed regions 303 of the thermoformed film hanging down through the apertures in cell strip holder 292, and with the land area of the thermoformed film being supported by cell strip holder 292. Also shown in FIG. 20C is air-inflation nozzle 294 used to inflate cell 311 until it bursts by providing pressurized air into cell 311 through hole 309.

Of course, different sized cell strip holders 292 are used for different sizes of thermoformed regions. Also illustrated in FIG. 20A is air cellular sample 302 in place on mounting fixture 292, with air-inflation nozzle 294 positioned to inflate a test cell with air until bursting occurs, with air-inflation nozzle 294 forming a substantially airtight seal against the backing film of the air cellular sample 302, by trapping the backing film between air-inflation nozzle 294 and mounting fixture 292.

In carrying out the burst strength test as illustrated in FIG. 20A, a 12"×3" sample of an air cellular article was cut free, with the discrete 31.8 mm diameter thermoformed regions of the thermoformed film being snugly fitted into respective holes in mounting fixture 292. A knife (not illustrated) is used to cut through the backing film of each cell in order to provide a passageway for air to inflate the cell via air-inflation nozzle 294.

Burst testing was carried out by measuring the burst strength of each cell in a row of cells extending across the entirety of the width of the cellular cushioning article. If the web was, for example, 12 inches wide and included rows of eight cells across the entirety of the web, then each of the eight cells was tested for burst strength. The burst strength recorded for each cell in the row was determined, and then the burst strengths were averaged to determine the designated average burst strength of the cells in the row. In all of the testing, each cell was inflated at a rate of 0.05 liter per minute. The diameter of air-inflation nozzle 294 was sized to go around the base of the cell, i.e., was different for the large cells than for the small cells. Each cell was inflated until it burst, with the maximum pressure obtained during inflation being recorded. In some samples, the maximum pressure occurred at bursting, while in other samples the maximum pressure occurred before bursting.

The cellular cushioning article of working Example 1 exhibited a haze level of 18.6 percent, measured in accordance with ASTM D-1003 Procedure A. Haze readings were an average of 8 different locations on each cellular cushioning article tested, with each cell facing towards the light source, with a cell centered on the port.

The discrete thermoformed regions of the thermoformed film of working Example 1 exhibited an average maximum birefringence of $22.6\times10^{-3}$. The average maximum birefringence was calculated from refractive index measurements taken a portion of an embossment from selected cell 230 taken from the cellular cushioning article of working Example 1.

The refractive index measurements were made using a Metricon® Model 2010 Prism Coupler Thin Film Thickness/Refractive Index Measurement System (hereinafter "Model 2010"), obtained from Metricon Corporation, PO Box 63, Pennington, N.J. 08543. The Model 2010 was operated in accordance with the manufacturer's instructions as set forth in the Operating and Maintenance Guide Rev. (September 1991), copyright 1991 Metricon Corporation. The "prism" (also referred to as the "crystal") used was the 200-P-1 prism provided by Metricon Corporation with the Model 2010. The 200-P-1 prism was of the GGG type (i.e. Gadolinium Gallium Garnet), and was specified by Metricon as being suitable for measuring the refractive index of films with a refractive index less than 1.80.

Refractive index sample preparation was initiated as illustrated in FIG. 12. First, a cellular cushioning article sample to be evaluated was placed in direct contact with a flat, rigid surface (e.g., a table top), with the outside surface of the flat backing film placed down in direct contact with the flat surface. The cellular cushioning article sample had a size of about 40 cm by 40 cm. The MD direction was then determined by examining the upper film, i.e., the thermoformed film, or the lower film (i.e., the flat backing film) to determine the orientation of the die lines on the tops of the embossments on the thermoformed film. The die lines corresponded to the machine direction.

A felt-tipped pen (a Sharpie® brand permanent marker in extra fine point or ultra fine point) was then used to manually mark MD line 232 along the first film in the machine direction. MD line 232 was made across the middle of the outside surface of a discrete thermoformed region (i.e., hereinafter "embossment") of selected cell 230, as illustrated in FIG. 12. The marker was then used to mark TD line 234 on the outside surface of the embossment of selected cell 230, with TD line being along the transverse direction, i.e., a direction 90 degrees to the machine direction.

As illustrated in FIG. 12, TD line 234 was made in a location on the outside surface of the embossment so that TD line 234 intersected MD line 232 at a position along "rim" 237 of the embossment. Rim 237 is in an area representing the transition between side wall 233 of the embossment and top 235 of the embossment. The film within rim 237 is generally the thinnest film in the embossment, and is also the most highly oriented portion of the film making up the embossment. The intersection of the MD and TD lines identified that portion of the embossment tested for refractive index. The refractive index data was then used to calculate the maximum birefringence exhibited by the embossment.

After the embossment was marked with MD line 232 and TD line 234, the next step was to affix, to the outside surface of the embossment, a first surface of a piece (sized to about 10 mm by 19 mm) of double coated tape (Scotch® brand Double Coated Tape with liner, identified as "666", from a roll 19 mm wide by 32.9 m long) at a location centering over the intersection of MD line 232 and TD line 234. Then, the cell 230 containing the embossment with double coated tape thereon was cut free from the remainder of the cellular cushioning article, thereby appearing as illustrated in FIG. 12, but with the small piece of double coated tape affixed over the intersection of MD line 232 and TD line 234. After cell 230 was free of the remainder of the cellular cushioning article, a cut was made across the base of the cell, i.e., through side wall 233 of the embossment, along a line just above the heat weld between the thermoformed film and the backing film. Upon completion of the cut all the way around the base of the embossment, the piece of backing film (having the base of the thermoformed film attached by the heat weld) was discarded. The remaining material was the sample to be tested, i.e., the majority of embossment 230, which contained MD line 232, TD line 234, and which had affixed to its outside surface the small piece of double coated tape.

The second surface of the piece of double-coated tape was then affixed to paper sample holder 238 (see FIG. 13A) having a printed circular grid thereon. The sample holder had a 0 degree marking indicating the machine direction. The sample holder also had markings for 15 degrees, 30 degrees, 45 degrees, 60 degrees, 75 degrees, 90 degrees, 105 degrees, 120 degrees, 135 degrees, 150 degrees, 165 degrees, and 180 degrees, with the 90 degree line being designated as the TD direction.

The clarity of the thermoformed film making up the embossment, and the clarity of the double-coated tape, allowed the intersection point of MD line 232 and TD line 234 to be placed directly over the center of the circular grid of sample holder 238. MD line 232 was aligned with the 0 degree MD line on sample holder 238, with TD line 234 being placed over and aligned directly with the 90 degree TD line on sample holder 238. The majority of the embossment was then cut away and discarded, so that a remaining approximately 10 mm×19 mm "sample" 250 from the embossment was affixed to sample holder 238 via double coated tape 248. The resulting combination of the embossment with MD line 232, TD line 234, double coated tape 248, and sample holder 238, together constituted pre-mounted sample assembly 246, illustrated in FIG. 13B.

Pre-mounted sample assembly 246 was then placed into the Model 2010 for the assessment of various refractive index measurements to be used for the determination of the maximum birefringence of sample 250 from the embossment being tested. FIG. 12C is a schematic illustration of pre-mounted sample assembly 246 after installation in the Model 2010. The Model 2010 held pre-mounted sample assembly 246 with the exposed surface of the sample (which was the surface of the embossed film that corresponded with the "inside" surface of the embossment) held in pressed contact with 200-P-1 prism 252. The exposed surface of sample 250 of pre-mounted sample assembly 246 was pressed against the 200-P-1 prism by a pneumatically-controlled piston having piston head 254 having a convex contact surface with a radius of 12.7 mm (i.e., ½-inch), with the contact surface having two layers of electrical tape (each piece being approximately 6 to 7 mm by 6 to 7 mm) thereon, more particularly, Scotch® brand electrical tape obtained from 3M Corporation) adhered thereto, with the non-stick side of the outer piece of electrical tape being in pressed engagement with the backside of paper sample holder 238. The piston shaft was pneumatically powered to press against pre-mounted sample assembly 246 with a pressure of 44 psi applied to piston head 254.

The polarized light in the prism coupler was set to vibrate parallel to the sample plane. The sample holder was then positioned in an orientation so that the machine direction was oriented parallel with respect to the incident light polarization, and the instrument was operated according to the manufacturer's instructions for the measurement of the refractive index of the sample. The sample holder was then rotated so that the markings for 0 degrees, 15 degrees, 30 degrees, 45 degrees, 60 degrees, 75 degrees, 90 degrees, 105 degrees, 120 degrees, 135 degrees, 150 degrees, and 165 degrees were parallel with the incident polarized light, and refractive index measurements were taken at each position. Finally, the polarized light in the prism coupler was set to vibrate perpendicular to the film plane, and another measurement was taken to measure the normal direction (perpendicular to the film surface plane) refractive index.

In the operation of the prism coupler, the motor on the turntable was engaged while the intensity of light that was reflected from the prism/sample interface was recorded. A plot was made of light intensity versus incident angle. At the critical angle defined by Snell's Law, the light entered the sample, reducing reflected intensity. At the point on the plot where the slope deviated from the horizontal, i.e., the point referred to as the "knee," the Metricon software marked the critical angle and calculated the refractive index, applying Snell's Law.

Some samples, for unknown reasons, did not produce a sharp knee but instead produced a gradual change in slope. For these samples in which software did not identify the critical angle, manual identification of the shoulder as required. More particularly, if the slope of the curve of the plot of intensity versus refractive index did not exhibit a sharp "knee" which the computer was capable of detecting using the Metricon software, then a manual assessment of curve was made. The manual assessment determined the position on the curve exhibiting the maximum rate of change of slope. The refractive index corresponding with this position on the curve was deemed to be the refractive index of the sample at the particular angular orientation being assessed.

A traditional method for measuring birefringence of a film has utilized a microscope together with filters and polarizers. This traditional method is complex and difficult for the determination of birefringence in which the in plane refractive index at a particular angular orientation and the refractive index in the normal direction (i.e., the out of plane direction) together determine the birefringence at the particular angular orientation.

In contrast, the method for birefringence determination described herein is simpler and more direct, in that it directly measures refractive index as a function of angular orientation, as well in the normal direction, with a simple calculation of birefringence as a function of angular orientation relative to the normal direction. The resulting maximum birefringence as disclosed herein assesses birefringence within the three-dimensional polymer network, and thereby assesses the degree of stress on the polymer chains, which has been found to correlate with high burst strength per mil of film land area thickness in the cellular cushioning article of the invention.

For each refractive index $n_\theta$ in the film plane, the birefringence $\Delta n$ could be calculated by subtracting the index in the normal direction, $n\perp$, that is, $\Delta n = n_\theta - n\perp$. Results were plotted in a radial (polar) format to graphically illustrate the distribution of measured birefringence. Due to rotational symmetry, values for 180° to 345° will duplicate those for 0° to 165°, and hence were not measured but were assumed to correspond exactly. A minimum of 3 samples 250 were measured, and the maximum birefringence was calculated for each of the samples. As stated above, the average maximum birefringence value of $22.6\times10^{-3}$ was obtained for working Example 1.

Examples 2-114

Examples 2-79, 82-85, 91-92, and 97-114, below, were, in general, carried out in the manner described in working Example 1, above. Of course, various process and composition parameters were varied in Examples 2-79, 82-85, 91-92, and 97-114, such as film layer arrangement, film layer composition, relative layer thickness, film thicknesses for first and second films, basis weight of cellular cushioning article, cell volume, cell height, tempering roll temperature, line speed, extruder temperature, average maximum birefringence, average haze, average burst strength, average burst strength per mil, average burst strength per mil increase relative to the burst strength of an analogous process in which the tempering roll temperature was 245° F. or 240° F. Air cellular cushioning articles produced by competitors are the subject matter set forth in examples 6, 7, 80, 81, 86-90, and 93-96. These air cellular articles were analyzed in essentially the same manner as was carried out for examples 2-79, 82-85, 91-92, and 97-111, with corresponding article properties set forth in Table 6.

In Table 6: Table of Examples, below, the value reported for the tempering roll temperature was the temperature of the water being pumped into the tempering rollers. Unless otherwise indicated, the tempering roller temperature value in Table 6 applies to both the first tempering roller and the second tempering roller. Each tempering roller was as shown in FIG. 4B, described above.

TABLE 6

Table of Examples

| Sample Source | Ex No. | Temperng Roll (° F.) | W, C or UND | Burst Str (psi) | psi/mil: % ↑@ ° F. vs. 245 F. | Avg. Max. Bire-fringence ($\times10^{-3}$) | Haze (%) | Basis weight (g/12 ft²) | Winder Speed (ft/min) | Burst Ratio (psi/Mil | Front/Back films (mils) | Cavity Diam/depth/radius (mm) | Cell Vol. (cm³) | Cell hgt (mm) | Feature(s) |
|---|---|---|---|---|---|---|---|---|---|---|---|---|---|---|---|
| SAC | 1 | 190 | W | 4.2 | +62 | 22.6 | 18.6 | 65 | 250 | 2.47 | 1.7/0.7 | 31.8/17.1/7.9 | 10.55 | 13.3 | A/B/C/B/A; @ 46/1.5/5/1.5/46; A = 60% LLDPE-1, w/40% LDPE-1 B = Tie; C = PA-1 |
| SAC | 2 | 200 | W | 3.4 | +31 | 21.1 | 24.5 | 65 | 250 | 2.0 | 1.7/0.7 | 31.8/17.1/7.9 | 10.15 | 12.8 | Same as Ex. 1 |
| SAC | 3 | 210 | W | 2.8 | +7.7 | 17.5 | 34.0 | 65 | 250 | 1.65 | 1.7/0.7 | 31.8/17.1/7.9 | 9.89 | 12.5 | Same as Ex. 1 |

TABLE 6-continued

Table of Examples

| | | | | | | | | | | | | | | | |
|---|---|---|---|---|---|---|---|---|---|---|---|---|---|---|---|
| SAC | 4 | 220 | | 2.6 | 0 | 16.5 | 42.8 | 65 | 250 | 1.53 | 1.7/ 0.7 | 31.8/ 17.1/ 7.9 | 9.95 | 12.6 | Same as Ex. 1 |
| SAC | 5 | 245 | PA | 2.6 | 0 | 5.5 | 22.4 | 65 | 250 | 1.53 | 1.7/ 0.7 | 31.8/ 17.1/ 7.9 | 9.89 | 12.5 | Same as Ex. 1 |

| Sample Source | Ex No. | Temperng Roll (° F.) | Wrk vs Cpr | Burst Strength (psi) | psi/ mil: % ↑@ ° F. vs. 245 F. | Avg. Max. Bire- fringence ($\times 10^{-3}$) | Haze (%) | Basis weight (g/12 $ft^2$) | Winder Speed (ft/min) | Burst Ratio (psi/ Mil | Front/ Back films (mils) | Cav- ity Diam/ depth/ radius (mm) | Cell Vol. ($cm^3$) | Cell hgt (mm) | Feature(s) |
|---|---|---|---|---|---|---|---|---|---|---|---|---|---|---|---|
| Polyair | 6 | N/A | PA | 3.8 | Unk | 0.9 | 23.1 | 98 | UNK | 1.60 | 2.37/ 1.36 | 31.8 | 8.14 | 10.3 | Competitive Commercial Product; No high melt point layer |
| Pregis | 7 | N/A | PA | 3.6 | Unk | 1.5 | 10.2 | 62 | UNK | 1.96 | 1.84/ 0.67 | 31.8 | 9.85 | 12.4 | Competitive Commercial Product Has high melt point layer Contains 2.3% polyamide |

| Sample Source | Ex No. | Temperng Roll (° F.) | Wrk vs Cpr | Burst Strength (psi) | psi/ mil: % ↑@ ° F. vs. 245 F. | Avg. Max. Bire- fringence ($\times 10^{-3}$) | Haze | Basis weight (g/12 $ft^2$) | Winder Speed (ft/min) | Burst Ratio (psi/ Mil | Front/ Back films (mils) | Cavity Diam/ depth/ radius (mm) | Cell Vol. ($cm^3$) | Cell hgt (mm) | Feature(s) |
|---|---|---|---|---|---|---|---|---|---|---|---|---|---|---|---|
| SAC | 8 | 190 | W | 4.0 | +60 | N/M | 68.7 | 65 | 250 | 2.35 | 1.7/ 0.7 | 31.8/ 17.1/ 7.9 | 10.61 | 13.4 | A/B/C/B/A; @46/1.5/ 5/1.5/46 A = 55% LLDPE-1, w/ 35% LDPE-1, & w/ 10% $CaCO_3$ B = Tie; C = PA-1 |
| SAC | 9 | 200 | W | 3.5 | +40 | 16.9 | 71.0 | 65 | 250 | 2.06 | 1.7/ 0.7 | 31.8/ 17.1/ 7.9 | 9.95 | 12.6 | Same as Ex. 8 |
| SAC | 10 | 210 | | 2.9 | +16 | N/M | 79.4 | 65 | 250 | 1.71 | 1.7/ 0.7 | 31.8/ 17.1/ 7.9 | 9.85 | 12.4 | Same as Ex. 8 |
| SAC | 11 | 220 | C | 3.0 | +20 | 8.5 | 73.7 | 65 | 250 | 1.76 | 1.7/ 0.7 | 31.8/ 17.1/ 7.9 | 9.89 | 12.5 | Same as Ex. 8 |
| SAC | 12 | 245 | C | 2.5 | 0 | N/M | 67.3 | 65 | 250 | 1.47 | 1.7/ 0.7 | 31.8/ 17.1/ 7.9 | 9.85 | 12.4 | Same as Ex. 8 |
| SAC | 13 | 190 | | 3.7 | +68 | 29 | 20.0 | 50 | 250 | 3.08 | 1.2/ 0.5 | 31.8/ 17.1/ 7.9 | 10.15 | 12.8 | Same as Ex. 8 |
| SAC | 14 | 200 | | 3.5 | +59 | 26.5 | 18.3 | 50 | 250 | 2.92 | 1.2/ 0.5 | 31.8/ 17.1/ 7.9 | 9.99 | 12.6 | Same as Ex. 8 |
| SAC | 15 | 210 | | 3.0 | +36 | 20.1 | 22.8 | 50 | 250 | 2.5 | 1.2/ 0.5 | 31.8/ 17.1/ 7.9 | 10.13 | 12.8 | Same as Ex. 8 |
| SAC | 16 | 220 | | 2.5 | +14 | 21.2 | 32.9 | 50 | 250 | 2.08 | 1.2/ 0.5 | 31.8/ 17.1/ 7.9 | 10.05 | 12.7 | Same as Ex. 8 |
| SAC | 17 | 245 | C | 2.2 | 0 | 14.4 | 25.4 | 50 | 250 | 1.83 | 1.2/ 0.5 | 31.8/ 17.1/ 7.9 | 9.79 | 12.4 | Same as Ex. 8 |

TABLE 6-continued

Table of Examples

| Sample Source | Ex No. | Temperng Roll (° F.) | Wrk vs Cpr | Burst Strength (psi) | psi/mil: % ↑@ ° F. vs. 240 F. | Avg. Max. Bire-fringence ($\times10^{-3}$) | Haze | Basis weight (g/12 $ft^2$) | Winder Speed (ft/min) | Burst Ratio (psi/ Mil | Front/ Back films (mils) | Cavity Diam/ depth/ radius (mm) | Cell Vol. ($cm^3$) | Cell hgt (mm) | Feature(s) |
|---|---|---|---|---|---|---|---|---|---|---|---|---|---|---|---|
| SAC | 18 | $150^T/240^B$ | | 4.3 | +54 | N/M | 26.8 | 65 | 212 | 2.53 | 1.7/ 0.7 | 31.8/ 17.1/ 7.9 | 10.22 | 12.9 | A/B/B/C/ D/C/A; @26/20/20/ 1.5/5/1.5/26 A = 60% LLDPE-1, w/ 40% LDPE-2 B = 50% LLDPE-1, w/ 50% Repro-2 C = tie; D = PA Two tempering roller temperatures |
| SAC | 19 | $180^T/240^B$ | | 3.1 | +11 | N/M | 68.7 | 65 | 212 | 1.82 | 1.7/ 0.7 | 31.8/ 17.1/ 7.9 | 9.87 | 12.5 | Same as Ex. 18 |
| SAC | 20 | $210^T/240^B$ | | 3.0 | +7.1 | N/M | 32.8 | 65 | 212 | 1.77 | 1.7/ 0.7 | 31.8/ 17.1/ 7.9 | 9.75 | 12.3 | Same as Ex. 18 |
| SAC | 21 | $240^T/240^B$ | PA | 2.8 | 0 | N/M | 35.8 | 65 | 212 | 1.65 | 1.7/ 0.7 | 31.8/ 17.1/ 7.9 | 9.78 | 12.4 | Same as Ex. 18 |
| SAC | 22 | $150^T/240^B$ | | 3.6 | +64 | N/M | 24.1 | 50 | 212 | 3.00 | 1.2/ 0.5 | 31.8/ 17.1/ 7.9 | 10.37 | 13.1 | Same as Ex. 18 |
| SAC | 23 | $180^T/240^B$ | | 3.2 | +45 | N/M | 29.8 | 50 | 212 | 2.67 | 1.2/ 0.5 | 31.8/ 17.1/ 7.9 | 10.17 | 12.8 | Same as Ex. 18 |
| SAC | 24 | $210^T/240^B$ | | 2.4 | +9 | N/M | 60 | 50 | 212 | 1.99 | 1.2/ 0.5 | 31.8/ 17.1/ 7.9 | 9.93 | 12.5 | Same as Ex. 18 |
| SAC | 25 | $240^T/240^B$ | C | 2.2 | 0 | N/M | 55.3 | 50 | 212 | 1.87 | 1.2/ 0.5 | 31.8/ 17.1/ 7.9 | 9.92 | 12.5 | Same as Ex. 18 |
| SAC | 26 | 200 | | 3.5 | +63 | N/M | 47.8 | 85 | 200 | 1.58 | 2.2/ 0.9 | 31.8/ 17.1/ 7.9 | 8.42 | 10.6 | A/A/A/B/ A/B/A @26/20/20/ 1.5/5/1.5/26 A = 55% LLDPE-1, w/ 30% LDPE-1, w/15% Repro-1 B = tie; No high melt point layer; Exhibited poor forming; Could not measure birefringence |
| SAC | 27 | 210 | | 2.6 | +24 | N/M | 64.3 | 85 | 200 | 1.18 | 2.2/ 0.9 | 31.8/ 17.1/ 7.9 | 9.84 | 12.4 | Same as Ex. 26; Exhibited poor forming Could not measure birefringence |
| SAC | 28 | 220 | | 2.5 | +19 | 5.6 | 28.4 | 85 | 200 | 1.14 | 2.2/ 0.9 | 31.8/ 17.1/ 7.9 | 9.66 | 12.2 | Same as Ex. 26 but formed well |
| SAC | 29 | 230 | | 2.4 | +14 | 7.8 | 24.5 | 85 | 200 | 1.11 | 2.2/ 0.9 | 31.8/ 17.1/ 7.9 | 9.71 | 12.3 | Same as Ex. 26 but formed well |
| SAC | 30 | 240 | C | 2.1 | 0 | 7.2 | 23.9 | 85 | 200 | 0.97 | 2.2/ 0.9 | 31.8/ 17.1/ 7.9 | 9.71 | 12.3 | Same as Ex. 26 but formed well |
| SAC | 31 | 200 | | 5.9 | +246 | N/M | 23.5 | 65 | 200 | 3.46 | 1.7/ 0.7 | 31.8/ 17.1/ 7.9 | 8.11 | 10.2 | A/A/A/B/ A/B/A @26/20/20/ |

TABLE 6-continued

Table of Examples

| | | | | | | | | | | | | | | | |
|---|---|---|---|---|---|---|---|---|---|---|---|---|---|---|---|
| | | | | | | | | | | | | | | | 1.5/5/1.5/26 A = 55% LLDPE-1, w/ 30% LDPE-2, w/15% Repro-1 B = tie; No high melt point layer; Exhibited poor forming; Could not measure birefringence |
| SAC | 32 | 210 | | 3.6 | +114 | N/M | 34.7 | 65 | 200 | 2.14 | 1.7/ 0.7 | 31.8/ 17.1/ 7.9 | 8.67 | 11.0 | Same as Ex. 31 Exhibited poor forming; Could not measure birefringence |
| SAC | 33 | 220 | | 1.5 | −8 | 16.1 | 62.5 | 65 | 200 | 0.90 | 1.7/ 0.7 | 31.8/ 17.1/ 7.9 | 9.33 | 11.8 | Same as Ex. 31 |
| SAC | 34 | 230 | | 1.9 | +16 | 10.6 | 60.5 | 65 | 200 | 1.14 | 1.7/ 0.7 | 31.8/ 17.1/ 7.9 | 9.47 | 12.0 | Same as Ex. 31 but formed well |
| SAC | 35 | 240 | C | 1.7 | 0 | 9.0 | 33.6 | 65 | 200 | 0.98 | 1.7/ 0.7 | 31.8/ 17.1/ 7.9 | 9.77 | 12.3 | Same as Ex. 31 but formed well |

| Sample Source | Ex No. | Tempemg Roll (° F.) | Wrk vs Cpr | Burst Strength (psi) | psi/ mil: % ↑@ ° F. vs. 245 F. | Avg. Max. Bire- fringence ($\times 10^{-3}$) | Haze | Basis weight (g/12 ft$^2$) | Winder Speed (ft/min) | Burst Ratio (psi/ Mil | Front/ Back films (mils) | Cavity Diam/ depth/ radius (mm) | Cell Vol. (cm$^3$) | Cell hgt (mm) | Feature(s) |
|---|---|---|---|---|---|---|---|---|---|---|---|---|---|---|---|
| SAC | 36 | 200 + 20° F. | | 5.4 | +69 | N/M | 24.8 | 65 | 187 | 3.18 | 1.7/ 0.7 | 31.8// 7.917.1 | 10.69 | 13.5 | A/B/C/B/A @46/1.5/ 5/1.5/46 A = 55% LLDPE-1, w/ 30% LDPE-1, w/15% Repro-1 B = tie; C = PA-1 @200° F.; +20° F. & +20° F. extruder |
| SAC | 37 | 200° F. + 40° F. ex | | 4.5 | +41 | N/M | 25 | 65 | 187 | 2.65 | 1.7/ 0.7 | 31.8/ 17.1/ 7.9 | 10.67 | 13.5 | Same as Ex. 36, but +40° F. extruder |
| SAC | 38 | 249 | PA | 3.2 | 0 | N/M | 26.5 | 65 | 187 | 1.88 | 1.7/ 0.7 | 31.8/ 17.1/ 7.9 | 10.21 | 12.9 | Same as Ex. 36, but no +° F. extruder; |
| SAC | 39 | 245 + 20° F. on the A ext. Only | PA | 3.2 | 0 | N/M | 24.7 | 65 | 187 | 1.88 | 1.7/ 0.7 | 31.8/ 17.1/ 7.9 | 10.37 | 13.1 | Same as Ex. 36, but +20° F. extruder; |
| SAC | 40 | 245 + 40° F. | PA | 3.1 | −3 | N/M | 19.6 | 65 | 187 | 1.82 | 1.7/ 0.7 | 31.8/ 17.1/ 7.9 | 9.97 | 12.6 | Same as Ex. 36, but +40° F. extruder; |
| SAC | 41 | 245 | PA | 3.2 | 0 | N/M | 28.1 | 65 | 187 | 1.88 | 1.7/ 0.7 | 31.8/ 17.1/ 7.9 | 10.35 | 13.1 | Same as Ex. 36, but no +° F. extruder; |

| Sample Source | Ex No. | Tempemg Roll (° F.) | Wrk vs Cpr | Burst Strength (psi) | psi/ mil: % ↑@ ° F. vs. 220 F. | Avg. Max. Bire- fringence ($\times 10^{-3}$) | Haze | Basis weight (g/12 ft$^2$) | Winder Speed (ft/min) | Burst Ratio (psi/ Mil | Front/ Back films (mils) | Cavity Diam/ depth/ radius (mm) | Cell Vol. (cm$^3$) | Cell hgt (mm) | Feature(s) |
|---|---|---|---|---|---|---|---|---|---|---|---|---|---|---|---|
| SAC | 42 | 180 | | 5.8 | +81 | N/M | n/m | 65 | 187 | 3.41 | 1.7/ 0.7 | 31.8/ 17.1/ 7.9 | 10.55 | 13.3 | Same as Ex. 36, but no +° F. on extruders |

TABLE 6-continued

Table of Examples

| | | | | | | | | | | | | | | | |
|---|---|---|---|---|---|---|---|---|---|---|---|---|---|---|---|
| SAC | 43 | 200 | | 5.1 | +59 | N/M | 27.5 | 65 | 187 | 3.0 | 1.7/ 0.7 | 31.8/ 17.1/ 7.9 | 10.75 | 13.6 | Same as Ex. 43 |
| SAC | 44 | 220 | | 3.7 | +16 | N/M | 63 | 65 | 187 | 2.18 | 1.7/ 0.7 | 31.8/ 17.1/ 7.9 | 10.29 | 13.0 | Same as Ex. 43 |

| Sample Source | Ex No. | Temperng Roll (° F.) | Wrk vs Cpr | Burst Strength (psi) | psi/ mil: % ↑@ ° F. vs. 245 F. | Avg. Max. Bire-fringence ($\times10^{-3}$) | Haze | Basis weight (g/12 $ft^2$) | Winder Speed (ft/min) | Burst Ratio (psi/ Mil | Front/ Back films (mils) | Cavity Diam/ depth/ radius (mm) | Cell Vol. ($cm^3$) | Cell hgt (mm) | Feature(s) |
|---|---|---|---|---|---|---|---|---|---|---|---|---|---|---|---|
| SAC | 45 | 190 | | 3.8 | +65 | N/M | 59.1 | 50 | 250 | 3.17 | 1.2/ 0.5 | 31.8/ 17.1/ 7.9 | 10.45 | 13.2 | A/B/C/B/A 46/1.5/ 5/1.5/46 A = 55% LLDPE-1, w/ 35% LDPE-1, w/10% $CaCO_3$; B = Tie-1; C = PA-1; |
| SAC | 46 | 200 | | 3.8 | +65 | N/M | 61.3 | 50 | 250 | 3.17 | 1.2/ 0.5 | 31.8/ 17.1/ 7.9 | 9.95 | 12.6 | Same as Ex 45 |
| SAC | 47 | 210 | | 3.0 | +30 | N/M | 66.1 | 50 | 250 | 2.5 | 1.2/ 0.5 | 31.8/ 17.1/ 7.9 | 9.89 | 12.5 | Same as Ex 45 |
| SAC | 48 | 220 | | 2.6 | +13 | N/M | 73.5 | 50 | 250 | 2.17 | 1.2/ 0.5 | 31.8/ 17.1/ 7.9 | 9.61 | 12.1 | Same as Ex 45 |
| SAC | 49 | 245 | C | 2.3 | 0 | N/M | 65.6 | 50 | 250 | 1.92 | 1.2/ 0.5 | 31.8/ 17.1/ 7.9 | 9.95 | 12.6 | Same as Ex 45 |

| Sample Source | Ex No. | Temperng Roll (° F.) | Wrk vs Cpr | Burst Strength (psi) | psi/ mil: % ↑@ ° F. vs. 220 F. | Avg. Max. Bire-fringence ($\times10^{-3}$) | Haze | Basis weight (g/12 $ft^2$) | Winder Speed (ft/min) | Burst Ratio (psi/ Mil | Front/ Back films (mils) | Cavity Diam/ depth/ radius (mm) | Cell Vol. ($cm^3$) | Cell hgt (mm) | Feature(s) |
|---|---|---|---|---|---|---|---|---|---|---|---|---|---|---|---|
| SAC | 50 | 185 | | 3.9 | +56 | 23.6 | 36.4 | 50 | 200 | 3.25 | 1.2/ 0.5 | 31.8/ 17.1/ 7.9 | 10.95 | 13.8 | A/B*/C/D/C/A; @26/40*/1.5/ 5/1.5/26 A = 55% LLDPE-1, w/ 30% LDPE-1, w/15% Repro-1 B = 50% LLDPE-1, w/ 50% Repro-2; C = Tie; D = PA-1 *= 32 microlayers, each making up 1.25% of total film thickness |
| SAC | 51 | 190 | | 4.1 | +64 | 28.9 | 38.1 | 50 | 200 | 3.42 | 1.2/ 0.5 | 31.8/ 17.1/ 7.9 | 10.67 | 13.5 | Same as Ex. 50 |
| SAC | 52 | 195 | | 4.0 | +60 | 23.9 | 35.9 | 50 | 200 | 3.33 | 1.2/ 0.5 | 31.8/ 17.1/ 7.9 | 10.65 | 13.5 | Same as Ex. 50 |
| SAC | 53 | 200 | | 3.8 | +52 | 20.4 | 39.2 | 50 | 200 | 3.17 | 1.2/ 0.5 | 31.8/ 17.1/ 7.9 | 10.53 | 13.3 | Same as Ex. 50 |
| SAC | 54 | 205 | | 3.5 | +40 | 21.0 | 43.3 | 50 | 200 | 2.92 | 1.2/ 0.5 | 31.8/ 17.1/ 7.9 | 10.25 | 13.0 | Same as Ex. 50 |
| SAC | 55 | 210 | | 3.1 | +24 | 20.5 | 48 | 50 | 200 | 2.58 | 1.2/ 0.5 | 31.8/ 17.1/ 7.9 | 10.13 | 12.8 | Same as Ex. 50 |
| SAC | 56 | 215 | | 3.0 | +20 | 19.4 | 60.7 | 50 | 200 | 2.5 | 1.2/ 0.5 | 31.8/ 17.1/ 7.9 | 9.99 | 12.6 | Same as Ex. 50 |

TABLE 6-continued

Table of Examples

| | | | | | | | | | | | | | | | |
|---|---|---|---|---|---|---|---|---|---|---|---|---|---|---|---|
| SAC | 57 | 220 | | 2.5 | 0 | 18.0 | 72.6 | 50 | 200 | 2.08 | 1.2/ 0.5 | 31.8/ 17.1/ 7.9 | 10.05 | 12.7 | Same as Ex. 50 |

| Sample Source | Ex No. | Temperng Roll (° F.) | Wrk vs Cpr | Burst Strength (psi) | psi/ mil: % ↑@ ° F. vs. 245 F. | Avg. Max. Bire-fringence ($\times 10^{-3}$) | Haze | Basis weight (g/12 $ft^2$) | Winder Speed (ft/min) | Burst Ratio (psi/ Mil | Front/ Back films (mils) | Cavity Diam/ depth/ radius (mm) | Cell Vol. ($cm^3$) | Cell hgt (mm) | Feature(s) |
|---|---|---|---|---|---|---|---|---|---|---|---|---|---|---|---|
| SAC | 58 | 210 | W | 8.0 | +51 | 18.3 | n/m | 38 | 302 | 9.45 | 0.85/ 0.55 | 9.5/ 5.33/ 3.20 | 0.275 | 3.9 | A/B/C/B/A @46/1.5/ 5/1.5/46 A = 55% LLDPE-1, w/ 30% LDPE-1, w/15% Repro-1 B = Tie-1; C = PA-1 |
| SAC | 59 | 249 | PA | 5.3 | 0 | 15.4 | n/m | 38 | 302 | 6.25 | 0.85/ 0.55 | 9.5/ 5.33/ 3.20 | 0.279 | 3.9 | Same as Ex. 58 |

| Sample Source | Ex No. | Tempering Roll (° F.) | Wrk vs Cpr | Burst Strength (psi) | psi/ mil: % ↑@ ° F. vs. 245 F. | Avg. Max. Bire-fringence ($\times 10^{-3}$) | Haze | Basis weight (g/12 $ft^2$) | Winder Speed (ft/min) | Burst Ratio (psi/ Mil | Front/ Back films (mils) | Cavity Diam/ depth/ radius (mm) | Cell Vol. ($cm^3$) | Cell hgt (mm) | Feature(s) |
|---|---|---|---|---|---|---|---|---|---|---|---|---|---|---|---|
| SAC | 60 | 210 | W | 7.6 | +47 | 18.3 | n/m | 30 | 302 | 12.7 | 0.6/ 0.4 | 9.5/ 5.33/ 3.20 | 0.270 | 3.8 | Same as Ex. 58 |
| SAC | 61 | 249 | W | 5.2 | 0 | 16.5 | n/m | 30 | 302 | 8.6 | 0.6/ 0.4 | 9.5/ 5.33/ 3.20 | 0.280 | 3.9 | Same as Ex. 58 |

| Sample Source | Ex No. | Tempering Roll (° F.) | Wrk vs Cpr | Burst Strength (psi) | psi/ mil: % ↑@ ° F. vs. 240 F. | Avg. Max. Bire-fringence ($\times 10^{-3}$) | Haze | Basis weight (g/12 $ft^2$) | Winder Speed (ft/min) | Burst Ratio (psi/ Mil | Front/ Back films (mils) | Cavity Diam/ depth/ radius (mm) | Cell Vol. ($cm^3$) | Cell hgt (mm) | Feature(s) |
|---|---|---|---|---|---|---|---|---|---|---|---|---|---|---|---|
| SAC | 62 | 200 | W | 8.0 | +29 | 17.3 | 44.6 | 38 | 358 | 9.39 | 0.85/ 0.55 | 9.5/ 5.33/ 3.20 | 0.279 | 3.9 | Same as Ex. 58 |
| SAC | 63 | 210 | W | 7.2 | +16 | 18.6 | 45.3 | 38 | 358 | 8.49 | 0.85/ 0.55 | 9.5/ 5.33/ 3.20 | 0.282 | 4.0 | Same as Ex. 58 |
| SAC | 64 | 220 | | 6.0 | −10 | N/M | 48.9 | 38 | 358 | 7.07 | 0.85/ 0.55 | 9.5/ 5.33/ 3.20 | 0.275 | 3.9 | Same as Ex. 58 |
| SAC | 65 | 249 | PA | 6.2 | 0 | 13.0 | 37.3 | 41 | 302 | 5.58 | 0.92/ 0.60 | 9.5/ 5.33/ 3.20 | 0.277 | 3.9 | Same as Ex. 58 |
| SAC | 66 | 200 | W | 8.1 | +33 | 21.6 | 36.1 | 30 | 358 | 13.5 | 0.6/ 0.4 | 9.5/ 5.33/ 3.20 | 0.275 | 3.9 | Same as Ex. 58 |
| SAC | 67 | 210 | W | 7.5 | +23 | 18.0 | 41.5 | 30 | 358 | 12.5 | 0.6/ 0.4 | 9.5/ 5.33/ 3.20 | 0.282 | 4.0 | Same as Ex. 58 |
| SAC | 68 | 220 | W | 6.8 | +11 | N/M | 51.7 | 30 | 358 | 11.4 | 0.6/ 0.4 | 9.5/ 5.33/ 3.20 | 0.275 | 4.0 | Same as Ex. 58 |
| SAC | 69 | 240 | W | 6.1 | 0 | 20.7 | 45.2 | 30 | 302 | 10.2 | 0.6/ 0.4 | 9.5/ 5.33/ 3.20 | 0.275 | 3.9 | Same as Ex. 58 |

TABLE 6-continued

Table of Examples

| Sample Source | Ex No. | Temperng Roll (° F.) | Wrk vs Cpr | Burst Strength (psi) | psi/mil: % ↑@ ° F. vs. 245 F. | Avg. Max. Bire-fringence ($\times 10^{-3}$) | Haze | Basis weight (g/12 ft$^2$) | Winder Speed (ft/min) | Burst Ratio (psi/Mil | Front/Back films (mils) | Cavity Diam/depth/radius (mm) | Cell Vol. (cm$^3$) | Cell hgt (mm) | Feature(s) |
|---|---|---|---|---|---|---|---|---|---|---|---|---|---|---|---|
| SAC | 70 | 245 | PA | 2.8 | 0 | 4.9 | 35.3 | 85 | 200 | 1.3 | 2.2/0.9 | 31.8/17.1/7.9 | 9.93 | 12.5 | A/B/B/C/D/C/A @25.2/20/20/1.5/6.5/1.5/25.2 A = 55 LLDPE-1, w/30% LDPE-2, w/15% Repro-1 B = 45% LLDPE-1, w/55% Repro-2 C = Tie-1; D = PA-1 |
| SAC | 71 | 220 | | 3.4 | +18 | 5.0 | 50.8 | 85 | 200 | 1.5 | 2.2/0.9 | 31.8/17.1/7.9 | 10.27 | 13.0 | Same as Ex. 70 |
| SAC | 72 | 210 | | 3.4 | +22 | N/M | 54.4 | 85 | 200 | 1.6 | 2.2/0.9 | 31.8/17.1/7.9 | 10.11 | 12.8 | Same as Ex. 70 |
| SAC | 73 | 200 | | 3.3 | +17 | 5.3 | 73.9 | 85 | 200 | 1.5 | 2.2/0.9 | 31.8/17.1/7.9 | 10.15 | 12.8 | Same as Ex. 70 |
| SAC | 74 | 190 | | 4.0 | +41 | 11.6 | 70.2 | 85 | 200 | 1.8 | 2.2/0.9 | 31.8/17.1/7.9 | 10.21 | 12.9 | Same as Ex. 70 |
| SAC | 75 | 180 | | 4.4 | +54 | 16.0 | 50.6 | 85 | 200 | 2.0 | 2.2/0.9 | 31.8/17.1/7.9 | 10.25 | 13.0 | Same as Ex. 70 |
| SAC | 76 | 170 | | 5.5 | +93 | 19.7 | 42.7 | 85 | 200 | 2.5 | 2.2/0.9 | 31.8/17.1/7.9 | 10.45 | 13.2 | Same as Ex. 70 |
| SAC | 77 | 160 | | 5.6 | +98 | 20.7 | 38.8 | 85 | 200 | 2.6 | 2.2/0.9 | 31.8/17.1/7.9 | 10.55 | 13.3 | Same as Ex. 70 |
| SAC | 78 | 150 | | 6.6 | +131 | 25.4 | 42.5 | 85 | 200 | 3.0 | 2.2/0.9 | 31.8/17.1/7.9 | 10.55 | 13.3 | Same as Ex. 70 Poor forming |
| SAC | 79 | 140 | | 7.0 | +147 | 25.7 | 37.5 | 85 | 200 | 3.2 | 2.2/0.9 | 31.8/17.1/7.9 | 8.43 | 10.6 | Same as Ex. 70 Poor forming |

| Sample Source | Ex No. | Temperng Roll (° F.) | Wrk vs Cpr | Burst Strength (psi) | psi/mil: % ↑@ ° F. vs. 245 F. | Avg. Max. Bire-fringence ($\times 10^{-3}$) | Haze | Basis weight (g/12 ft$^2$) | Winder Speed (ft/min) | Burst Ratio (psi/Mil | Front film (mils) | Cell Diam (mm) | Cell Vol. (cm$^3$) | Cell hgt (mm) | Feature(s) |
|---|---|---|---|---|---|---|---|---|---|---|---|---|---|---|---|
| Polyair | 80 | N/A | PA | 2.2 | +14 (vs. Ex. 6, assuming 245 for Ex 6) | 25.2 | 16.9 | 60 | UNK | 1.8 | 1.2/0.8 | 31.8 | 9.85 | 12.4 | Competitive Commercial Product; No high melt point layer |
| CPI | 81 | N/A | PA | 3.1 | Unk | 1.9 | 16.9 | 80.8 | N/A | 1.5 | 2.0/0.8 | 31.8 | 9.71 | 12.3 | Competitive Commercial Product; no high melt point layer |

| Sample Source | Ex No. | Temperng Roll (° F.) | Wrk vs Cpr | Burst Strength (psi) | psi/mil: % ↑@ ° F. vs. 245 F. | Avg. Max. Bire-fringence ($\times 10^{-3}$) | Haze | Basis weight (g/12 ft$^2$) | Winder Speed (ft/min) | Burst Ratio (psi/Mil | Front film (mils) | Cavity Diam/depth/Radius (mm) | Cell Vol. (cm$^3$) | Cell hgt (mm) | Feature(s) |
|---|---|---|---|---|---|---|---|---|---|---|---|---|---|---|---|
| SAC | 82 | | PA | N/M | | 12.7 | 52.0 | 30 | | | 0.46/0.46 | 4.0/1.8/0.8 | 0.009 | 1.5 | |

TABLE 6-continued

Table of Examples

| | | | | | | | | | | | | | | | |
|---|---|---|---|---|---|---|---|---|---|---|---|---|---|---|---|
| SAC | 83 | | PA | N/M | | 8.6 | 45.3 | 32 | | | 0.60/ 0.60 | 7.9/ 3.18/ 1.6 | 0.119 | 2.4 | |
| SAC | 84 | | PA | 6.5 | | 5.4 | 47.8 | 33 | | 10.5 | 0.62/ 0.62 | 9.5/ 4.37/ 3.2 | 0.206 | 2.8 | |
| SAC | 85 | | PA | 7.4 | | 4.8 | 45.1 | 33 | | 11.9 | 0.62/ 0.62 | 9.5/ 4.19/ 4.7 | 0.168 | 2.4 | |

| Sample Source | Ex No. | Temperng Roll (° F.) | Wrk vs Cpr | Burst Strength (psi) | psi/ mil: % ↑@ ° F. vs. 245 F. | Avg. Max. Bire- fringence (×10$^{-3}$) | Haze | Unit Weight (g/12 ft$^2$) | Winder Speed (ft/min) | Burst Ratio (psi/ Mil | Front/ Back films (mils) | Cavity Diam/ depth (mm) | Cell Vol. (cm$^3$) | Cell hgt (mm) | Feature(s) |
|---|---|---|---|---|---|---|---|---|---|---|---|---|---|---|---|
| Navitek | 86 | N/A | PA | 7.3 | 6.40 | 5.2 | 22.7 | 50.8 | N/A | 6.40 | 1.14/ 0.47 | 9.5 | 0.192 | 2.7 | Hazy Land Areas Competitive commercial product contains high melt point layer contains 15.6% polyamide |
| Gidesa | 87 | N/A | PA | 4.4 | 5.57 | 3.8 | 43.5 | 40.8 | N/A | 5.57 | 0.79/ 0.42 | 9.5 | 0.156 | 2.2 | Hazy Land Areas Competitive commercial product No high melt point layer |
| Gidesa | 88 | N/A | PA | 4.8 | 4.46 | 3.1 | 47.5 | 45.9 | N/A | 4.46 | 1.07/ 0.43 | 9.5 | 0.162 | 2.3 | Competitive commercial product No high melt point layer |
| Navitek | 89 | N/A | PA | 3.2 | 1.78 | 4.0 | 16.1 | 88.5 | N/A | 1.78 | 1.79/ 0.93 | 30.2 | 5.428 | 7.6 | Competitive commercial product Contains 10.1% polyamide |
| Gidesa | 90 | N/A | PA | 1.9 | 1.52 | 2.0 | 9.5 | 70.4 | N/A | 1.52 | 1.25/ 0.84 | 28.6 | 4.115 | 6.4 | Competitive commercial product No high melt point layer |

| Sample Source | Ex No. | Temperng Roll (° F.) | Wrk vs Cpr | Burst Strength (psi) | psi/ mil: % ↑@ ° F. vs. 245 F. | Avg. Max. Bire- fringence (×10$^{-3}$) | Haze | Unit Weight (g/12 ft$^2$) | Winder Speed (ft/min) | Burst Ratio (psi/ Mil | Front/ Back films (mils) | Cavity Diam/ depth/ radius (mm) | Cell Vol. (cm$^3$) | Cell hgt (mm) | Feature(s) |
|---|---|---|---|---|---|---|---|---|---|---|---|---|---|---|---|
| SAC | 91 | N/A | PA | 4.6 | 2.90 | 9.8 | 30.9 | 60.0 | UNK | 2.90 | 1.60/ 0.80 | 25.4/ 11.2/ 6.4 | 4.203 | 8.3 | Nominal wt and unit thickness |
| SAC | 92 | N/A | PA | 5.08 | 2.99 | 4.2 | 19.9 | 70.0 | UNK | 2.99 | 1.70/ 0.90 | 25.4/ 11.2/ 6.4 | 4.159 | 8.2 | Nominal wt and unit thickness |

| Sample Source | Ex No. | Temperng Roll (° F.) | Wrk vs Cpr | Burst Strength (psi) | psi/ mil: % ↑@ ° F. vs. 245 F. | Avg. Max. Bire- fringence (×10$^{-3}$) | Haze | Unit Weight (g/12 ft$^2$) | Winder Speed (ft/min) | Burst Ratio (psi/ mil | Front/ Back films (mils) | Cell Diam (mm) | Cell Vol. (cm$^3$) | Cell hgt (mm) | Feature(s) |
|---|---|---|---|---|---|---|---|---|---|---|---|---|---|---|---|
| Pregis | 93 | N/A | PA | 5.3 | 2.40 | 5.7 | 17.1 | 106.5 | N/A | 2.40 | 2.22/ 1.47 | 25.4 | 3.516 | .273 | Competitive commercial product |

TABLE 6-continued

Table of Examples

| | | | | | | | | | | | | | | | |
|---|---|---|---|---|---|---|---|---|---|---|---|---|---|---|---|
| Polyair | 94 | M/A | PA | 5.9 | 3.89 | 3.6 | 25.1 | 69.3 | N/A | 3.89 | 1.51/ 0.76 | 9.5 | 0.19 | 2.7 | No high melt point layer Competitive commercial product |
| Pregis | 95 | N/A | PA | 5.7 | 2.95 | 6.4 | 17.1 | 100.5 | N/A | 2.95 | 1.93/ 1.55 | 25.4 | 2.972 | 5.9 | No high melt point layer Competitive commercial product |
| Pregis | 96 | N/A | PA | 4.6 | 2.57 | 3.7 | 23.2 | 65.8 | N/A | 2.57 | 1.80/ 0.71 | 25.4 | 3.158 | 6.2 | No high melt point layer Competitive commercial product Has high melt point layer Contains 4.4% polyamide |

| Sample Source | Ex No. | Temperng Roll (° F.) | Wrk vs Cpr | Burst Strength (psi) | psi/ mil: % ↑@ ° F. vs. 245 F. | Avg. Max Bire- fringence ($\times 10^{-3}$) | Haze | Basis weight (g/12 ft$^2$) | Winder Speed (ft/min) | Burst Ratio (psi/ Mil | Front Film/ back film (mils) | Cavity Diam/ depth/ radius (mm) | Cell Vol. (cm$^3$) | Cell hgt (mm) | Feature(s) |
|---|---|---|---|---|---|---|---|---|---|---|---|---|---|---|---|
| SAC | 97 | 210 | | 3.5 | | | | 50 | 200 | 2.92 | 1.2/ 0.5 | 31.8/ 17.1/ 7.9 | 10.55 | 13.3 | A/B*/C/D/C/A; @26/40*/1.5/ 5/1.5/26 A = 55% LLDPE-1, w/ 30% LDPE-1, w/15% Repro-1 B = Repro-1 C = Tie; D = PA-1 *= 32 microlayers, each @1.25% of total film thickness |
| SAC | 98 | 210 | | 3.5 | | | | 50 | 200 | 2.92 | 1.2/ 0.5 | 31.8/ 17.1/ 7.9 | 10.19 | 12.9 | Same as Ex. 97, except; B = 50% B1, w/50% B2 B1 = Repro-1; B2 = Repro-2 |
| SAC | 99 | 210 | | 3.1 | | | | 50 | 200 | 2.58 | 1.2/ 0.5 | 31.8/ 17.1/ 7.9 | 10.45 | 13.2 | Same as Ex. 97, except B = Repro-2 |
| SAC | 100 | 210 | | 3.1 | | | | 50 | 200 | 2.58 | 1.2/ 0.5 | 31.8/ 17.1/ 7.9 | 9.89 | 12.5 | Same as Ex. 97, except B = Repro-3 |
| SAC | 101 | 210 | | 2.9 | | | | 50 | 200 | 2.42 | 1.2/ 0.5 | 31.8/ 17.1/ 7.9 | 10.21 | 12.9 | Same as Ex. 97, except B = Repro-4 |
| SAC | 102 | 210 | | 3.0 | | | | 50 | 200 | 2.50 | 1.2/ 0.5 | 31.8/ 17.1/ 7.9 | 10.25 | 13.0 | Same as Ex. 97, except B = Repro-5 |
| SAC | 103 | 210 | | 3.4 | | | | 50 | 200 | 2.83 | 1.2/ 0.5 | 31.8/ 17.1/ 7.9 | 9.95 | 12.6 | Same as Ex. 97, except; @31/30*/1.5/ 5/1.5/31, and B = 50% LLDPE-1, w/ 50% Repro-2 *= 32 microlayers, each @0.94% of total film thickness |
| SAC | 104 | 210 | | 3 | | | | 50 | 200 | 2.50 | 1.2/ 0.5 | 31.8/ 17.1/ 7.9 | 10.25 | 13.0 | Same as Ex. 97, except; B = 50% LLDPE-1, w/ 50% Repro-2 |

TABLE 6-continued

Table of Examples

| | | | | | | | | | | | | | | | |
|---|---|---|---|---|---|---|---|---|---|---|---|---|---|---|---|
| SAC | 105 | 210 | | 3.3 | | | | 50 | 200 | 2.75 | 1.2/ 0.5 | 31.8/ 17.1/ 7.9 | 10.31 | 13.0 | Same as Ex. 97, except; @21/50*/1.5/ 5/1.5/21, and *= 32 microlayers, each @1.56% of total film thickness |
| SAC | 106 | 210 | | 3.1 | | | | 50 | 200 | 2.58 | 1.2/ 0.5 | 31.8/ 17.1/ 7.9 | 10.15 | 12.8 | Same as Ex. 97, except; @16/60*/1.5/ 5/1.5/16, B = 50% LLDPE-1, w/ 50% Repro-2 *= 32 microlayers, each @1.88% of total film thickness |
| SAC | 107 | 210 | | 3.4 | | | | 50 | 200 | 2.83 | 1.2/ 0.5 | 31.8/ 17.1/ 7.9 | 10.17 | 12.9 | Same as Ex. 106, except; @11/70*/1.5/ 5/1.5/11 *= 32 microlayers, each @2.19% of total film thickness |
| SAC | 108 | 210 | | 2.7 | | | | 50 | 200 | 2.25 | 1.2/ 0.5 | 31.8/ 17.1/ 7.9 | 10.25 | 13.0 | Same as Ex. 106, except; @6/80*/1.5/ 5/1.5/6 *= 32 microlayers, each @2.5% of total film thickness |
| SAC | 109 | 210 | | 2.8 | | | | 50 | 200 | 2.33 | 1.2/ 0.5 | 31.8/ 17.1/ 7.9 | 10.13 | 12.8 | Same as Ex. 107, except; B = Repro-2 |
| SAC | 110 | 249 | C | 2.0 | | | | 45 | 200 | 1.82 | 1.1/ 0.45 | 31.8/ 17.1/ 7.9 | 10.09 | 12.8 | A/A/A/B/C/B/A @26/20/1.5/ 5/1.5/26 A = 55% LLDPE-1, w/ 30% LDPE-1, w/15% Repro-1 B = Tie; C = PA-1 |
| SAC | 111 | 249 | C | 2.3 | | 10.2 | 65.4 | 45 | 200 | 2.09 | 1.1/ 0.45 | 31.8/ 17.1/ 7.9 | 10.15 | 12.6 | A/B/A/B/C/B/A @26/40*/1.5/ 5/1.5/26 A = 55% LLDPE-1, w/ 30% LDPE-1, w/15% Repro-1, B = 50% B1, w/50% B2, B1 = LLDPE-1, B2 = Repro-2 C = Tie; D = PA-1 *= 32 microlayers, each @1.25% of total film thickness |
| SAC | 112 | 240 | C | 2.4 | | | | 40 | 325 | 2.54 | 0.95/ 0.4 | 31.8/ 17.1/ 7.9 | 9.25 | 11.7 | Same as Ex. 110 |
| SAC | 113 | 200 | W | 3.7 | | 24.2 | 38.9 | 40 | 203 | 3.94 | 0.95/ 0.4 | 31.8/ 17.1/ 7.9 | 11.1 | 14.0 | A/B*/C/D/C/A; @26/40*/1.5/ 5/1.5/26 A = 55% LLDPE-1, w/ 30% LDPE-1, |

TABLE 6-continued

Table of Examples

| | | | | | | | | | | | | | | | |
|---|---|---|---|---|---|---|---|---|---|---|---|---|---|---|---|
| | | | | | | | | | | | | | | | w/15% Repro-1 B = 50% Repro-1, w/ 50% Repro-2 C = Tie; D = PA-1 *= 32 microlayers, each @1.25% of total film thickness |
| SAC | 114 | 245 | C | 2.4 | | 21.9 | 42.2 | 40 | 250 | 2.54 | 0.95/ 0.4 | 31.8/ 17.1/ 7.9 | 10.33 | 13.1 | Same as Ex. 110 |

C = Comparative example; W = working example; UNK = unknown to Inventors because made by competitor; N/A = not available; n/a = not applicable; - - - = not assigned; N/M = not measured; w/ = blended with

Discussion of Examples

Working Example 1 Vs. Prior Art Example 5

See Table 6 and compare the tempering roll temperature and burst strength per mil of working Example 1 against the tempering roll temperature and the burst strength per mil of prior art Example 5. The only significant difference between the process used in Example 1 and the process used in Example 5 was the temperature of the tempering rollers, i.e., the temperature of the water supplied to the tempering rollers. The tempering roller temperature for Example 1 was 190° F., but was 245° F. for Example 5. The burst strength per mil of the cellular cushioning article of working Example 1 was 2.58, whereas the burst strength per mil of the cellular cushioning article of prior art Example 5 was only 1.61. The lowering of the tempering roll temperature from 245° F. to 190° F. was surprisingly and unexpectedly found to provide more than a 61% increase in the burst strength per mil of the resulting cellular cushioning article. The more than 61% increase in burst strength per mil is particularly surprising when viewed from the perspective that the films making up the cellular cushioning articles of working Example 1 and prior art Example 5 have the same thicknesses, layer arrangements, and layer compositions.

Prior Art Examples 6 and 80

The cellular cushioning article of Example 6 was a Prior Art cellular cushioning article obtained from Polyair of Toronto, Ontario, Canada. It had a basis weight of 98 grams per 12 $ft^2$, had discrete thermoformed regions having a cell size measured at 8.14 $cm^3$, exhibited an average maximum birefringence of $0.9\times10^{-3}$. The thermoformed film of Example 6 was analyzed and determined to lack polyamide or any other high melt point polymer that would serve as a barrier. The air cellular article of Example 6 exhibited a cell uniformity rating of about 1 to 2.

Example 80 was another Prior Art cellular cushioning article obtained from Polyair. Example 80 had a basis weight of 60 grams per 12 $ft^2$, had discrete thermoformed regions having a cell size measured at 9.85 $cm^3$, and exhibited an average maximum birefringence of $25.2\times10^{-3}$, with the thermoformed film also being analyzed and determined to lack polyamide or any other high melt point polymer that would serve as a barrier. The air cellular article of Example 80 exhibited a cell uniformity rating of about 6.

Figure 24:
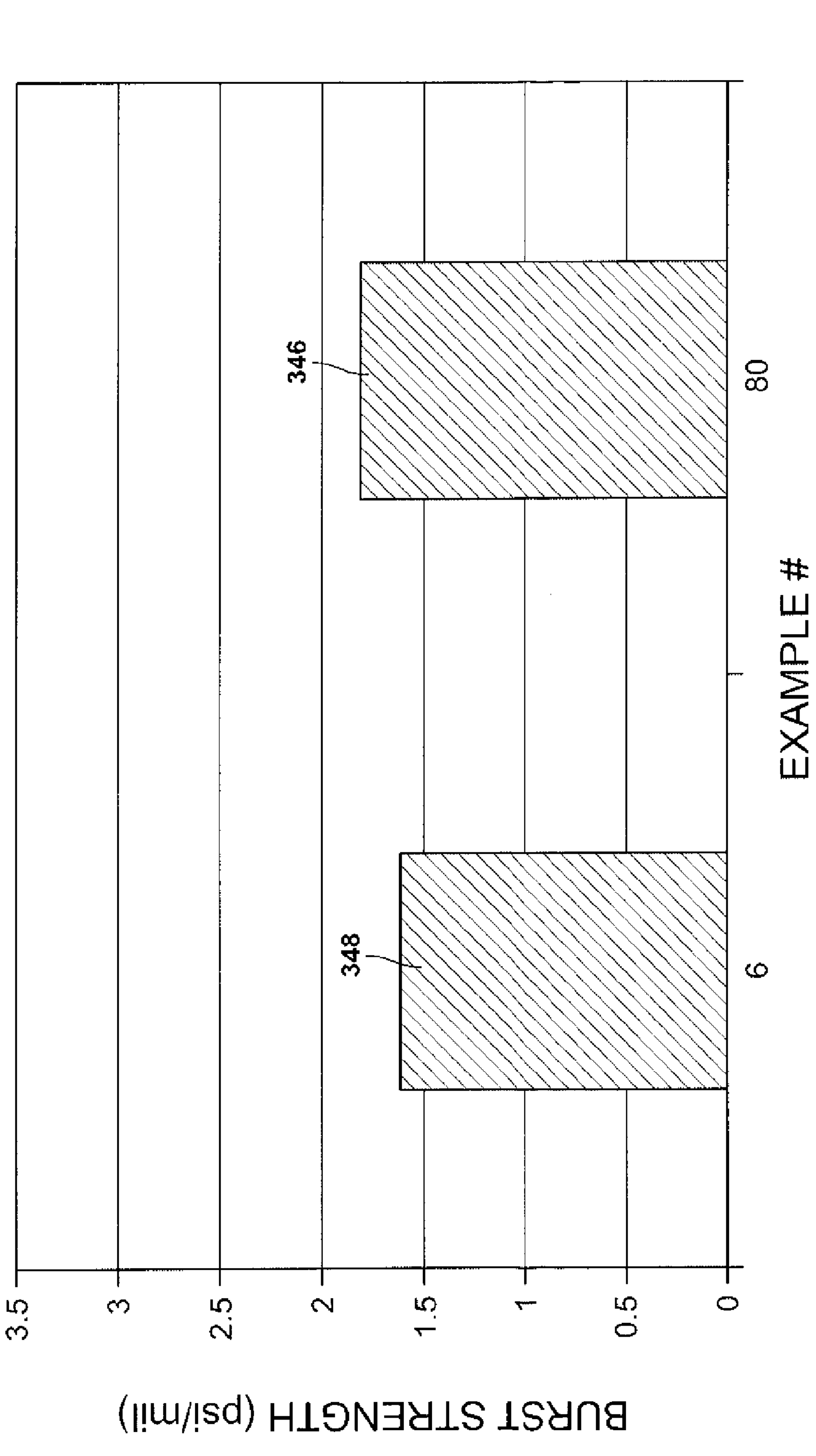
FIG. 24 is a bar graph of burst strength per mil of Prior Art Example 6 (birefringence of $0.9\times10^{-3}$) and Prior Art Example 80 (birefringence of $25.2\times10^{-3}$), neither of which comprise a thermoformed film having a layer containing a high melt point polymer.

FIG. 24 is a bar graph of burst strength per mil for Examples 6 and 80. Burst strength was as measured in the manner described above. The average burst strength of the cells of Example 6 was 3.8 psi. The thickness of the land area of the thermoformed film of Example 6 was 2.37 mils, giving the cells of Example 6 a burst strength per mil of 3.8 psi/2.37 mil=1.60 psi/mil. The average burst strength of the cells of Example 80 was 2.2 psi, and the thickness of the land area of the thermoformed film of Example 80 was 1.2 mils, giving the cells of Example 80 a burst strength per mil of 2.2 psi/1.2 mil=1.83 psi/mil.

The high birefringence of $25.2\times10^{-3}$ of the thermoformed regions of Example 80, as well as the cell uniformity rating of 6, revealed that it appears that the thermoforming was carried out at relatively low temperature in the manufacture of cellular cushioning article of Prior Art Example 80. However, this lower thermoforming temperature only increased the burst strength per mil from 1.6 psi/mil to 1.83 psi/mil, i.e., a 14% increase in burst strength per mil. Moreover, this increase in burst strength per mil came at the expense of cell uniformity, which is visible and detracts from the appearance of the cellular cushioning article of Example 80. FIG. 24 illustrates the slight increase in burst strength per mil for Prior Art Example 80 illustrated as bar 346 relative to Prior Art Example 6, illustrated as bar 348.

Prior Art Example 70 and Working Examples 13 and 52

Prior Art Example 70 had a basis weight of 85 grams per 12 $ft^2$, a thermoformed film land area thickness of 2.2 mils, and had discrete thermoformed regions having a cell size measured at 9.93 $cm^3$. The birefringence of Prior Art Example 70 was $4.9\times10^{-3}$, which was consistent with other processes utilizing a tempering roll temperature at or about 245° F. The thermoformed film of Prior Art Example 70 contained 13.1 weight percent polyamide 6, based on total film weight. The air cellular article of Prior Art Example 70 exhibited a burst strength of 2.8 psi, and a cell uniformity rating of about 2.

Working Example 13 had a basis weight of 50 grams per 12 $ft^2$, a thermoformed film land area thickness of 1.2 mils, discrete thermoformed regions having a cell size measured at 10.15 $cm^3$, exhibited an average maximum birefringence of $29\times10^{-3}$, with the tempering rollers being at a temperature of 190° F. The thermoformed film of Example 13 contained 5 weight percent polyamide 6, based on total film weight. The air cellular article of Example 13 exhibited a burst strength of 3.7 psi, and a cell uniformity rating of about 5.

Working Example 52 had a basis weight of 50 grams per 12 $ft^2$, a thermoformed film land area thickness of 1.2 mils, and discrete thermoformed regions having a cell size measured at 10.65 $cm^3$. The birefringence of Example 52 was measured at $23.9\times10^{-3}$, which is consistent with other processes in which the tempering rollers were at a temperature of 195° F. The thermoformed film of Example 52 contained 5 weight percent polyamide 6, based on total film weight. The air cellular article of Example 52 exhibited a burst strength of 4 psi, and a cell uniformity rating of about 5.

Figure 25:
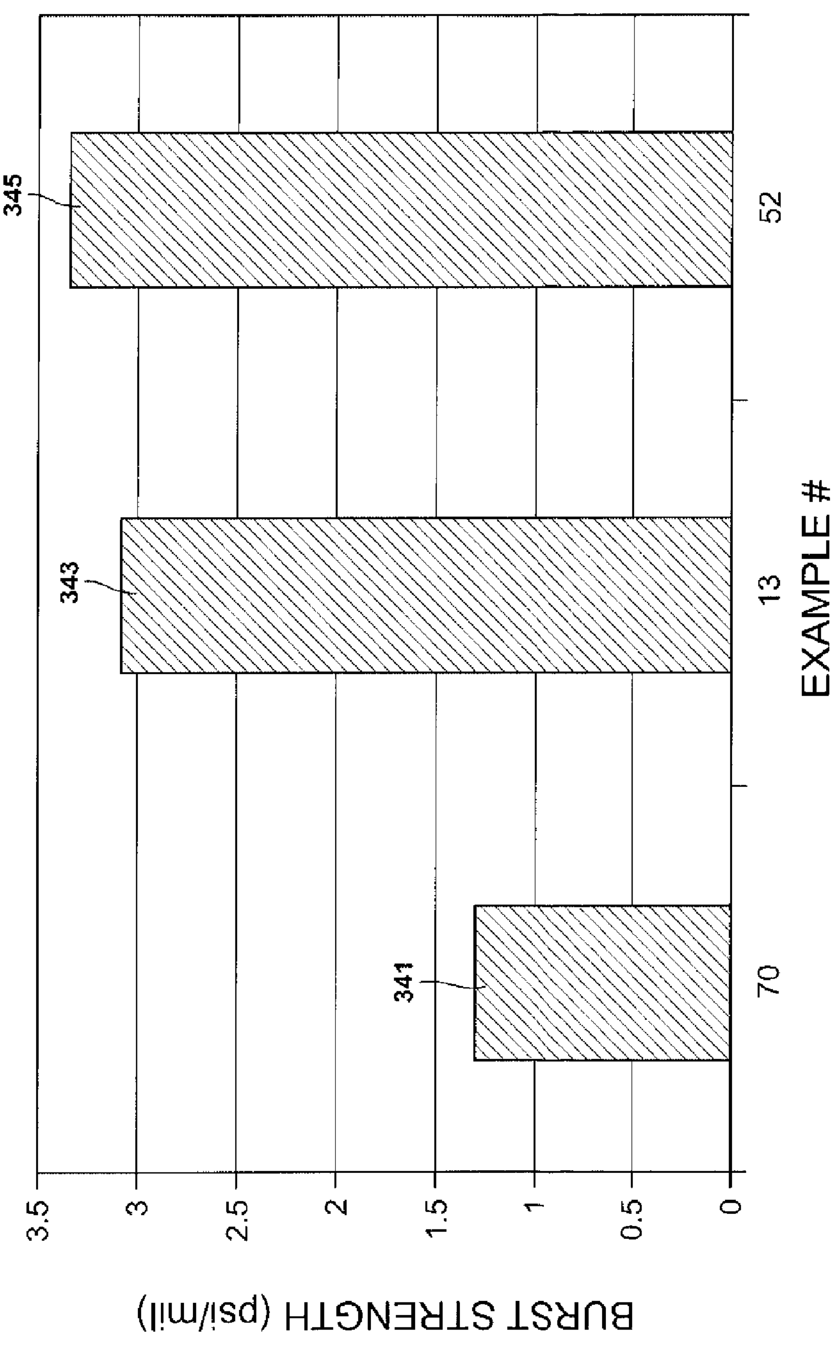
FIG. 25 is a bar graph of burst strength per mil for Prior Art Example 70 (birefringence $4.9\times10^{-3}$), alongside Working Example 13 (birefringence $29\times10^{-3}$) and Working Example 52 (birefringence $23.9\times10^{-3}$), with each of Examples 70, 13, and 52 comprising a thermoformed film having a layer containing a high melt point polymer.

FIG. 25 is a bar graph illustrating burst strength per mil for Prior Art Example 70 (Bar 341), Working Example 13 (Bar 343) and Working Example 52 (Bar 345). The burst strength per mil of Prior Art Example 70 was 2.8 psi/2.2 mil=1.27 psi/mil. However, the burst strength per mil of Example 13 was 3.7 psi/1.2 mil=3.08 psi/mil, and the burst strength per mil of Example 52 was 4 psi/1.2 mil=3.33 psi/mil. The 3.08 psi/mil and 3.33 psi/mil values obtained for Working Examples 13 and 52, respectively, are over 65% higher than the burst strength per mil of Prior Art Example 6 (1.6 psi/mil), Prior Art Example 80 (1.83 psi/mil), and Prior Art Example 70 (1.27 psi/mil). This is a very substantial increase in the burst strength obtained per pound of polymer in the air cellular articles that are in accordance with the invention.

Figure 26:
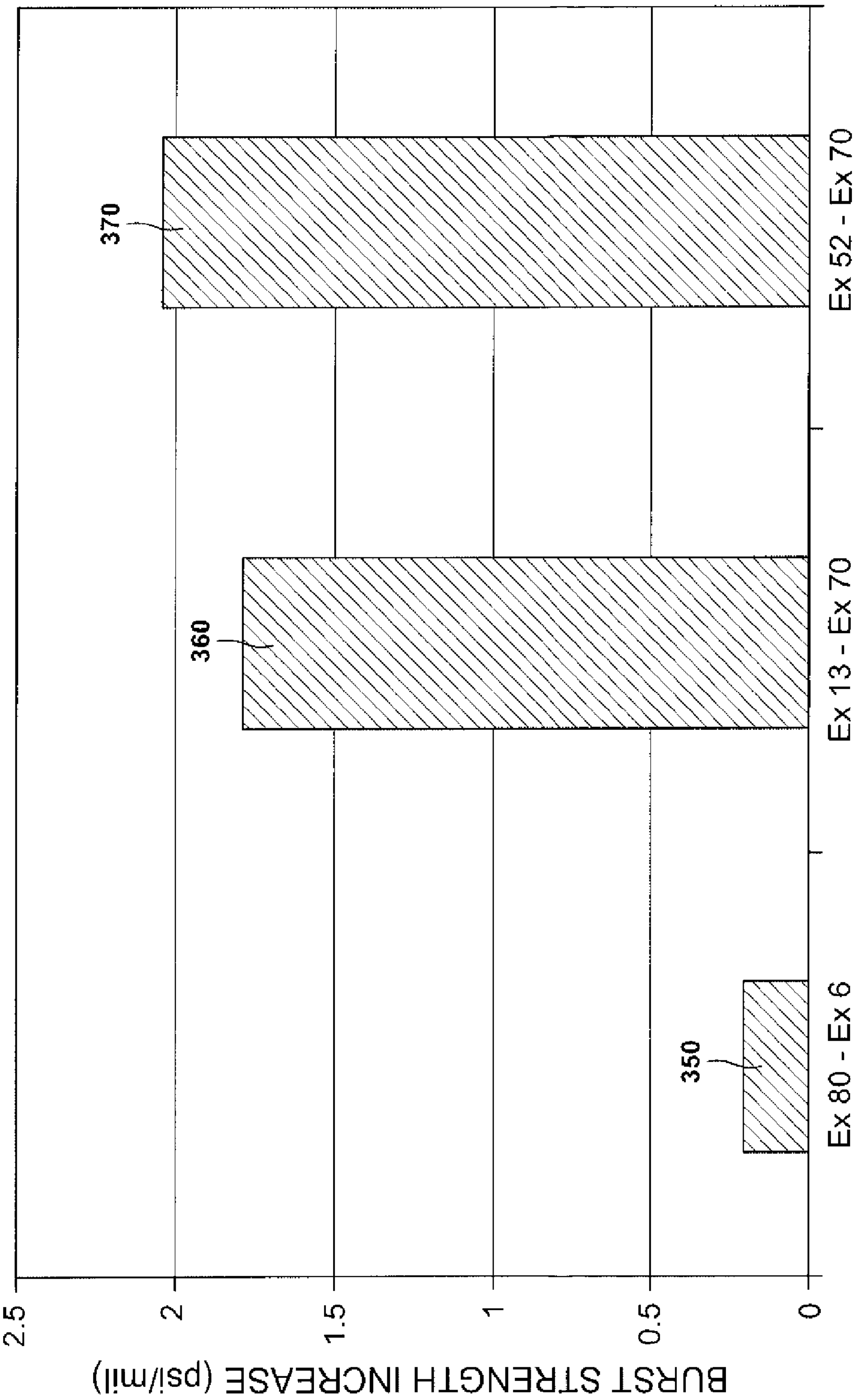
FIG. 26 is a bar graph of the burst strength per mil increase (350) Prior Art Example 80 over Prior Art Example 6, (360) Working Example 13 over Prior Art Example 70, and (370) Working Example 52 over Prior Art Example 70.

FIG. 26 is a series of bar graphs illustrating the increase in burst strength per mil upon thermoforming at a lower temperature in the process of making an air cellular article having high birefringence. Bar 350 represents the modest 0.2 psi/mil increase obtained upon raising birefringence from $0.9\times10^{-3}$ (Example 6) to $25.2\times10^{-3}$ (Example 80) in prior art air cellular articles lacking a layer comprising a high melt point polymer.

In stark contrast, Bar 360 in FIG. 26 represents the much larger increase in burst strength per mil, obtained upon lowering the tempering roll temperature from 245° F. (Prior Art Example 70) with a burst strength per mil of 1.3 psi/mil, to 190° F. (Example 13, birefringence of 29) with a burst strength per mil of 3.08, for a net increase of 1.78 psi/mil, which is almost 9 times the 0.2 psi/mil increase obtained for a similar increase in birefringence in Example 80 versus Example 6. This larger increase is due to the combination of (i) higher birefringence resulting from lower thermoforming temperature, and (ii) presence of a film layer comprising a high melt point polymer.

Similarly, Bar 370 in FIG. 26 represents the still larger increase in burst strength per mil, obtained upon lowering the tempering roll temperature from 245° F. (Prior Art Example 70) with a burst strength of 1.3 psi/mil, to the lower tempering roll temperature of 195° F. for Working Example 52 which had a burst strength 3.33 psi/mil, for a burst strength per mil increase of 2.03 psi/mil. This increase is more than ten times higher than the 0.2 psi/mil increase of Example 80 over Example 6. Again, the larger increase in burst strength per mil is due to the combination of (i) higher birefringence resulting from lower thermoforming temperature, and (ii) presence of a film layer comprising a high melt point polymer. In summary, the increases in burst strength per mil illustrated in bar graphs 360 and 370 of FIG. 26 shows psi/mil increases which differ in kind from the substantially lower increase in burst strength per mil of bar graph 350 of FIG. 26.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. A cellular cushioning article comprising a multilayer first film and a second film, the first film having a thermoformed portion comprising a plurality of discrete thermoformed regions separated by an unformed land area, with each discrete thermoformed region providing a discrete raised embossment, with the second film having a bonded portion and an unbonded portion, with the unbonded portion comprising a plurality of discrete unbonded regions, with each discrete unbonded region including at least a portion juxtaposed opposite a base of each of the discrete thermoformed regions of the first film, with the bonded portion of the second film being bonded to at least a portion of the land area of the first film, with the plurality of discrete thermoformed regions of the first film and a plurality of discrete unbonded regions of the second film together making up a plurality of discrete cells, with each cell surrounding a discrete volume of fluid entrapped between the first film and the second film, with the first film having a bonding layer comprising polyolefin and a high melt point layer comprising polyamide, and the cellular cushioning article has a combination of an average thickness of the land area of the first film, and an average maximum birefringence of the thermoformed regions of the first film, selected from the group consisting of:

(A) average land area thickness of from 2.01 mils to 3 mils, and an average maximum birefringence of at least 6×10−3;

(B) average land area thickness of from 1.41 mils to 2 mils and an average maximum birefringence of at least 16×10−3;

(C) average land area thickness of from 1.01 mils to 1.40 mils and an average maximum birefringence of at least 17×10−3;

(D) average land area thickness of from 0.76 mil to 1.0 mil and an average maximum birefringence of at least 17×10−3;

(E) average land area thickness of from 0.45 rail to 0.75 rail and an average maximum birefringence of at least 17×10−3.

2. The cellular cushioning article according to claim 1, wherein the combination further comprises an average percent haze, measured in accordance with ASTM D-1003, and the combination is a member selected from the group consisting of:

(A) average land area thickness of from 2.01 mils to 3 mils, an average maximum birefringence of at least $6\times10^{-3}$, and the cellular cushioning article has an average haze of less than 55 percent;

(B) average land area thickness of from 1.41 mils to 2 mils, an average maximum birefringence of at least $16\times10^{-3}$, and the cellular cushioning article has an average haze of less than 30 percent;

(C) average land area thickness of from 1.01 mils to 1.40 mils, an average maximum birefringence of at least $17\times10^{-3}$, and the cellular cushioning article has an average haze of less than 60 percent;

(D) average land area thickness of from 0.76 mil to 1.0 mil, an average maximum birefringence of at least $17\times10^{-3}$, and the cellular cushioning article has an average haze of less than 46 percent; and (E) average land area thickness of from 0.45 mil to 0.75 mil, an average maximum birefringence of at least $17\times10^{-3}$, and the cellular cushioning article has an average haze of less than 48 percent.

3. The cellular cushioning article according to claim 1, wherein the combination further comprises an average cell volume and an average burst strength of the cells of the cushioning article, and the combination is a member selected from the group consisting of:

(A) average cell volume of from 5 to 15 $cm^3$, average land area thickness of from 2.01 mils to 3 mils, average maximum birefringence of at least $6\times10^{-3}$, and average burst strength of at least 3.7 psi;

(B) average cell volume of from 5 to 15 $cm^3$, average land area thickness of from 1.41 mils to 2 mils, an average maximum birefringence of at least $16\times10^{-3}$, and an average burst strength of at least 3 psi;

(C) average cell volume of from 1 to 15 $cm^3$, average land area thickness of from 1.01 mils to 1.40 mils, an average maximum birefringence of at least $17\times10^{-3}$, and an average burst strength of at least 2.4 psi;

(D1) average cell volume of from 0.15 to 0.99 $cm^3$, average land area thickness of from 0.76 mil to 1.0 mil, an average maximum birefringence of at least $17\times10^{-3}$, and an average burst strength of at least 6.5 psi;

(D2) average cell volume of from 1.0 to 15 $cm^3$, average land area thickness of from 0.76 mil to 1.0 mil, average maximum birefringence of at least $17\times10^{-3}$, and an average burst strength of at least 2.0 psi;

(E1) average cell volume of from 0.15 to 0.99 $cm^3$, average land area thickness of from 0.45 mil to 0.75 mil, an average maximum birefringence of at least $17\times10^{-3}$, and an average burst strength of at least 6.5 psi; and (E2) average cell volume of from 1.0 to 15 $cm^3$, average land area thickness of from 0.45 mil to 0.75 mil, average maximum birefringence of at least $17\times10^{-3}$, and an average burst strength of at least 1.7 psi.

4. The cellular cushioning article according to claim 3, wherein the combination further comprises an average percent haze, measured in accordance with ASTM D-1003, and the combination is a member selected from the group consisting of:

(A) average cell volume of from 5 to 15 $cm^3$, average land area thickness of from 2.01 mils to 3 mils, an average maximum birefringence of at least $6\times10^{-3}$, an average burst strength of at least 3.7 psi, and the cellular cushioning article has an average haze of less than 55 percent;

(B) average cell volume of from 5 to 15 $cm^3$, average land area thickness of from 1.41 mils to 2 mils, an average maximum birefringence of at least $16\times10^{-3}$, an average burst strength of at least 3 psi, and the cellular cushioning article has an average haze of less than 30 percent;

(C) average cell volume of from 1 to 15 $cm^3$, average land area thickness of from 1.01 mils to 1.40 mils, an average maximum birefringence of at least $17\times10^{-3}$, an average burst strength of at least 2.4 psi, and the cellular cushioning article has an average haze of less than 60 percent;

(D1) average cell volume of from 0.15 to 0.99 $cm^3$, average land area thickness of from 0.76 mil to 1.0 mil, an average maximum birefringence of at least $17\times10^{-3}$, an average burst strength of at least 7 psi, and the cellular cushioning article has an average haze of less than 46 percent;

(D2) average cell volume of from 1.0 to 15 $cm^3$, average land area thickness of from 0.76 mil to 1.0 mil, average maximum birefringence of at least $17\times10^{-3}$, and an average burst strength of at least 3 psi, and the cellular cushioning article has an average haze of less than 40 percent; and (E1) average cell volume of from 0.15 to 0.99 $cm^3$, average land area thickness of from 0.45 mil to 0.75 mil, an average maximum birefringence of at least $17\times10^{-3}$, an average burst strength of at least 6.5 psi, and the cellular cushioning article has an average haze of less than 48 percent; and (E2) average cell volume of from 1.0 to 15 $cm^3$, average land area thickness of from 0.45 mil to 0.75 mil, average maximum birefringence of at least $17\times10^{-3}$, and an average burst strength of at least 1.7 psi, and the cellular cushioning article has an average haze of less than 40 percent.

5. The cellular cushioning article according to claim 1, wherein the high melt point layer has a thickness of from 1 to 20 percent of the total film thickness, and the high melt point layer comprises the high melt point polymer in an amount of from 50 to 100 wt %, based on the weight of the high melt point layer.

6. The cellular cushioning article according to claim 1, wherein the high melt point layer has a thickness of from 2 to 10 percent of the total film thickness, and the high melt point layer comprises the high melt point polymer in an amount of from 70 to 100 wt %, based on the weight of the high melt point layer.

7. The cellular cushioning article according to claim 1, wherein the cellular cushioning article has an average burst strength per mil of land area thickness of the first film, and the combination is a member selected from the group consisting of:

(A) average land area thickness of from 2.01 mils to 3 mils, average maximum birefringence of at least $6\times10^{-3}$, with the cells having an average burst strength per mil of land area thickness of the first film of at least 1.8 psi/mil;

(B) average land area thickness of from 1.41 mils to 2 mils and an average maximum birefringence of at least $16\times10^{-3}$, with the cells having an average burst strength per mil of land area thickness of the first film of at least 2.0 psi/mil;

(C) average land area thickness of from 1.01 mils to 1.40 mils and an average maximum birefringence of at least $17\times10^{-3}$, with the cells having an average burst strength per mil of land area thickness of the first film of at least 2.3 psi/mil;

(D1) average cell volume of from 0.15 to 0.99 $cm^3$, average land area thickness of from 0.76 mil to 1.0 mil and an average maximum birefringence of at least $17\times10^{-3}$, with the cells having an average burst strength per mil of land area thickness of the first film of at least 8.0 psi/mil; and (D2) average cell volume of from 1.0 to 15 $cm^3$, average land area thickness of from 0.76 mil to 1.0 mil and an average maximum birefringence of at least $17\times10^{-3}$, with the cells having an average burst strength per mil of land area thickness of the first film of at least 2.3 psi/mil; and (E1) average land area thickness of from 0.45 mil to 0.75 mil and an average maximum birefringence of at least $17\times10^{-3}$, with the cells having an average burst strength per mil of land area thickness of the first film of at least 12.0 psi/mil; and (E2) average cell volume of from 1.0 to 15 $cm^3$, average land area thickness of from 0.45 mil to 0.75 mil, average maximum birefringence of at least $17\times10^{-3}$, and an average burst strength of at least 2.3 psi.

8. The cellular cushioning article according to claim 1, wherein the thermoformed portion of the first film is a first thermoformed portion, and the plurality of discrete thermoformed regions of the first film provides a first plurality of discrete raised embossments, and the second film further comprises a second thermoformed portion, with a second plurality of discrete thermoformed regions of the second film providing a second plurality of raised embossments, with the first plurality of raised embossments extending in a first direction and the second plurality of raised embossments extending in a second direction, with the second direction being opposite the first direction.

9. The cellular cushioning article according to claim 1, wherein cells have an average cell height, and the combination is a member selected from the group consisting of:

(A) an average cell volume of from 5 to 15 $cm^3$, average land area thickness of from 2.01 mils to 3 mils, average maximum birefringence of at least $6\times10^{-3}$, and an average burst strength of at least 3.7 psi, and average cell height of at least 9 mm;

(B) average cell volume of from 5 to 15 $cm^3$, average land area thickness of from 1.41 mils to 2 mils, an average maximum birefringence of at least $16\times10^{-3}$, and an average burst strength of at least 3 psi, and average cell height of at least 9 mm;

(C) average cell volume of from 1 to 15 $cm^3$, average land area thickness of from 1.01 mils to 1.40 mils, an average maximum birefringence of at least $17\times10^{-3}$, and an average burst strength of at least 2.4 psi and average cell height of at least 5 mm;

(D1) average cell volume of from 0.15 to 0.99 $cm^3$, average land area thickness of from 0.76 mil to 1.0 mil, an average maximum birefringence of at least $17\times10^{-3}$, an average burst strength of at least 7 psi, and average cell height of from 3 mm to 4.99 mm;

(D2) average cell volume of from 1.0 to 15 $cm^3$, average land area thickness of from 0.76 mil to 1.0 mil, average maximum birefringence of at least $17\times10^{-3}$, average burst strength of at least 2 psi an, and average cell height of at least 5 mm; and (E1) average cell volume of from 0.15 to 0.99 $cm^3$, average land area thickness of from 0.45 mil to 0.75 mil, average maximum birefringence of at least 17, average burst strength of at least 6.0 psi, and average cell height of from 3 mm to 4.99 mm; and (E2) average cell volume of from 1.0 to 15 $cm^3$, average land area thickness of from 0.45 mil to 0.75 mil, average maximum birefringence of at least $17\times10^{-3}$, average burst strength of at least 1.7 psi, and average cell height of at least 5 mm.

10. The cellular cushioning article according to claim 1, wherein thermoformed regions have a substantially uniform size and a substantially uniform shape.

11. The cellular cushioning article according to claim 1, wherein the high melt point layer of the first film is an internal film layer between the bonding layer of the first film and an outside layer of the first film, with the outside layer of the first film also comprising polyolefin, with the first film further comprising a first tie layer between the bonding layer and the high melt point layer and a second tie layer between the high melt point layer and the outer layer.

12. The cellular cushioning article according to claim 1, wherein the first film is a multilayer film comprising at least one bulk layer and a microlayer section, the microlayer section comprising at least ten microlayers, wherein each of the microlayers and the bulk layer have a thickness such that the thickness of any of the microlayers is from 0.2% to 50% of the thickness of the bulk layer, and wherein at least one of the microlayers comprises recycled polymer.

13. The cellular cushioning article according to claim 12, wherein the microlayer section comprises up to 70 percent of the total thickness of the film, and the microlayer section comprises up to 100 weight percent recycled polymer.

14. The cellular cushioning article according to claim 12, wherein the film further comprises a second bulk layer, and the microlayer section is between the first bulk layer and the second bulk layer.

15. The cellular cushioning article according to claim 1, wherein the high melt point polymer in the high melt point layer is a gas barrier polymer consisting essentially of polyamide.

16. The cellular cushioning article according to claim 1, wherein the high melt point polymer in the high melt point layer is a gas barrier polymer consisting of polyamide.

17. The cellular cushioning article according to claim 4, wherein the high melt point polymer in the high melt point layer is a gas barrier polymer consisting essentially of polyamide.

18. The cellular cushioning article according to claim 4, wherein the high melt point polymer in the high melt point layer is a gas barrier polymer consisting of polyamide.

19. The cellular cushioning article according to claim 1, wherein the combination is a member selected from the group consisting of:

(A) average land area thickness of from 2.01 mils to 3 mils, and an average maximum birefringence of at least $10\times10^{-3}$;

(B) average land area thickness of from 1.41 mils to 2 mils and an average maximum birefringence of at least $17\times10^{-3}$;

(C) average land area thickness of from 1.01 mils to 1.40 mils and an average maximum birefringence of at least $18\times10^{-3}$; and (D) average land area thickness of from 0.76 mil to 1.0 mil and an average maximum birefringence of at least $17\times10^{-3}$.

20. The cellular cushioning article according to claim 19, wherein the high melt point polymer in the high melt point layer is a gas barrier polymer consisting essentially of polyamide.

21. The cellular cushioning article according to claim 19, wherein the high melt point polymer in the high melt point layer is a gas barrier polymer consisting of polyamide.

22. A process for making a cellular cushioning article, comprising:

(A) thermoforming a plurality of discrete regions of a first film to produce a plurality of discrete thermoformed regions which provide a plurality of raised embossments, with the discrete thermoformed regions being separated from one another by an unformed land area, with each of the raised embossments providing a discrete convex surface region on the top surface of the first film, and each of the raised embossments providing a discrete concave surface region on the bonding surface of the first film, with each of the discrete regions of the first film being thermoformed by being vacuum-drawn into a discrete cavity in a thermoforming mold;

(B) bonding a second film to at least a portion of the land area of the first film, with the plurality of discrete thermoformed regions of the first film together with a plurality of discrete unbonded regions of the second film together making up a plurality of discrete cells, with each cell surrounding a discrete volume of fluid entrapped between the first film and the second film; and wherein the first film has a heat seal layer comprising polyolefin and a high melt point layer comprising polyamide, and wherein the process is carried out so that a combination of an average thickness of the land area of the first film, and an average maximum birefringence of the thermoformed regions of the first film, is a member selected from the group consisting of:

(i) average land area thickness of from 2.01 mils to 3 mils, and an average maximum birefringence of at least 6×10−3;

(ii) average land area thickness of from 1.41 mils to 2 mils and an average maximum birefringence of at least 16×10−3;

(iii) average land area thickness of from 1.01 mils to 1.40 mils and an average maximum birefringence of at least 17×10−3;

(iv) average land area thickness of from 0.76 rail to 1.0 rail and an average maximum birefringence of at least 17×10−3; and (v) average land area thickness of from 0.45 rail to 0.75 rail and an average maximum birefringence of at least 17×10−3.

23. The process according to claim 22, wherein the process is an integrated process and further comprising:

(C) extruding the first film through a first die before thermoforming the first film;

(D) extruding the second film through a second die before the second film is bonded to the land area of the first film;

(E) actively or passively cooling the first film to the temperature at which the thermoforming is conducted.

24. The integrated process according to claim 23, wherein the first film passes in a partial wrap around a tempering roller before the first film is thermoformed, and wherein the process is carried out using a combination selected from the group consisting of:

(1) the tempering roller having a temperature of from 140° F. to 190° F., with the first film having an average thickness, before thermoforming, of from 2.01 mils to 3 mils, and;

(2) the tempering roller having a temperature of from 180° F. to 215° F., and the first film having an average thickness, before thermoforming, of from 1.41 mils to 2 mils;

(3) the tempering roller having a temperature of from 185° F. to 220° F., and the first film having an average thickness, before thermoforming, of from 1.01 mils to 1.40 mils; and (4) the tempering roller having a temperature of from 190° F. to 225° F., and the first film having an average thickness, before thermoforming, of from 0.76 mil to 1.0 mil;

(5) the tempering roller having a temperature of from 195° F. to 240° F., and the first film having an average thickness, before thermoforming, of from 0.45 mil to 0.75 mil.

25. The integrated process according to claim 24, wherein the first film contacts the tempering roller for a distance of at least 5 inches around the tempering roller.

26. The integrated process according to claim 24, wherein the tempering roller is a first tempering roller and after passing in partial wrap around the first tempering roller, the first film passes in partial wrap around a second tempering roller, and wherein the process is carried out using a combination selected from the group consisting of:

(1) the first tempering roller having a temperature of from 140° F. to 190° F., the second tempering roller having a temperature of from 140° F. to 190° F., and the first film having an average thickness, before thermoforming, of from 2.01 mils to 3 mils, and;

(2) the first tempering roller having a temperature of from 180° F. to 215° F., the second tempering roller having a temperature of from 180° F. to 215° F., and the first film having an average thickness, before thermoforming, of from 1.41 mils to 2 mils;

(3) the first tempering roller having a temperature of from 185° F. to 220° F., the second tempering roller having a temperature of from 185° F. to 220° F., and the first film having an average thickness, before thermoforming, of from 1.01 mils to 1.40 mils;

(4) the first tempering roller having a temperature of from 190° F. to 225° F., the second tempering roller having a temperature of from 190° F. to 225° F., and the first film having an average thickness, before thermoforming, of from 0.76 mil to 1.0 mil;

(5) the first tempering roller having a temperature of from 195° F. to 240° F., the second tempering roller having a temperature of from 195° F. to 240° F., and the first film having an average thickness, before thermoforming, of from 0.45 mil to 0.75 mil.

27. The integrated process according to claim 26, wherein the first tempering roller is run at a first surface speed and the second tempering roller is run at a second surface speed, and the second surface speed is at least 10 percent higher than the first surface speed.

28. The integrated process according to claim 24, wherein the second tempering roller has a surface speed of from 50 to 250 meters per minute.

* * * * *